(12) United States Patent
Shani

(10) Patent No.: US 7,773,849 B2
(45) Date of Patent: Aug. 10, 2010

(54) DEVICE AND METHOD FOR OPTICAL RESIZING AND BACKLIGHTING

(75) Inventor: Yosi Shani, Maccabim (IL)

(73) Assignee: OMS Displays Ltd., Jerusalem (IL)

( * ) Notice: Subject to any disclaimer, the term of this patent is extended or adjusted under 35 U.S.C. 154(b) by 792 days.

(21) Appl. No.: 11/582,359

(22) Filed: Oct. 18, 2006

(65) Prior Publication Data

US 2007/0086712 A1 Apr. 19, 2007

Related U.S. Application Data

(63) Continuation-in-part of application No. PCT/IL2005/001344, filed on Dec. 14, 2005.

(60) Provisional application No. 60/635,510, filed on Dec. 14, 2004, provisional application No. 60/810,877, filed on Jun. 2, 2006, provisional application No. 60/727,402, filed on Oct. 18, 2005.

(51) Int. Cl.
*G02B 6/10* (2006.01)
*G02F 1/1335* (2006.01)
*H01L 21/00* (2006.01)

(52) U.S. Cl. ............. 385/131; 385/129; 385/130; 385/132; 385/31; 385/43; 385/11; 385/115; 385/116; 349/61; 349/62; 349/144; 349/158; 349/159; 349/187; 438/30; 438/31

(58) Field of Classification Search ............. 385/31, 385/115, 116, 119, 120, 121, 11, 14, 43, 385/101, 114, 129, 130, 131, 132; 349/61, 349/56, 62, 144, 145, 158, 159, 187; 430/20; 438/30, 31
See application file for complete search history.

(56) References Cited

U.S. PATENT DOCUMENTS 3,402,000 A 9/1968 Crawford
3,728,422 A 4/1973 Sugaya (Continued)

FOREIGN PATENT DOCUMENTS

CN 1629690 6/2005

(Continued)

*Primary Examiner*—Brian M Healy

(57) ABSTRACT

A backlight assembly for feeding illuminating light to a passive display panel is disclosed. The backlight assembly comprises a plurality of waveguides being formed and/or embedded in at least one substrate and arranged to feed illuminating light to each sub-pixel position of the passive display panel in a manner such that each pixel region is illuminated by at least two waveguides, wherein each waveguide of the at least two waveguides is disposed to illuminate one sub-pixel position of the pixel region by a respective color channel.

48 Claims, 64 Drawing Sheets
(57 of 64 Drawing Sheet(s) Filed in Color)

U.S. PATENT DOCUMENTS

| | | | |
|---|---|---|---|
| 4,087,159 A * | 5/1978 | Ulrich | 385/129 |
| 4,208,096 A | 6/1980 | Glenn, Jr. | |
| 4,647,152 A | 3/1987 | Jeskey | |
| 5,009,475 A | 4/1991 | Knudson | |
| 5,668,907 A | 9/1997 | Veligdan | |
| 5,926,239 A * | 7/1999 | Kumar et al. | 349/69 |
| 6,567,594 B2 * | 5/2003 | Kijima | 385/120 |
| 6,571,043 B1 | 5/2003 | Lowry et al. | |
| 6,832,037 B2 | 12/2004 | Aylward et al. | |
| 6,892,011 B2 | 5/2005 | Walker et al. | |
| 6,892,014 B2 * | 5/2005 | Cok et al. | 385/120 |
| 2001/0050667 A1 | 12/2001 | Kim et al. | |
| 2003/0012532 A1 * | 1/2003 | Prigent | 385/120 |
| 2004/0017985 A1 * | 1/2004 | Cok et al. | 385/120 |
| 2006/0007054 A1 * | 1/2006 | Chang et al. | 345/1.3 |
| 2007/0047220 A1 | 3/2007 | Kang et al. | |
| 2007/0086712 A1 * | 4/2007 | Shani | 385/101 |

FOREIGN PATENT DOCUMENTS

| | | |
|---|---|---|
| EP | 1211551 | 5/2002 |
| JP | 07-301730 | 11/1995 |
| WO | WO 2007/046100 | 4/2007 |

\* cited by examiner

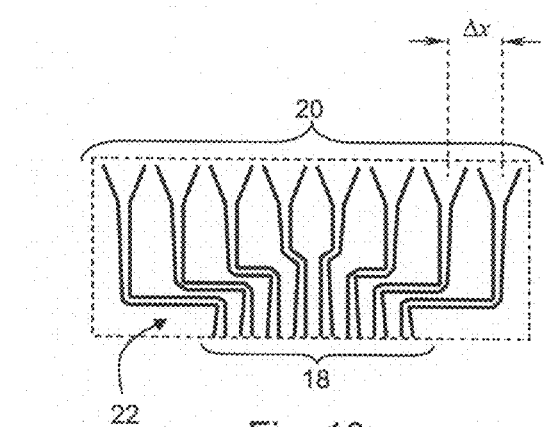 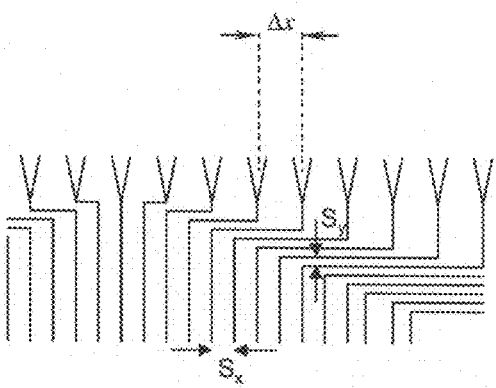
Fig. 10a          Fig. 10b
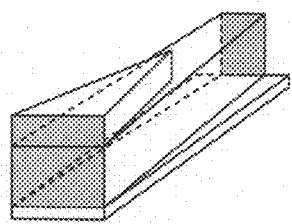 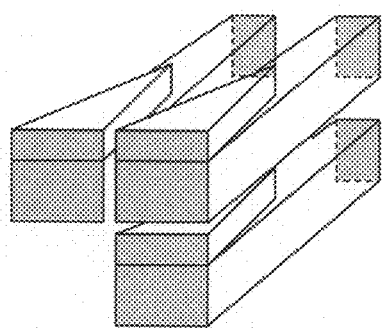
Fig. 11a          Fig. 11b

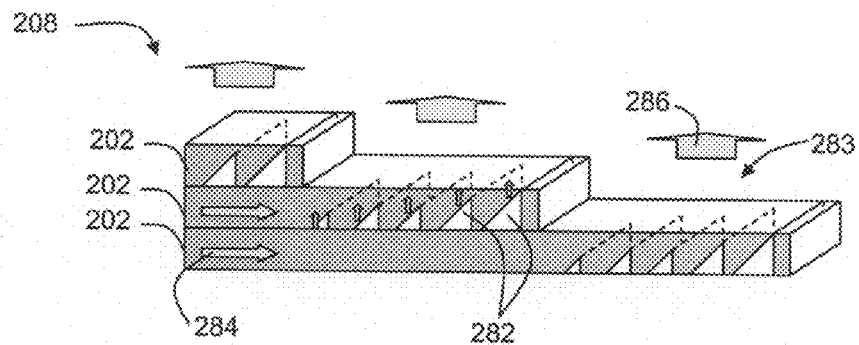
Fig. 23a
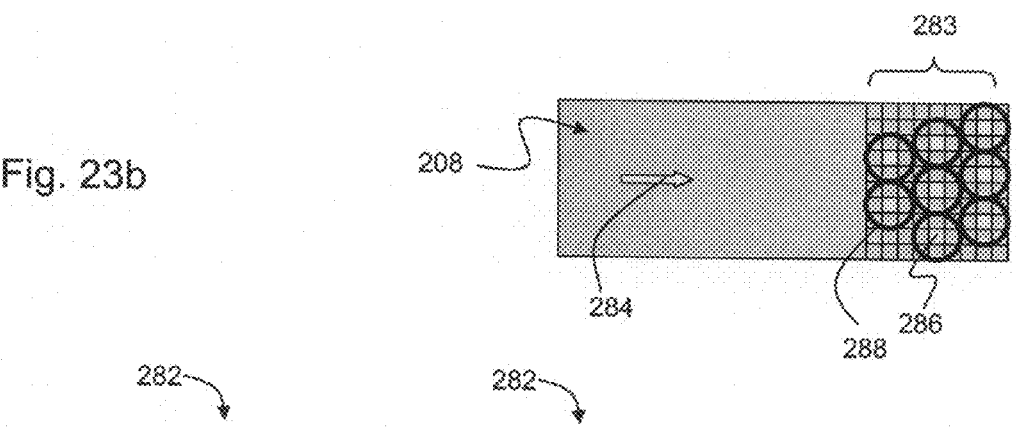
Fig. 23b
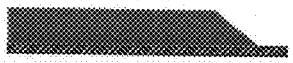 
Fig. 23c    Fig. 23d

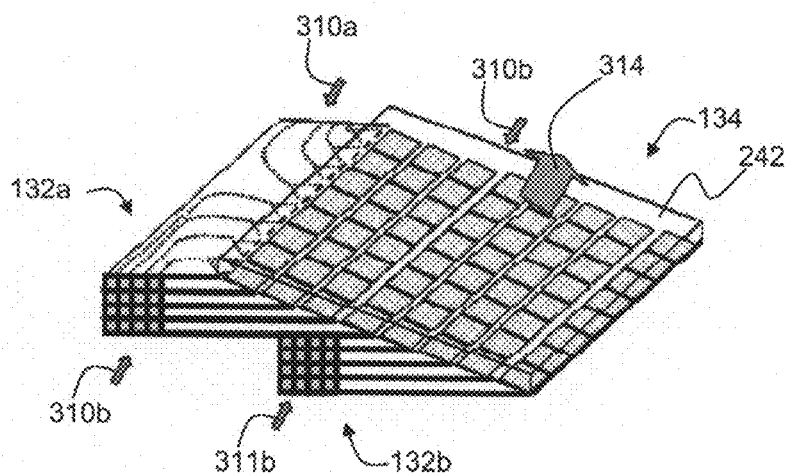
Fig. 31
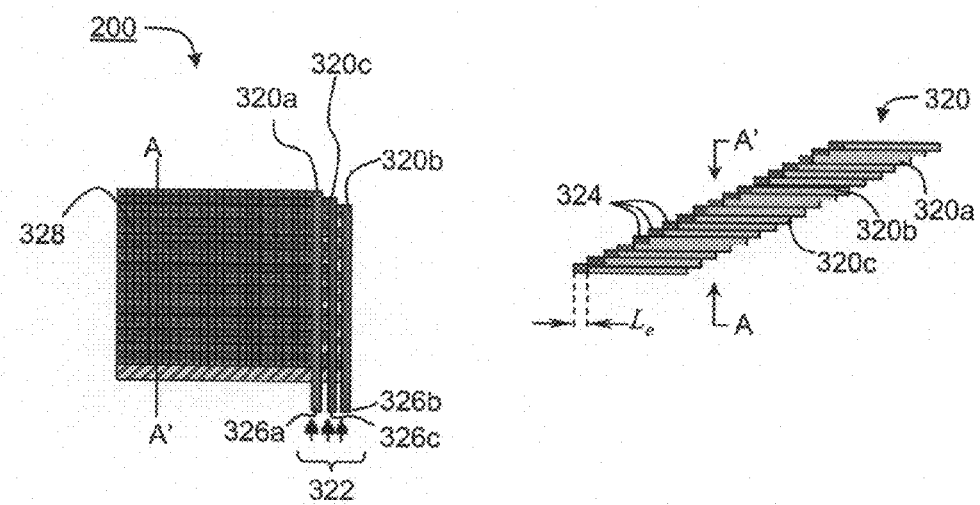
Fig. 32a                    Fig. 32b

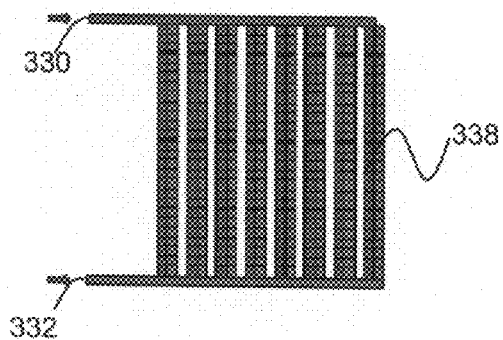
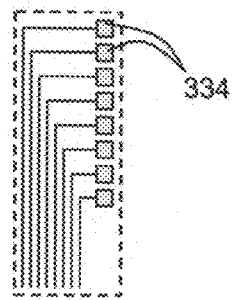
Fig. 34a
Fig. 34b
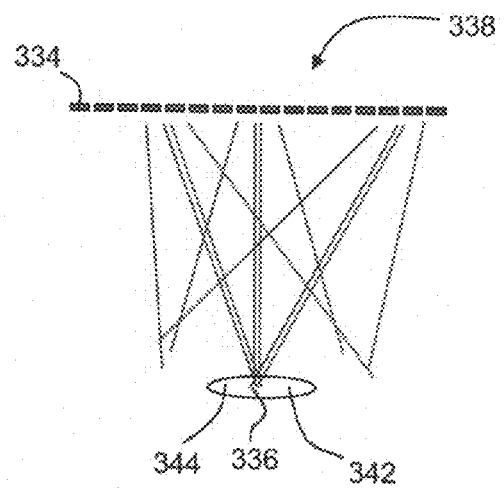
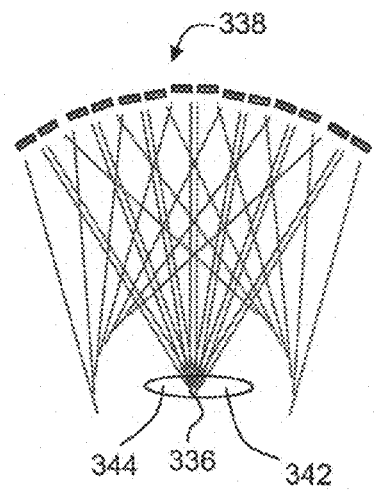
Fig. 34c
Fig. 34d

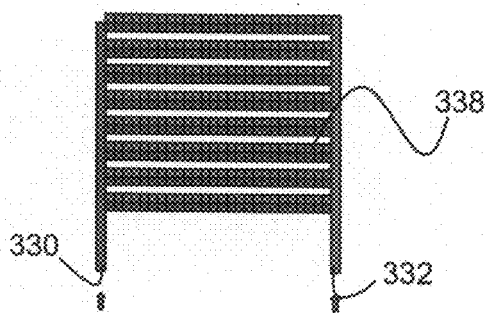
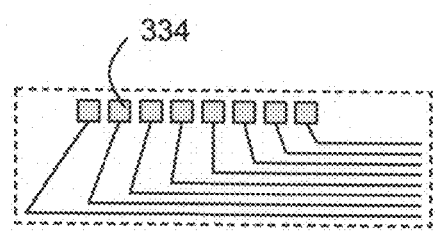
Fig. 35a    Fig. 35b
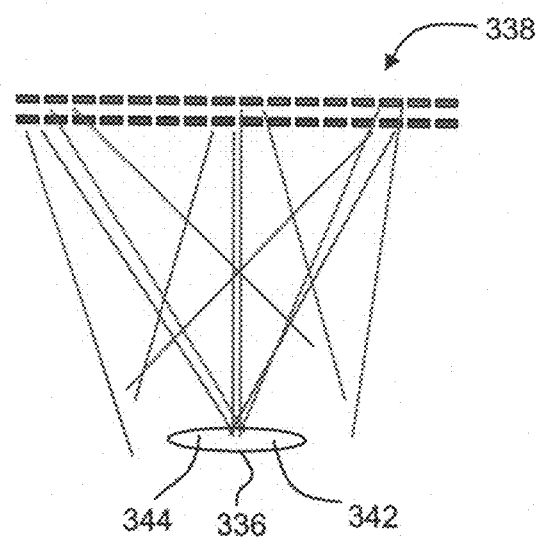
Fig. 35c

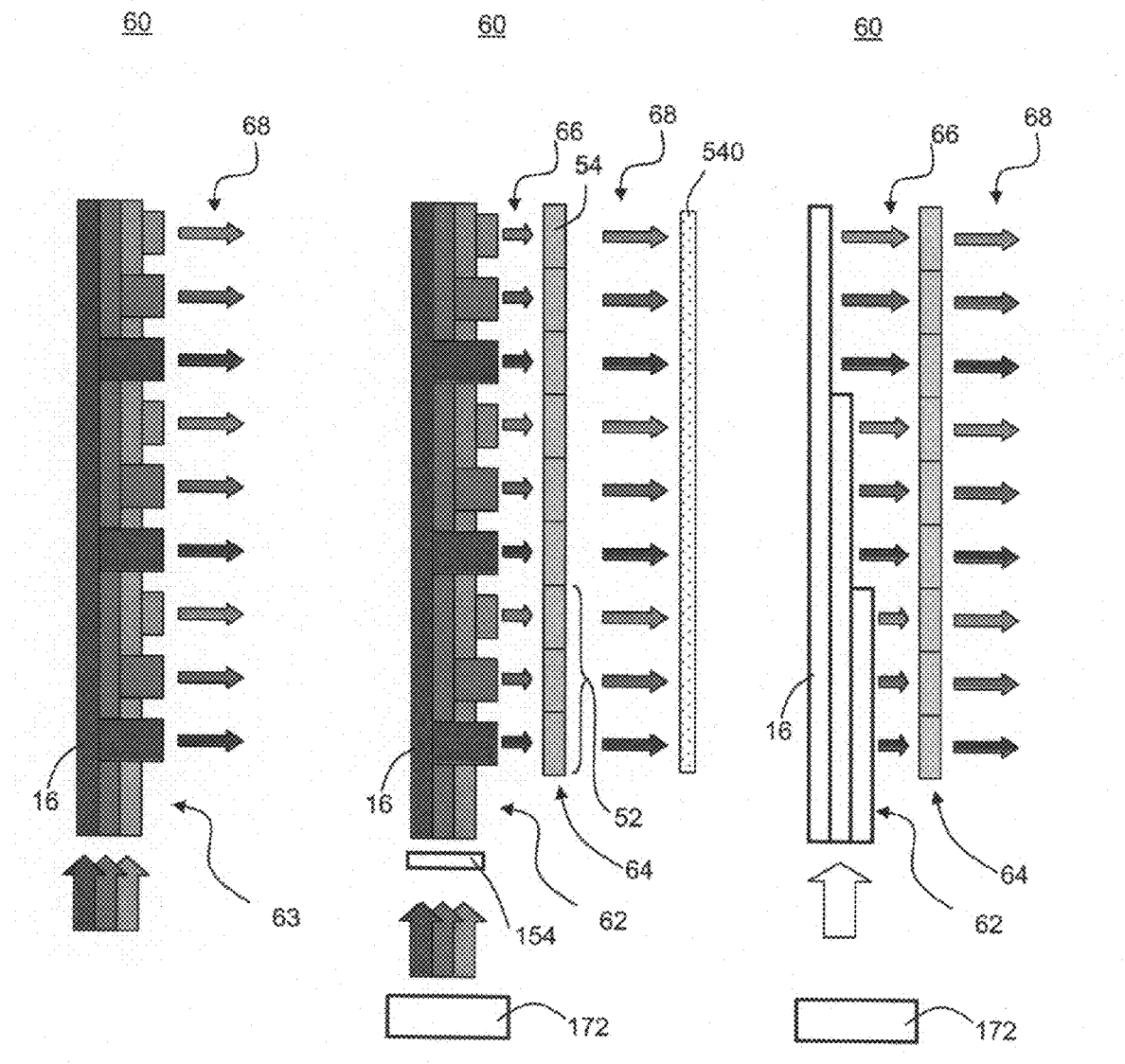

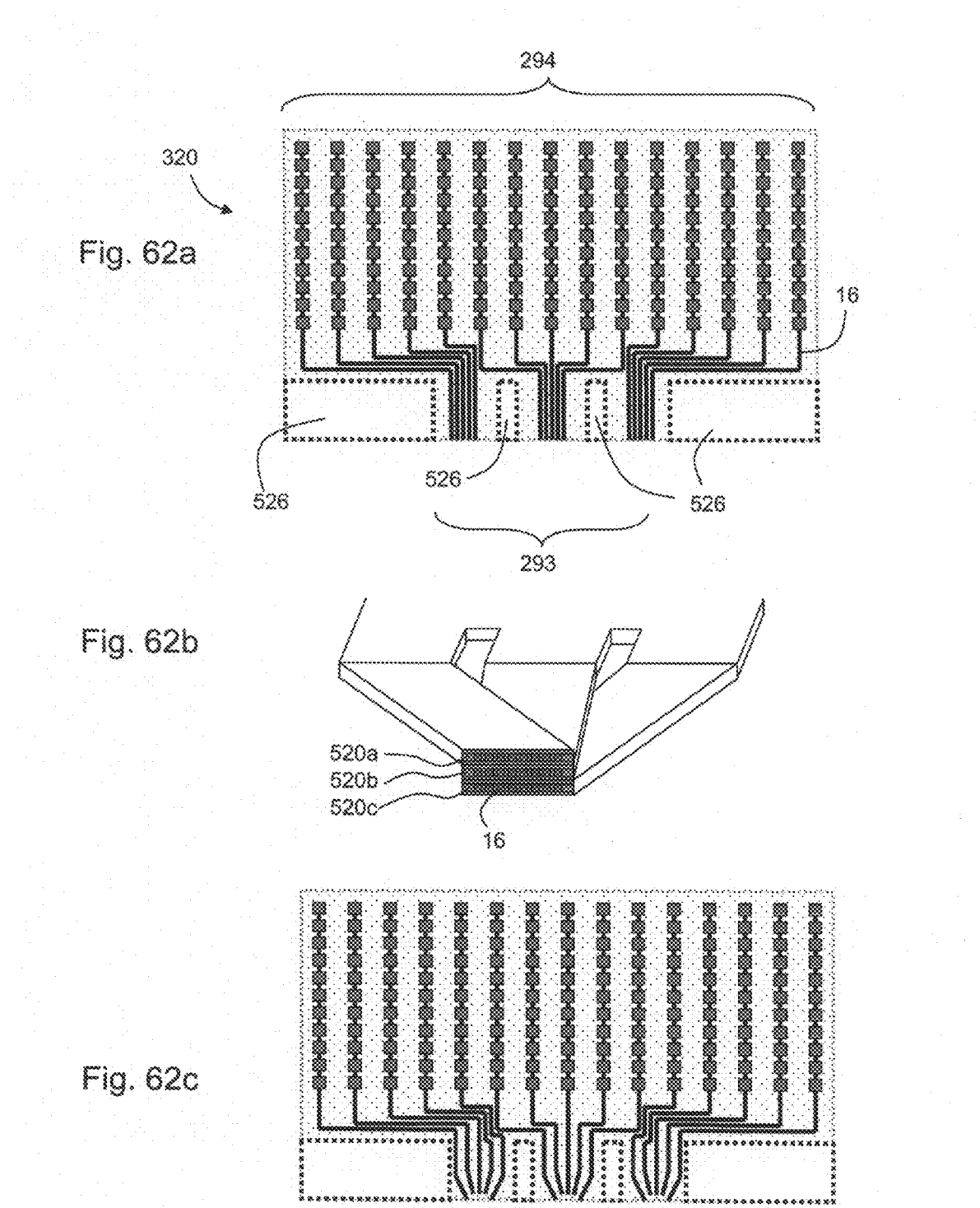

DEVICE AND METHOD FOR OPTICAL RESIZING AND BACKLIGHTING

RELATED APPLICATIONS

This Application is a continuation-in-part of PCT Patent Application No. PCT/IL2005/001344, filed on Dec. 14, 2005, which claims the benefit of U.S. Provisional Patent Application No. 60/635,510, filed on Dec. 14, 2004. This Application also claims the benefit of U.S. Provisional Patent Application No. 60/810,877, filed on Jun. 2, 2006, and U.S. Provisional Patent Application No. 60/727,402, filed on Oct. 18, 2005.

The contents of all the above Patent Applications are hereby incorporated by reference.

FIELD AND BACKGROUND OF THE INVENTION

The present invention relates to optics and, more particularly, to a device and method for optical resizing or backlighting.

Miniaturization of electronic devices has always been a continuing objective in the field of electronics. Electronic devices are often equipped with some form of display, which is visible to a user. As these devices reduce in size, their display size is reduced too. However, beyond some size the electronic device's display cannot be viewed with a naked eye and its image should be magnified.

An electronic display may provide a real image, the size of which is determined by the physical size of the display device, or a virtual image, the size of which may extend the dimensions of the display device.

Magnification of images produced by small size image display systems can be performed by projecting the image on a larger screen or via passive optical magnification element providing the user with a magnified virtual image. A virtual image is defined as an image, which cannot be projected onto a viewing surface, since no light ray connects the image and an observer.

It is appreciated, however, that the above magnification techniques are far from being optimal. Projected real images suffer from bulkiness since in projection the expansion of image is achieved by light propagation perpendicularly to the display. Devices producing virtual images have a limited field-of-view and are oftentimes also bulky.

In another magnification technique the image is not projected but rather guided through a bundle of optical fibers extending from a small facet to a large facet. The small facet is oftentimes referred to as "the object plane" whereas the larger facet is oftentimes referred to as "the image plane".

Referring now to the drawings, FIGS. 1-2 are schematic illustrations of several prior art techniques for manufacturing fiber base guided magnifiers.

FIG. 1a shows an optical image transporting device based on the teachings of U.S. Pat. No. 2,825,260. The magnification from the small facet to the large facet is achieved by increasing the separation between the fibers in the bundle. FIG. 1b illustrates a modification to this method, disclosed in U.S. Pat. Nos. 2,992,587 and 3,853,658. In this technique, the fibers are up-tapered towards the large facet. These techniques, however, were not producible, due to the technological limitations associated with separation and up-tapering of optical fibers.

An attempt to overcome the up-tapering problem is disclosed in U.S. Pat. No. 3,909,109, where an additional layer is added at the large facet. The thickness of the layer is selected such as to allow free propagation through the layer until the far field beams of the fibers overlap. This technique, however, suffers from a major limitation, because the Gaussian shape of the far field line makes it difficult to determine the optimal thickness of the additional layer.

FIG. 1c shows another improvement of the device of FIG. 1a which improvement is based on the teachings of U.S. Pat. Nos. 3,043,910 and 4,208,096. In this improvement, the fiber separation is performed only in one dimension whereby the separation in the other (substantially orthogonal) dimension is done via by a terrace or slanted cut. In this configuration the fibers, after being separated in one direction, are redirected towards a large facet where they are terrace or slanted cut in order to be separated in the substantially orthogonal direction. A major limitation of this solution is the manufacturing difficulty.

FIGS. 2a-b shows another technique for producing a fiber optic magnification element, according to the teachings of U.S. Pat. Nos. 3,402,000 and 6,326,939. With reference to FIG. 2a, a one-dimensional magnification element includes cylindrically shaped optical fibers which are cut in a manner such that a circular cross section is formed on one side and an elliptic cross section is formed on the other side. The circular cross section is perpendicular to the longitudinal axis of the cylinder, and therefore has the same diameter as the cylinder. The elliptic cross section is slanted with respect to the longitudinal axis, hence has a small axis which equals the diameter of the cylinder and a large axis which is larger than the diameter of the cylinder. When light is transmitted through the fibers from the circular side to the elliptic side, a one dimension magnification is established in the direction of the large axis of the elliptic cross section.

With reference to FIG. 2b, two such one-dimensional magnification elements are connected via a redirecting layer such that the output of one element is used as the input of the other element. A second redirecting layer is used for coupling the light out of the second magnification element. To achieve proper optical coupling between the first and second elements, the cross section of the fibers on the input side of the second element must have the same elliptic cross section of the fibers on the output side of the first element.

However, the elliptic input cross section of the second element's fibers cannot be obtained by slanted cut because the input cross section of the fibers must be perpendicular to their longitudinal axis. On the other hand, a fiber bundle with elliptically shaped fibers does not exist. Therefore, in order not to loose resolution at the second magnification, the number of fibers in the second element should be larger than the number of fibers in the first element, by a factor which equals the one dimensional magnification ratio of the first element. Additional drawbacks of this technique are the need for redirecting layers and the presence of non-guided light which can diminish the display aspect ratio.

U.S. Pat. Nos. 5,511,141 and 5,600,751 disclose a reading magnifier formed by a bundle of juxtaposed longitudinally tapered optical fibers. The magnifier is commercially available under the trade name TaperMag™ from Taper Vision Co. Ltd., USA [E. Peli, W. P. Siegmund "Fiber-optic reading magnifiers for the visually impaired," J Opt Soc Am A 12(10): 2274-2285, 1995]. The TaperMag™, however, is bulky (thickness of about 5 cm for only ×2 magnification up to a 2 inches screen) because its thickness must be comparable to the size of facet diameter.

U.S. Pat. No. 6,480,345 to Kawashima et al. discloses a magnifier which utilizes high-refractive-index regions extending from the small facet to the large facet. In simulations performed by Kawashima et al. it was found that a 30 inches magnifier can have a thickness of less than 4 cm and perform ten times enlargement. The manufacturing process of Kawashima's magnifier is, however, rather complicated. For example, one embodiment of Kawashima et al. involves the alignment of dozens of laminated thin plates produced by masks with increasing core dimensions. Another embodiment of Kawashima et al. involves three dimensions fiber handling. Although Kawashima et al. also teach simpler manufacturing processes, these are limited to magnification ratio of 2 or less.

Beside the magnification of the displayed images, efforts have been made over the years to research and develop display technologies for improving the quality of the images while reducing the power consumption and bulkiness of the display devices.

Generally, electronic display devices may be categorized into active display devices and passive display devices. The active display devices include the cathode ray tube (CRT), the plasma display panel (PDP) and the electroluminescent display (ELD). The passive display devices include liquid crystal display (LCD), the electrochemical display (ECD) and the electrophoretic image display (EPID). In active display devices, each pixel radiates light independently. Passive display devices, on the other hand, do not produce light within the pixel and the pixel is only able to block light.

Of the above display technologies, the passive display device, and in particular the LCD device has become the leading technology due to its proven high quality and small form factor (slimness). LCD devices are currently employed in many applications (cellular phones, personal acceptance devices, desktop monitors, portable computers, television displays, etc.), and there is a growing attention to devise backlight high-quality assemblies for improving the image quality inn these applications.

In LCD devices, an electric field is applied to liquid crystal molecules, and an alignment of the liquid crystal molecule is changed depending on the electric field, to thereby change optical properties of the liquid crystal, such as double refraction, optical rotatory power, dichroism, light scattering, etc. Since LCD are passive, they display images by reflecting external light transmitted through an LCD panel or by using the light emitted from a light source, e.g., a backlight assembly, disposed behind the LCD panel.

Backlight assemblies are designed to achieve many goals, including high brightness, large area coverage, uniform luminance throughout the illuminated area, controlled viewing angle, small thickness, low weight, low power consumption and low cost.

FIG. 42a illustrates a typical LCD device. The device includes a LCD panel and backlight assembly. The LCD panel includes an arrangement of LCD pixels, which are typically formed of thin film transistors fabricated on a transparent substrate with liquid crystal sandwiched between them and the color filters. The color filters which are fabricated on another transparent substrate produce colored light by transmitting only one third of the light produced by each pixel. Thus, each LCD pixels is composed of three sub-pixels. The thin film transistors are addressed by gate lines to perform display operation by way of the signals applied thereto through display signal lines. The signals charge the liquid crystal layer in the vicinity of the respective thin film transistors to effect a local change in optical properties of the liquid crystal layer.

In operation, the backlight assembly produces white illumination directed toward the liquid crystal pixels. The optical properties of the liquid crystal layer are locally modulated by the thin film transistors to create a light intensity modulation across the area of the display. Specifically, a static polarizer polarizes the light produced by the backlight assembly, and the liquid crystal pixels selectively manipulate the polarization of the light passing therethrough. The light intensity modulation is achieved using a static polarizer positioned in front of the liquid crystal pixels which prevents transmission of light of certain polarization. The color filters colorize the intensity-modulated light emitted by the pixels to produce a color output. By selective opacity modulation of neighboring pixels of the three color components, selected intensities of the three component colors are blended together to selectively control color light output. Selective the blending of three primary colors such as red, green, and blue (RGB) can generally produce a full range of colors suitable for color display purposes.

Traditionally, Cold Cathode Fluorescent tubes Light (CCFL) has been employed for LCD backlighting. A fluorescent lamps and optics are deployed for homogenously scattering the light across the LCD panel and color filters are deployed for separating between the colors. A diffuser layer and a reflector are used for further homogenizing the backlight spectrum and reducing optical leakage, respectively. To assure sufficient light transmission, color filters of relatively wide spectrum are used. This, however, results in crosstalks between the RGB pixels, which limit the available color gamut that can be obtained from CCFL backlighting. In addition, CCFL backlighting systems are expensive, bulky, power consuming and contain Hg.

In more advanced technique, a backlight assembly of LCD includes an array of Light Emitting Diodes (LEDs) for emitting white or RGB light, a light guiding plate for guiding the light toward the LCD panel, and a diffuser layer positioned between the LCD panel and the LEDs for homogenizing the backlight spectrum at the LCD panel. Oftentimes, a reflector is disposed behind the light guiding plate to reflect the lights leaked from the light guiding plate toward the light guiding plate. The LEDs, due to their inherent narrow color spectrum, can improve the overall LCD color gamut. In addition, the LEDs are Hg free, they provide higher brightness to size ratio, have increased longevity, and can be incorporated in a more robust design. The key issue in introducing LEDs is in finding an efficient way for homogenously spread the LED light over the backlighting panel. Such types of backlight assemblies are disclosed, for example, U.S. Pat. Nos. 6,608,614, 6,930, 737, and in U.S. Patent Application Nos. 20040264911, 20050073495 and 20050117320. However, this technique, similarly to CCFL, has an intrinsic power loss of two thirds of the total power due to the use of RGB filters in the LCD panel.

FIG. 42b schematically illustrates another conventional backlighting technique designed to overcome the intrinsic power loss discussed above. In this technique, the colors are separated (instead of being filtered) by prism positioned behind the LCD sub-pixels. Such types of backlight assemblies are disclosed, for example, in U.S. Pat. Nos. 5,748,828, 6,104,446 and in references included therein. This technique, however, suffer from bulkiness and low efficiency due to the bulky optic involved.

FIG. 42c schematically illustrates an additional conventional backlighting technique designed to overcome the intrinsic power loss. In this technique, contrarily to the techniques described above, the colors are guided separately to their destined column of sub-pixels rather than being mixed to white light. Red, green and blue LEDs are coupled to separate optical fibers. The optical fibers illuminate the positions of the red, green and blue pixels of the LCD. The LEDs are constantly on and there is no color filtering.

Such types of backlight assemblies are disclosed, for example, in U.S. Pat. No. 6,768,525 and partially also by U.S.

Pat. Nos. 6,104,371 and 6,288,700. This technique, however, is difficult to implement because it requires severe fiber treating and it does not provide solution to the problem of addressing the transmitted RGB lights to the color filters array without crosstalk.

Furthermore, this technique can only provide limited homogeneity in light distribution. For example, in U.S. Pat. No. 6,104,371 to Wang et al. the optical fibers are coupled to RGB light sources and are placed in a sequential parallel order within a panel. Output light uniformity is achieved by placing perpendicular reflecting wedges of increasing height along the fibers, to effect increased reflection which compensates the decrease in optical power along the fiber. However, Wang et al. fail to provide light uniformity at the sub-pixel level. Furthermore, since Wang et al. use a stack of 3×N fibers, where N is a large number, all the RGB colors are mixed at the output.

In U.S. Pat. No. 6,288,700 to Mori, cylindrical waveguides, coupled to RGB sources, are divided to smaller parallel waveguides provided with holes for coupling out the light. The holes are arranged in an addressable arrangement. Such backlighting configuration, however, result in poor performances due to the low efficiency characterizing the coupling of light out of a waveguide through holes. Furthermore, since Mori guides all RGB colors in the same waveguide, there is no separation of colors at the sub-pixels level. An additional drawback of Mori's technique is the lack of uniformity in light scattering or light distribution among the parallel waveguides.

In U.S. Pat. No. 6,768,525 Paolini et al., fibers coupled to RGB light sources are placed parallel in a sequential order and scatter light along their length. The spacing between fibers and the scattering points along each fiber are compatible with the spacing between the sub-pixels of the LCD panel. However, while coupling each color to a separate waveguide, Paolini et al. do not provide any practical technique for achieving a sufficiently accurate arrangement in which different colors arrive at different sub-pixels with minimal mixing. It is recognized that since the coupling of the light out of the waveguide is by scattering, crosstalk between neighbor colors is unavoidable and the uniformity of light at the sub-pixel level for each color is limited. Paolini et al. further disclose a configuration in which the one layer of parallel fibers is replaced by three layers of parallel bulky diffusive waveguides, one for each color. The diffusive waveguides are manufactured with scattering notches. The spaces between the scattering notches are compatible with the spaces between the pixels and the spaces between the bulky waveguides are compatible with the spaces between the sub-pixels.

However, since the parallel diffusive waveguides of Paolini et al. must have a large aspect ratio (narrower than their thickness) and isolated from one another, such configuration has very poor efficiency and uniformity. The reason being that it is difficult to fabricate such waveguide with large aspect ratio and it is difficult to produce large number of diffusive waveguides (one diffusive waveguide for each sub-pixel of the LCD panel) without compromising the optical isolation there amongst.

Although diffusive optical fibers or waveguides are known for backlighting applications, see, e.g., U.S. Pat. Nos. 6,714,185, 6,874,925, 6,910,783, 4,573,766, 5,857,761, 6,072,551, 6,611,303, 6,6714,52 and 6,079,838, such diffusive devices are typically wide and bulky and are mainly coupled to an additional diffuser layer positioned behind the LCD panel, such that there is no direct coupling between the diffusive devices and the pixels or sub-pixels of the LCD panel.

There is thus a widely recognized need for, and it would be highly advantageous to have a device and method for optical resizing and/or providing backlight illumination, devoid of the above limitations.

SUMMARY OF THE INVENTION

The background art does not teach the use of embedded waveguides to provide optical resizing or for feeding illuminating light to one or more passive display panels. The present embodiments exploit the technology of embedded waveguides to provide backlighting and/or optical resizing in one or two dimension.

Thus, according one aspect of the present invention there is provided an optical resizing device. The device comprises: a first optical resizing element having a plurality of waveguides designed and constructed to provide optical resizing in a first dimension; and a second optical resizing element, having a plurality of waveguides designed and constructed to provide optical resizing in a second dimension. The second optical resizing element is coupled to the first optical resizing element such that light exiting the first optical resizing element enters the second optical resizing element, hence being resized in both the first and the second dimensions. The waveguides of at least one of the first and second optical resizing elements are at least partially tapered.

According to further features in preferred embodiments of the invention described below, the plurality of waveguides of at least one of the first optical resizing element and the second optical resizing element are formed and/or embedded in a substrate in a longitudinally expanding arrangement such as to provide the optical resizing.

According to still further features in the described preferred embodiments the longitudinally expanding arrangement comprises layers of waveguides, each layer being arranged such that the waveguides extend from a first region of the layer to a second region of the layer thereby defining a circumferential boundary within the layer, wherein the length characterizing the circumferential boundary is smaller at the first region than at the second region, such as to provide the optical resizing.

According to another aspect of the present invention there is provided an optical resizing element. The optical resizing element comprises a plurality of layers forming a substrate having a first facet and a second facet being larger than the first facet. Each layer has an arrangement of substantially parallel waveguides formed and/or embedded in the layer and extending from a first region of the layer to a second region of the layer. In this aspect, the layers are arranged in a partially overlapping optical arrangement whereby the second region of each layer is optically exposed at the second facet such as to provide optical resizing in one dimension.

According to still another aspect of the present invention there is provided an optical resizing element. The optical resizing element comprises a substrate formed of at least one layer, each layer has an arrangement of waveguides formed and/or embedded in the layer and extending from a first region of the layer to a second region of the layer thereby defining a circumferential boundary within the layer. The length characterizing the circumferential boundary is smaller at the first region than at the second region, such as to provide optical resizing in one dimension.

The optical devices of the present embodiments can also be used for feeding illuminating light to a passive display panel, include, without limitation, liquid crystal panel. Thus, according to yet another aspect of the present invention there is provided a backlight assembly. The backlight assembly can serve as a component in a passive display apparatus which comprises a passive display panel having a plurality of pixel regions each being defined by at least two sub-pixel positions respectively corresponding to at least two color channels characterizing the pixel region.

The backlight assembly preferably comprises a plurality of waveguides being formed and/or embedded in one or more substrate and arranged to feed illuminating light to each sub-pixel position in a manner such that each pixel region is illuminated by at least two waveguides, wherein each waveguide of the at least two waveguides is disposed to illuminate one sub-pixel position of the pixel region by a respective color channel.

According to further features in preferred embodiments of the invention described below, the passive display apparatus further comprises a light diffuser positioned in front of the passive display panel.

According to still further features in the described preferred embodiments the passive display apparatus further comprises at least one additional passive display panel positioned in front of the passive display panel. The additional passive display panel(s) are designed and configured to increase the extinction ratio of the passive display apparatus.

According to yet another aspect of the present invention there is provided a backlight assembly, which comprises a plurality of waveguides being formed and/or embedded in one or more substrates, where at least one waveguide comprises a light demultiplexer designed and constructed for (i) demultiplexing light propagating in the waveguide into at least two color channels, and (ii) coupling the light into a respective pixel region in a manner such that different sub-pixel positions of the pixel region are illuminated by different color channels of the at least two color channels. According to further features in preferred embodiments of the invention described below, the backlight assembly serves as a component in a passive display apparatus.

According to further features in preferred embodiments of the invention described below, the backlight assembly comprises a plurality of light sources. According to still further features in the described preferred embodiments at least one light source is a light emitting diode. According to still further features in the described preferred embodiments at least one light source is a laser light source.

According to still further features in the described preferred embodiments the light sources are arranged such that at least one waveguide is fed by at one light source.

According to still further features in the described preferred embodiments the light sources are arranged such that at least one waveguide is fed by at least two light sources.

According to still further features in the described preferred embodiments at least a few of the plurality of light sources are configured to provide polarized light. According to still further features in the described preferred embodiments the backlight assembly further comprises a polarizer positioned between the plurality of light sources and the plurality of waveguides such as to polarize light exiting the light sources.

According to still further features in the described preferred embodiments at least one light source comprises a monochrome light source.

According to still further features in the described preferred embodiments at least one waveguide of the plurality of waveguides is disposed in a layer of the backlight assembly, from at least one input region of the layer to at least one output region of the layer, columnwise with respect to the passive display panel.

According to still further features in the described preferred embodiments the waveguides are arranged layerwise in the substrate(s) such that in each layer the waveguides extend from at least one input region of the layer to at least one output region of the layer thereby defining a circumferential boundary within the layer. According to a preferred embodiment of the present invention the length characterizing the circumferential boundary is smaller at the at least one input region than at the at least one output region.

According to still further features in the described preferred embodiments the backlight assembly comprises one or more input substrate and an output substrate, wherein each layer in the input substrate(s) is optically coupled to one layer of the output substrate.

According to still further features in the described preferred embodiments the separation between layers in the output substrate is compatible with the separation between sub-pixels along a column of the passive display panel. Additionally, the separation between waveguides in the output substrate at the output region is preferably compatible with the separation between sub-pixels along a row of the passive display panel.

According to still further features in the described preferred embodiments at least one layer of the output substrate is designed and constructed to emit light received from a respective layer the of the input substrate to a plurality of directions. According to still further features in the described preferred embodiments at least one layer of the input substrate is designed and constructed to emit light to at least two different directions.

According to still further features in the described preferred embodiments the waveguides are arranged layerwise in a partially overlapping optical arrangement within the substrate(s). In this embodiment, each layer preferably comprises waveguides extending from at least one input region of the layer to at least one output region of the layer, whereby the output region is optically exposed to allow emission of light propagating within waveguides of the layer.

According to further features in preferred embodiments of the invention described below, the input region(s) comprise a plurality of sublayers whereby at least a few waveguides are stacked to extend from different sublayers of the at least one input region to form an input facet of the layer.

According to still further features in the described preferred embodiments at least one waveguide is tapered.

According to still further features in the described preferred embodiments the waveguides are arranged in the layer at the input region such that, for each waveguide, a terminal part at the input region is substantially collinear with at least one light path characterizing at least one light source.

According to still further features in the described preferred embodiments the backlight assembly further comprises a plurality of redirecting elements formed in the at least one waveguide and configured for redirecting the light out of the at least one waveguide.

One or more redirecting elements can be a mirror (e.g., total internal reflection mirror, etched mirror, a mirror coated by a high reflective coat, planar mirror, non-planar mirror), a wedge structure (e.g., a diffractive wedge structure), a Bragg reflector or a holographic optical element.

According to still further features in the described preferred embodiments redirecting elements are disposed to illuminate a plurality of sub-pixel positions along a respective column of the passive display panel.

According to still further features in the described preferred embodiments each redirecting element is disposed in the at least one waveguide so as to illumine one sub-pixel position along the column.

According to still further features in the described preferred embodiments at least one redirecting element is disposed in the at least one waveguide so as to illumine at least two sub-pixel positions along the column.

According to still further features in the described preferred embodiments the at least one redirecting element is designed and constructed to redirect a light beam propagating in the at least one waveguide such that a beam diversion of the light beam is higher along the column than perpendicular to the column.

According to still further features in the described preferred embodiments the at least one redirecting element is designed and constructed such that the light beam exclusively impinges on the at least two sub-pixel positions along the column.

According to still further features in the described preferred embodiments the redirecting elements are arranged in a manner such that sub-pixel positions of at least two rows of the passive display panel are illuminated by waveguides of each layer.

According to still further features in the described preferred embodiments at least a few waveguides comprise a core and a cladding, the core having a higher refractive index than the cladding, and the cladding being shaped such that light is focused by the cladding subsequently to the redirection.

According to still further features in the described preferred embodiments at least a few redirecting elements are designed and configured such that at least one waveguide of at least one layer emits light from at least two spaced apart locations. According to still further features in the described preferred embodiments a separation between the at least two spaced apart locations substantially equals an inter-row separation characterizing the passive display panel.

According to still further features in the described preferred embodiments at least one redirecting elements is a partially reflecting element positioned in the waveguide such that a first portion of light propagating in the waveguide is redirected out of the layer, and a second portion of the light propagates in the waveguide through the partially reflecting element.

According to still further features in the described preferred embodiments the substrate(s) of the backlight assembly comprises at least one reflective layer. According to still further features in the described preferred embodiments the reflective layer(s) is characterized by a reflectivity gradient along the waveguides.

According to still further features in the described preferred embodiments each waveguide is designed and constructed such that an illumination area of the waveguide generally equals an area of a sub-pixel position illuminated thereby.

According to still further features in the described preferred embodiments each waveguide is designed and constructed such that an illumination area of the waveguide is substantially smaller than an area of a sub-pixel position illuminated thereby.

According to still further features in the described preferred embodiments the waveguides are arranged such that each sub-pixel position is illuminated by a plurality of waveguides.

According to still further features in the described preferred embodiments each layer is designed and constructed such as to allow emission of light propagating within waveguides of the layer into sub-pixel positions corresponding to a single color channel.

According to still further features in the described preferred embodiments each layer is designed and constructed such as to allow emission of light propagating within waveguides of the layer into sub-pixel positions corresponding to at least two color channels.

According to still further features in the described preferred embodiments at least a few layers of the partially overlapping optical arrangement comprise: (i) waveguides extending from a first input region of the layer to a first output region of the layer, wherein the first output region is optically exposed so as to allow emission of light into sub-pixel positions corresponding to a first color channel; and (ii) waveguides extending from a second input region of the layer to a second output region of the layer, wherein the second output region is optically exposed so as to allow emission of light into sub-pixel positions corresponding to a second color channel.

According to still further features in the described preferred embodiments at least one layer of the partially overlapping optical arrangement comprises a single input region and a single output region. Specifically, the waveguides of this type of layers extend from an input region of the layer to an output region of the layer, wherein the output region is optically exposed so as to allow emission of light into sub-pixel positions corresponding to a third color channel.

According to still further features in the described preferred embodiments the partially overlapping optical arrangement is characterized by an exposure length which is compatible with an inter-column separation characterizing the passive display panel.

According to still further features in the described preferred embodiments the exposure length is selected so as to establish optical communication between the output region and at least two columns of the passive display panel. According to still further features in the described preferred embodiments the separation between waveguides along the output region is compatible with an inter-row separation characterizing the passive display panel.

According to still further features in the described preferred embodiments the backlight assembly or passive display apparatus further comprises a reflective layer positioned so as to reflect ambient light such as to illuminate the passive display panel by the ambient light.

According to still further features in the described preferred embodiments the reflective layer is positioned between the plurality of waveguides and the passive display panel.

According to still further features in the described preferred embodiments the plurality of waveguides is positioned between the reflective layer and the passive display panel.

According to still further features in the described preferred embodiments the input region and the output region are located at opposite sides of the layer.

According to still further features in the described preferred embodiments the input region and the output region are parallel.

According to still further features in the described preferred embodiments the input region and the output region are located at adjacent sides of the layer.

According to still further features in the described preferred embodiments the input region and the output region are substantially orthogonal.

According to still further features in the described preferred embodiments the input region and the output region are located at the same side of the layer.

According to still further features in the described preferred embodiments the input region and the output region are substantially collinear.

According to still further features in the described preferred embodiments the backlight assembly comprises a first facet and a second facet which is larger in size than the first facet, whereby the waveguides of the assembly extend from the first facet to the second facet.

According to further features in preferred embodiments of the invention described below, the first region and the second region are located at opposite sides of the layer.

According to still further features in the described preferred embodiments the first region and the second region are located at adjacent sides of the layer.

According to still further features in the described preferred embodiments first region and the second region are located at the same side of the layer.

According to still further features in the described preferred embodiments the first region and the second region are substantially parallel.

According to still further features in the described preferred embodiments the first region and the second region are substantially orthogonal.

According to still further features in the described preferred embodiments the first region and the second region are substantially collinear.

According to still further features in the described preferred embodiments at least one of the optical resizing elements comprises a slanted layer for providing the optical resizing.

According to still further features in the described preferred embodiments at least one of the optical resizing elements comprises a terrace for providing the optical resizing.

According to still further features in the described preferred embodiments any of the above optical devices, including, without limitation, the (first or second) optical resizing element and the backlight assembly is designed and constructed such that the light enters the optical device while propagating in a first direction and exit the optical device while propagating in the same direction.

According to still further features in the described preferred embodiments any of the above optical device is designed and constructed such that the light enters the optical device while propagating in a first direction and exit the optical device while propagating in a second direction being different from the first direction.

According to still further features in the described preferred embodiments the second facet is substantially parallel to the first facet.

According to still further features in the described preferred embodiments the second facet is substantially orthogonal to the first facet.

According to still further features in the described preferred embodiments the second facet is tilted with respect to the first facet.

According to still further features in the described preferred embodiments the second facet and the first facet are substantially coplanar.

According to still further features in the described preferred embodiments one optical resizing element is constructed and designed to receive light from a plurality of sources and transmitting the light into another optical resizing element.

According to still further features in the described preferred embodiments the device further comprises at least one additional optical resizing element which receives light from at least one additional light source and transmits the light into the second optical resizing element.

According to still further features in the described preferred embodiments the additional light source(s) comprises a monochrome light source.

According to still further features in the described preferred embodiments any of the above optical devices, including, without limitation, the (first or second) optical resizing element and the backlight assembly is designed and constructed to emit light to a plurality of directions. The light can be originated from different sources, in which case each direction is attributed to a different source. The light can also be originated from a single source, another optical resizing element or another substrate of the backlight assembly, in which case the same light is being emitted to a plurality of directions. For example, a single image can be formed on two different facets of the device, and the same backlight assembly can feed illuminating light to more than one passive display panel.

According to still further features in the described preferred embodiments the device further comprises at least one additional optical resizing element positioned at one of the at least two different directions and configured to receive light from the first optical resizing element.

According to still further features in the described preferred embodiments at least one of the optical resizing elements comprises a plurality of partial optical resizing elements whereby each partial optical resizing element is designed and constructed to provide partial optical resizing in a respective dimension.

According to still further features in the described preferred embodiments the device or optical resizing element further comprises a diffusive layer attached to or etched in the second facet.

According to still further features in the described preferred embodiments the device or optical resizing element further comprises an expanding structure.

According to still further features in the described preferred embodiments the expanding structure comprises a holographic optical element.

According to still further features in the described preferred embodiments the expanding structure comprises a stack of layers alternately patterned with high refractive index regions and low refractive index regions.

According to still further features in the described preferred embodiments the expanding structure comprises a stack of layers patterned with grooves.

According to still further features in the described preferred embodiments the expanding structure comprises a stack of layers of tapered waveguides.

According to still further features in the described preferred embodiments the expanding structure comprises mirrors. According to still further features in the described preferred embodiments the mirrors comprise total internal reflection mirrors. According to still further features in the described preferred embodiments the mirrors are coated by high reflection coat.

According to still further features in the described preferred embodiments the expanding structure comprises Bragg reflectors.

According to still further features in the described preferred embodiments at least one optical resizing element is designed and constructed to polarize light.

According to an additional aspect of the present invention there is provided an optical resizing device. The device comprises a plurality of layers forming a substrate having a first facet and a second facet, the plurality of layers being arranged in a partially overlapping optical arrangement. Each layer has an arrangement of waveguides formed and/or embedded in the layer and extending from a first region of the layer to a second region of the layer thereby defining a circumferential boundary within the layer. The length characterizing the circumferential boundary is smaller at the first region than at the second region, and the second region is optically exposed at the second facet.

According to further features in preferred embodiments of the invention described below, the first facet is defined by ends of overlapping regions of the plurality of layers.

According to still further features in the described preferred embodiments each layer is partially exposed at the first facet.

According to still further features in the described preferred embodiments at least a few layers comprise mirrors for redirecting light propagating within the plurality of waveguides out of the layer. According to still further features in the described preferred embodiments at least a portion of the mirrors are total internal reflection mirrors. According to still further features in the described preferred embodiments at least a portion of the mirrors are etched mirrors. According to still further features in the described preferred embodiments at least a portion of the mirrors are coated by a high reflective coat.

According to still further features in the described preferred embodiments at least a portion of the mirrors comprise planar facet.

According to still further features in the described preferred embodiments at least a portion of the mirrors comprise non-planar facet.

According to still further features in the described preferred embodiments at least a few layers comprise Bragg reflectors for redirecting light propagating within the plurality of waveguides out of the layer.

According to still further features in the described preferred embodiments at least a few layers comprise holographic optical elements for redirecting light propagating within the plurality of waveguides out of the layer.

According to still further features in the described preferred embodiments the device is characterized by a field-of-view selected sufficiently small so as to substantially preserve brightness of light being resized by the device.

According to yet an additional aspect of the present invention there is provided a method of manufacturing an optical resizing element. The method comprises: (a) forming on a substrate a plurality of waveguides in an expanding arrangement extending from a first region of the substrate to a second region of the substrate, thereby providing a layer of waveguides; (b) repeating the step (a) a plurality of times, thereby providing a plurality of layers; and (c) stacking the plurality of layers so as to form a first facet, defined by ends of the plurality of layers, and a second facet, defined by an exposed surface of one of the plurality of layers; thereby manufacturing the optical resizing element.

According to still further features in the described preferred embodiments the method further comprises: (d) forming on a substrate a plurality of substantially parallel waveguides extending from a first region of the substrate to a second region of the substrate, thereby providing a layer of waveguides; (e) repeating the step (d) a plurality of times, thereby providing a plurality of layers; (f) stacking the plurality of layers in a partially overlapping optical arrangement whereby the second region of each layer is optically exposed, so as to form a first facet and a second facet, the second facet being defined by optically exposed portion of the plurality of layers; thereby manufacturing a second optical resizing element; and (g) optically coupling the optical resizing element to the second optical resizing element so as to allow propagation of light from the optical resizing element to the second optical resizing element, wherein the light is resized in a first dimension within the optical resizing element and in a second dimension within the second optical resizing element.

According to still an additional aspect of the present invention there is provided a method of manufacturing a plurality of optical resizing elements. The method comprises: (a) forming on a substrate a plurality of waveguides extending from a first region of the substrate to a second region of the substrate, thereby providing a layer of waveguides; (b) repeating the step (a) a plurality of times, thereby providing a plurality of layers; (c) stacking the plurality of layers so as to provide a stack; and (d) performing at least one cut to the stack so as to provide a plurality of optical resizing elements.

According to a further aspect of the present invention there is provided a method of manufacturing an optical resizing element. The method comprises: (a) forming on a substrate a plurality of parallel waveguides extending from a first region of the substrate to a second region of the substrate, thereby providing a layer of waveguides; (b) repeating the step (a) a plurality of times, thereby providing a plurality of layers; and (c) stacking the plurality of layers in a partially overlapping optical arrangement whereby the second region of each layer is optically exposed, so as to form a first facet and a second facet, the second facet being defined by optically exposed portion of the plurality of layers; thereby manufacturing the optical resizing element.

According to still further features in the described preferred embodiments the method further comprises: (d) repeating the steps (b)-(c) so as to form a second optical resizing element; and (e) optically coupling the optical resizing element to the second optical resizing element so as to allow propagation of light from the optical resizing element to the second optical resizing element, wherein the light is resized in a first dimension within the optical resizing element and in a second dimension within the second optical resizing element.

According to yet a further aspect of the present invention there is provided a method of manufacturing an optical resizing device. The method comprises: (a) forming on a substrate a plurality of waveguides extending from a first region of the substrate to a second region of the substrate thereby defining a circumferential boundary within the substrate, wherein the length characterizing the circumferential boundary is smaller at the first region than at the second region; (b) repeating the step (a) a plurality of times, thereby providing a plurality of layers; and (c) stacking the plurality of layers in a partially overlapping optical arrangement whereby the second region of each layer is optically exposed, so as to form a first facet and a second facet, the second facet being defined by optically exposed portion of the plurality of layers, thereby manufacturing the optical resizing device.

According to still further features in the described preferred embodiments the method further comprises positioning mirrors for redirecting light propagating within the plurality of waveguides out of the substrate.

According to still further features in the described preferred embodiments the method further comprises cutting the layers, subsequently to the step of stacking the layers, so as to form at least one of the first facet and the second facet.

According to still further features in the described preferred embodiments the method the cutting is performed such that at least one facet is slanted.

According to still further features in the described preferred embodiments the method further comprises cutting the plurality of layers, prior to the step of stacking the layers, so as to form, for each layer, a layer end exposing a plurality of waveguides ends.

According to still further features in the described preferred embodiments the method further comprises depositing a polarizer on at least a portion of the layers, prior to the step of stacking the layers.

According to still further features in the described preferred embodiments the method further comprises coupling at least one facet to a coupler. According to still further features in the described preferred embodiments the coupler comprises a microlens array.

According to still further features in the described preferred embodiments the method further comprises etching at least one facet so as to form a microlens array on the facet.

According to still further features in the described preferred embodiments at least a few of the waveguides are tapered or partially tapered.

According to still further features in the described preferred embodiments the tapering is characterized by a smooth profile.

According to still further features in the described preferred embodiments the tapering is characterized by a substantially stepped profile.

According to still further features in the described preferred embodiments the plurality of layers are partially exposed at the second facet.

According to still further features in the described preferred embodiments at least a few of the plurality of waveguides form a planar light circuit.

According to still further features in the described preferred embodiments at least a few of the plurality of waveguides form an optical fibers array.

According to still further features in the described preferred embodiments at least a few of the plurality of waveguides are single mode waveguides.

According to still further features in the described preferred embodiments the waveguides are multimode waveguides.

According to still further features in the described preferred embodiments the optical resizing device or element further comprises light absorbers introduced between cores of the waveguides.

According to still further features in the described preferred embodiments at least a few waveguides comprise a core and a cladding the core having a higher refractive index than the cladding.

According to still further features in the described preferred embodiments at least a few waveguides comprise photonic bandgap material.

According to still further features in the described preferred embodiments the optical resizing device or element further comprises a microlens array for coupling the light into the optical resizing device or optical resizing element.

According to still further features in the described preferred embodiments the optical resizing device or element further comprises at least one fiber bundle for coupling the light into the optical resizing device or element.

According to still further features in the described preferred embodiments the optical resizing device or element are flexible.

According to still further features in the described preferred embodiments the optical resizing device or element are foldable.

According to still further features in the described preferred embodiments the optical resizing device or element serves as a component in a display system.

According to still further features in the described preferred embodiments the optical resizing device or element serves as a component in a autostereoscopic display system.

According to still further a further aspect of the present invention there is provided a method of resizing a spot of light, comprising, transmitting the light through the optical resizing device of any of the preceding aspects or features.

According to still further features in the described preferred embodiments the method further comprising distorting the spot of light such as to provide a brightness gradient there across thereby compensating non homogenous optical losses.

According to still further features in the described preferred embodiments the method wherein the light constitutes an image.

According to still further features in the described preferred embodiments the method further comprising distorting the image such as to provide a brightness gradient there across thereby compensating non homogenous optical losses.

The present invention successfully addresses the shortcomings of the presently known configurations by providing an optical resizing element, optical resizing device and method enjoying properties far exceeding the prior art.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a-2b are schematic illustrations of prior art techniques for manufacturing fiber based guided magnifiers.

Figure 1A:
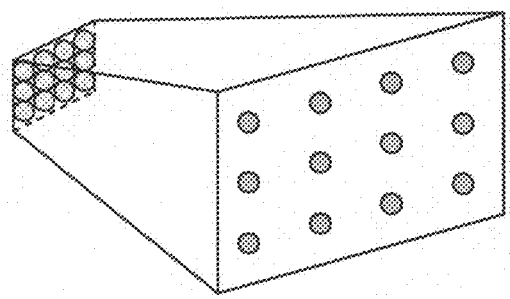
Figure 1B:
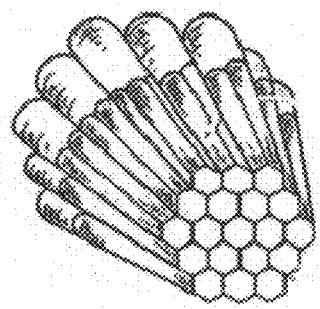
Figure 1C:
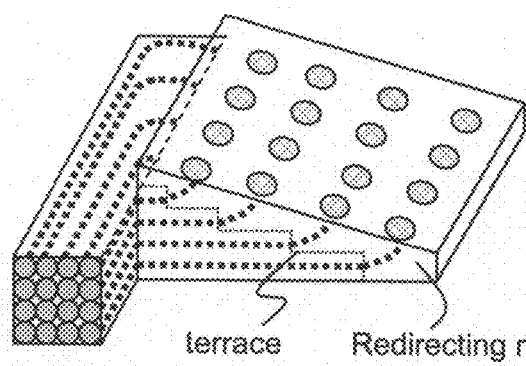
Figures 2A, 2B:
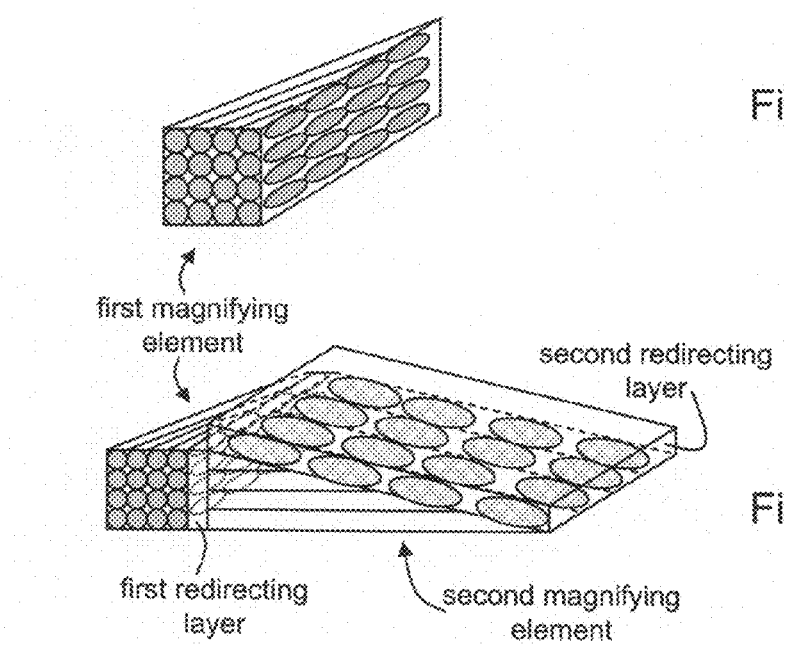
Figure 3A:
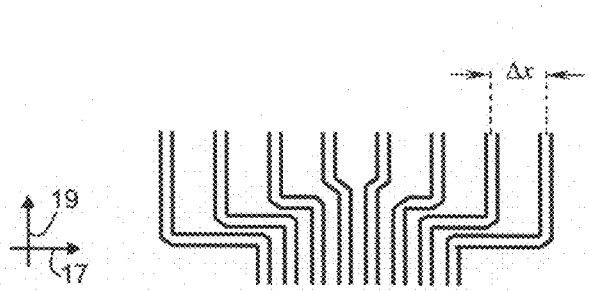
Figure 3B:
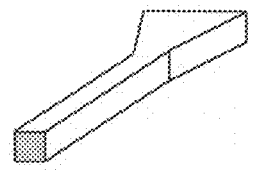
Figure 3C:
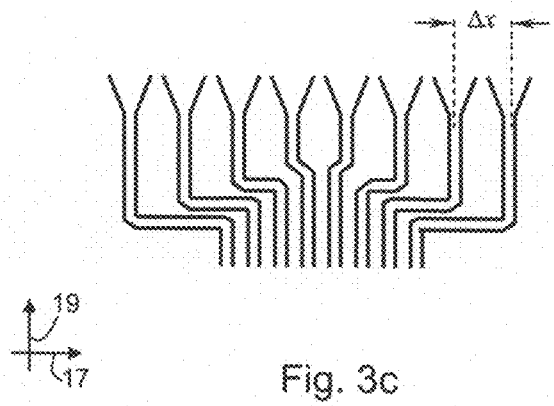

FIGS. 3a-c are schematic illustrations of a longitudinally expanding arrangement of waveguides (FIG. 3a), a partially tapered waveguide (FIG. 3b) and a longitudinally expanding arrangement of partially tapered waveguides (FIG. 3c), according to various exemplary embodiments of the present invention.

Figure 3D:
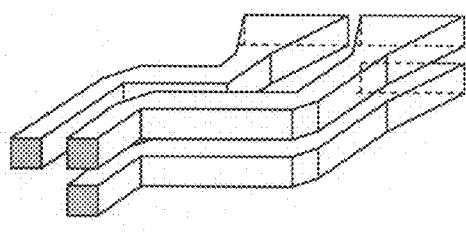

FIG. 3d is a schematic illustration of the embodiment of FIG. 3c with more than one layer.

FIGS. 4a-i are schematic illustrations of an optical resizing element, in various exemplary embodiments of the invention.

Figure 5:
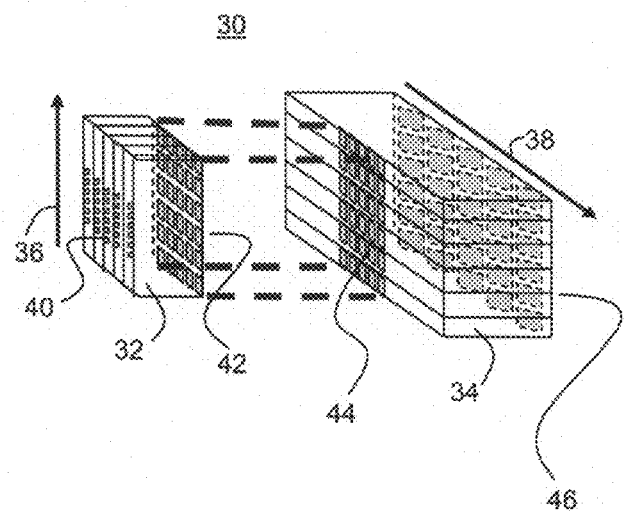

FIG. 5 is a schematic illustration of an optical resizing device having two optical resizing elements, in various exemplary embodiments of the invention.

Figure 6A:
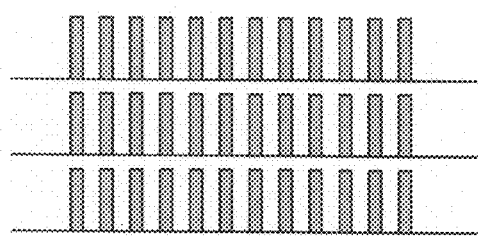

FIG. 6a is a schematic illustration of a small facet of a receiving optical resizing element, in various exemplary embodiments of the invention.

Figure 6B:
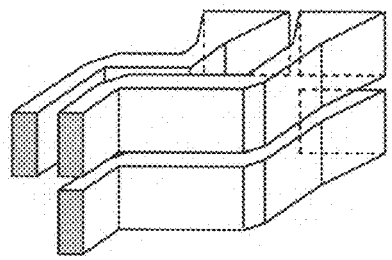

FIG. 6b is a three-dimensional illustration of the waveguides of the element of FIG. 6a, in various exemplary embodiments of the invention.

Figure 7A:
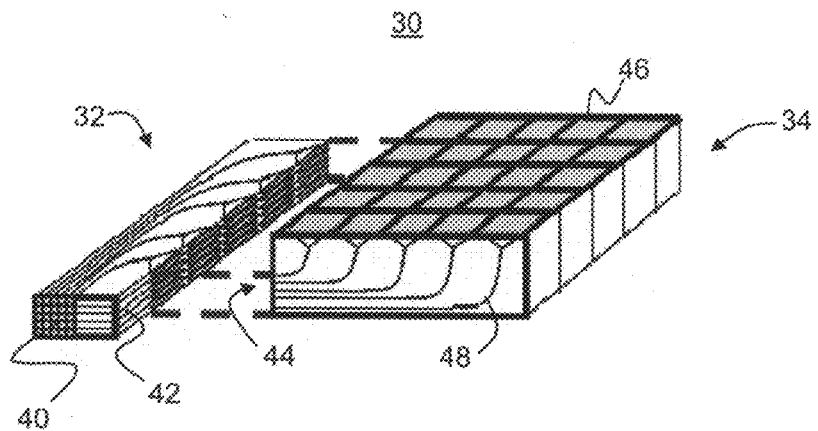

FIG. 7a is a three-dimensional schematic illustration of the device in the embodiment in which the entry and exit facets of each optical resizing element are substantially orthogonal to each other.

Figure 7B:
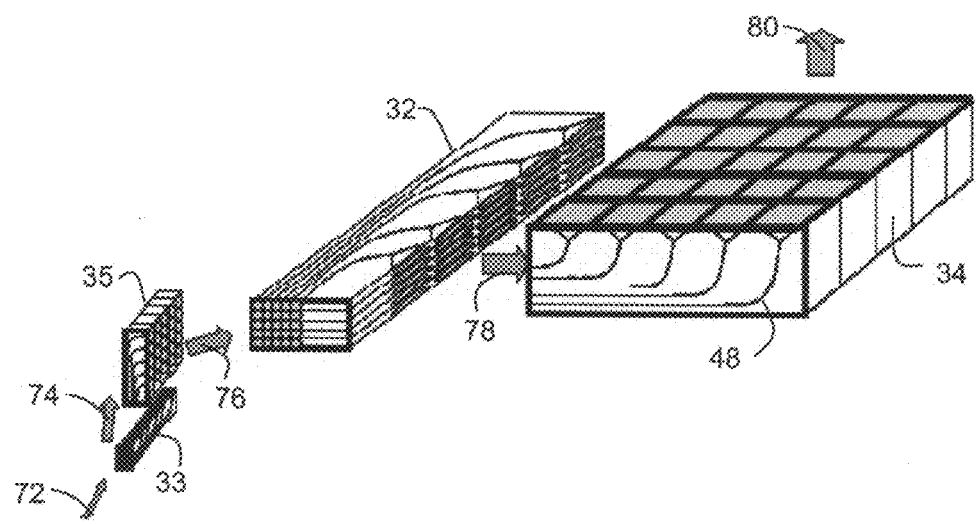

FIG. 7b is a three-dimensional schematic illustration of the device on FIG. 7a, in a preferred embodiment in which two pairs of optical resizing elements are employed.

Figure 8:
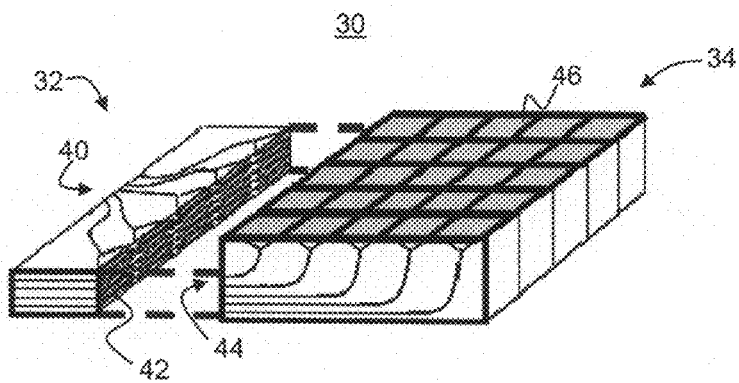

FIG. 8 is a schematic illustration of the device in a preferred embodiment in which the facets of one optical resizing element are substantially parallel and the facets of the other optical resizing element are substantially orthogonal.

Figure 9:
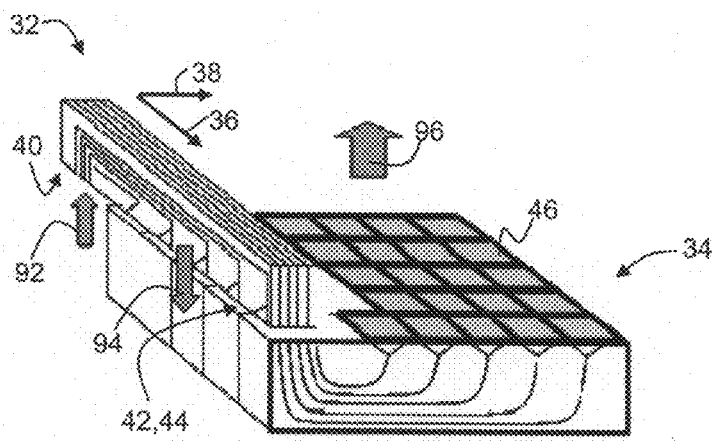

FIG. 9 is a schematic illustration of device in a preferred embodiment in which the facets of the optical resizing elements are substantially coplanar.

FIGS. 10a-b are schematic illustrations of a photomask layout for manufacturing an arrangement of waveguides, according to various exemplary embodiments of the present invention.

FIGS. 11a-b are schematic illustrations of process for manufacturing waveguides which are tapered both vertically and laterally.

Figure 13A:
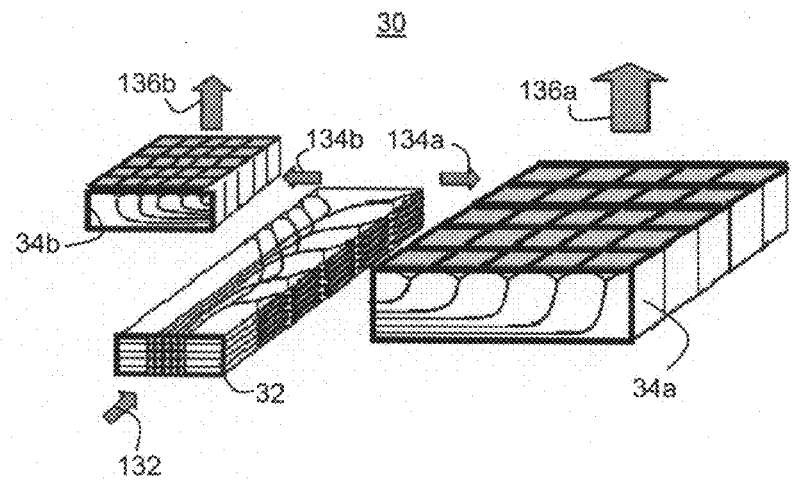
Figure 13B:
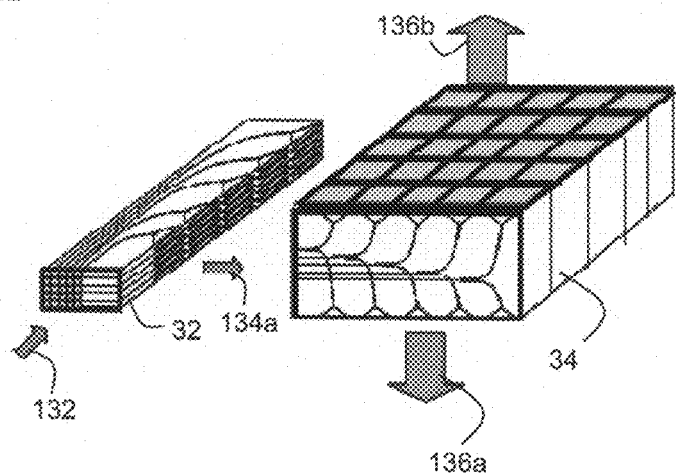
Figure 13C:
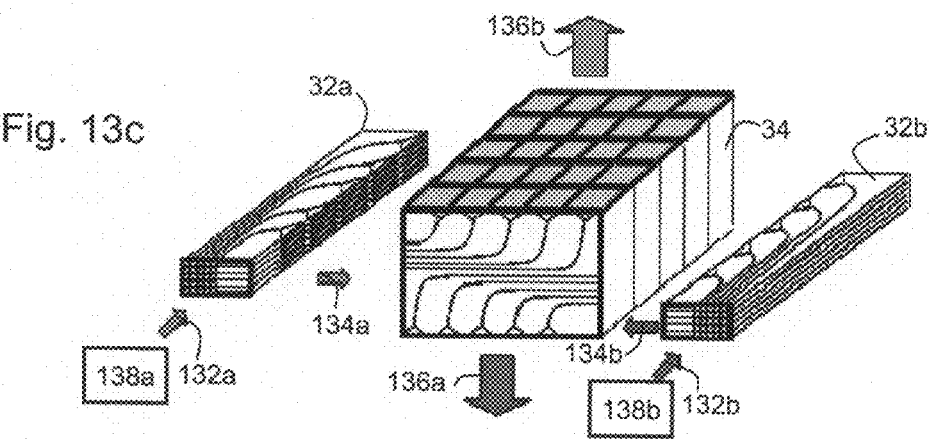

FIGS. 12a-f are schematic illustrations of an optical resizing device in preferred embodiments in which a plurality of light sources are employed;

FIGS. 13a-c are schematic illustrations of the device in preferred embodiments in which there is more than one optical output from the device.

Figure 14A:
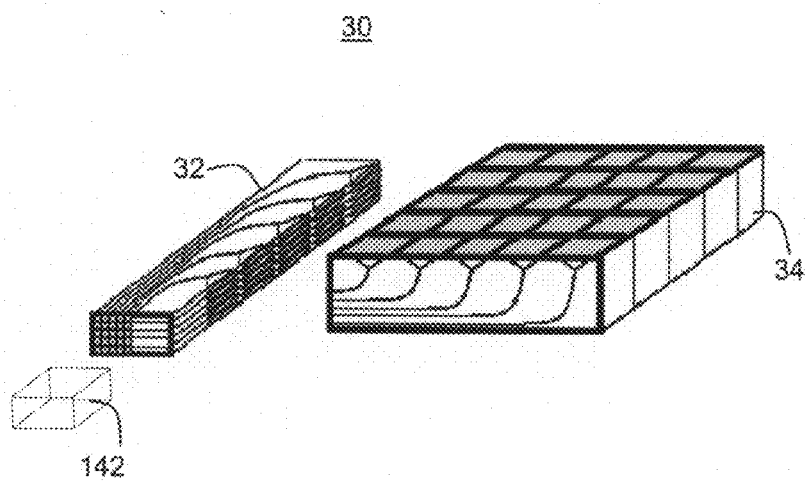
Figure 14B:
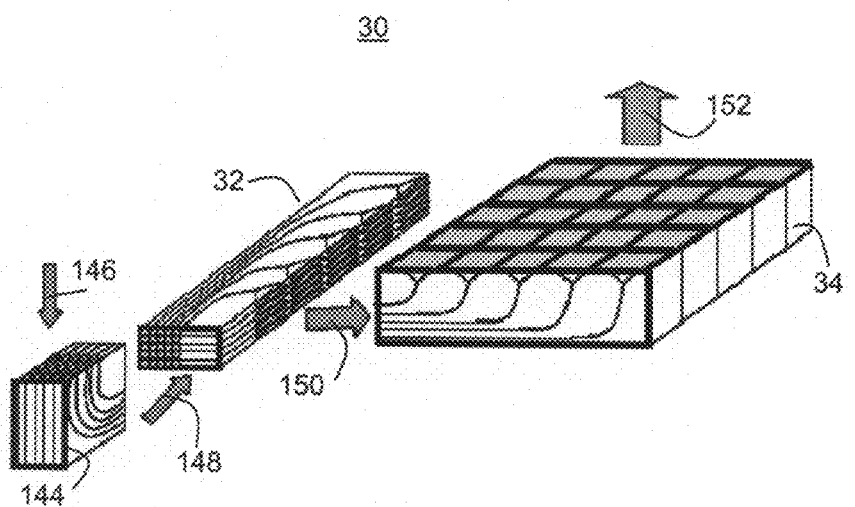

FIGS. 14a-b are schematic illustrations of the device in preferred embodiments in which the device comprises one or more additional optical elements.

Figure 15:
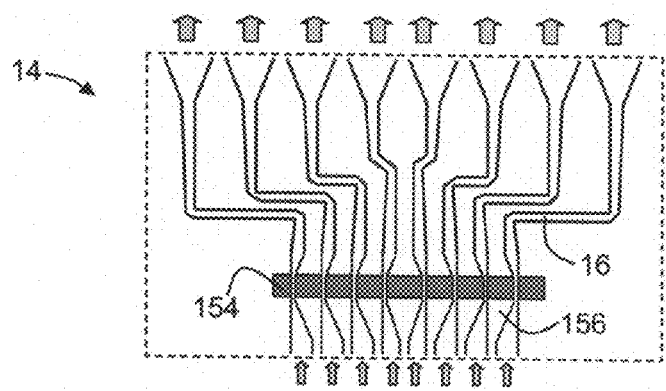

FIG. 15 is a schematic illustration of a layer of the optical resizing element in a preferred embodiment in which the layer comprises a polarizer.

Figure 16A:
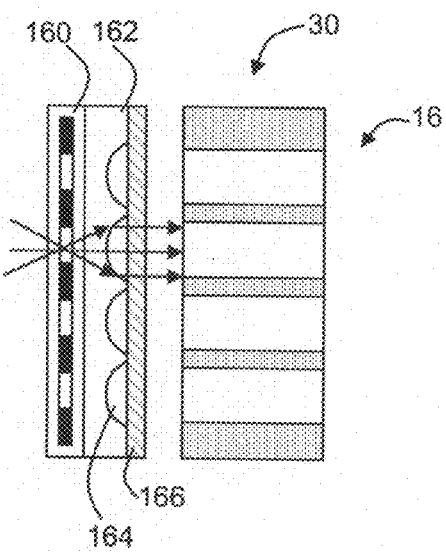
Figure 16B:
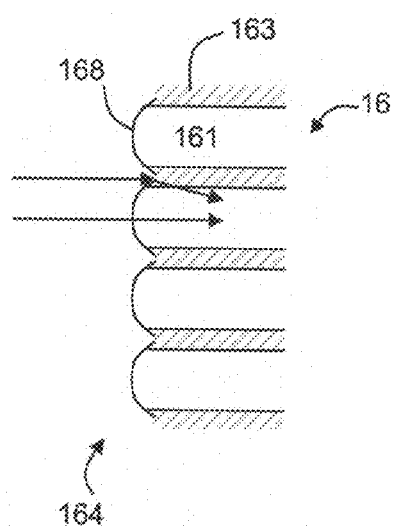

FIGS. 16a-b are schematic illustrations of the coupling between the device and a light source, in the preferred embodiment in which the light source is an image source.

Figure 17:
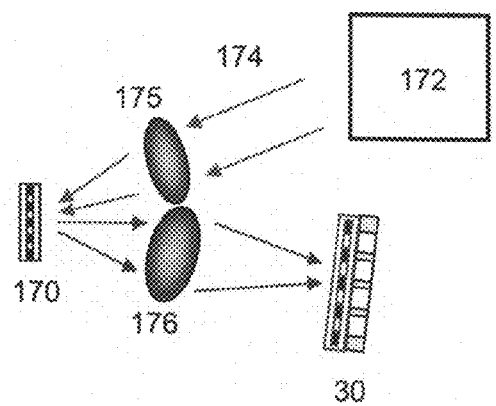

FIG. 17 is a schematic illustration of a preferred embodiment in which an input image is focused on device using a lens.

Figure 18A:
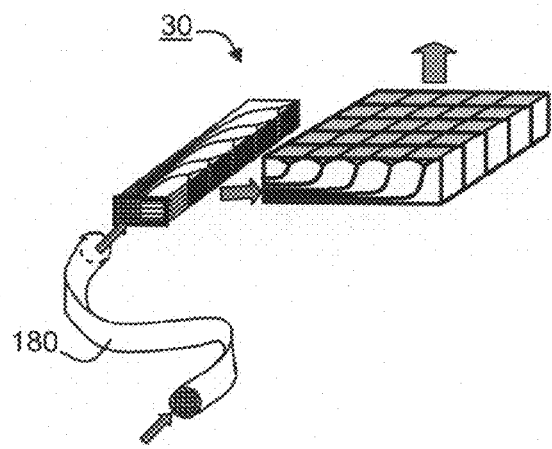
Figure 18B:
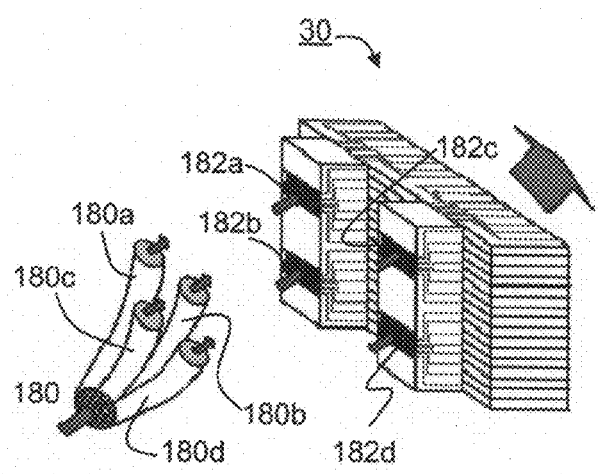

FIGS. 18a-b are schematic illustrations of the coupling between the device and a light source, in the preferred embodiment one or more fiber bundles are employed.

Figure 19:
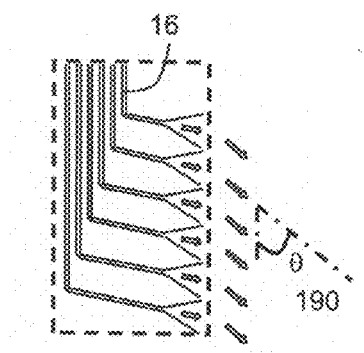

FIG. 19 is a schematic illustration of one layer of the optical resizing element in a preferred embodiment in which the waveguides are tilted with respect to the layer's end.

FIGS. 20, 21a-d and 22a-f are schematic illustrations of an optical resizing device, in preferred embodiments in which the device is manufactured according to the principle of partially overlapping optical arrangement.

Figure 20:
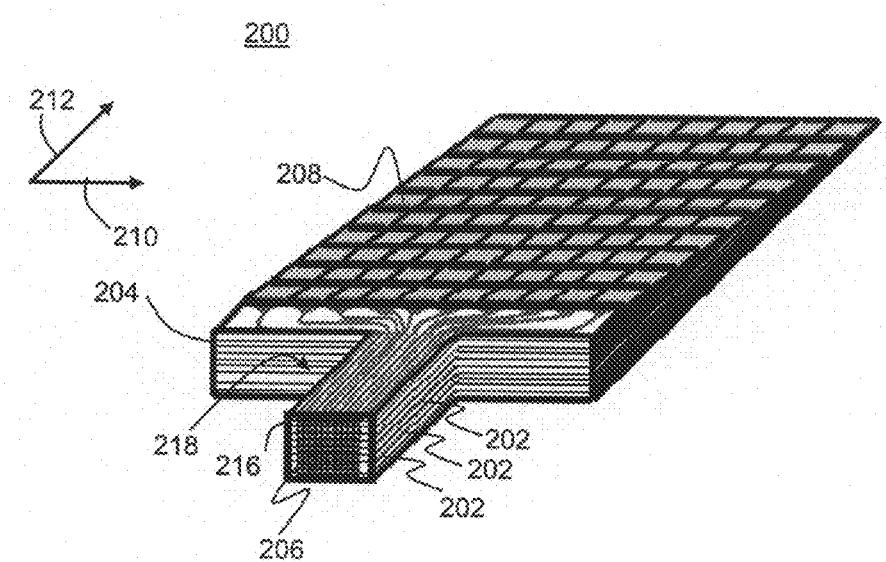

FIGS. 23a-b are schematic illustrations of a side view (FIG. 23a) and a top view (FIG. 23b) of a portion of a facet of device similar to the device of FIG. 20-22 in a preferred embodiment in which the facet has a two-dimensional stepped shape.

FIGS. 23c-d are schematic illustrations of mirror shapes, according to various exemplary embodiments of the present invention.

FIGS. 24a-e are schematic illustrations of a side view of an optical resizing element with a two-dimensional stepped or slanted profile, according to various exemplary embodiments of the present invention.

Figure 25:
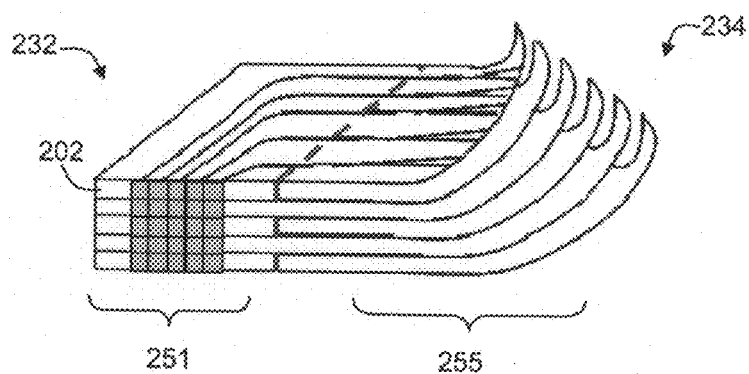

FIG. 25 is a schematic illustration of a foldable optical resizing device, according to a preferred embodiment of the present invention.

Figure 26A:
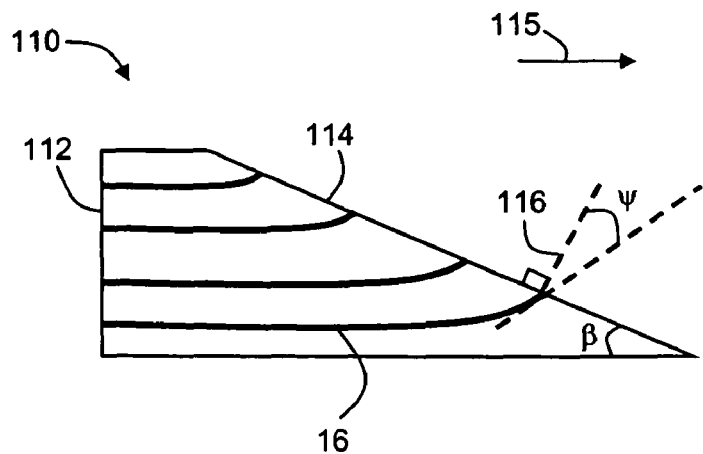
Figure 26B:
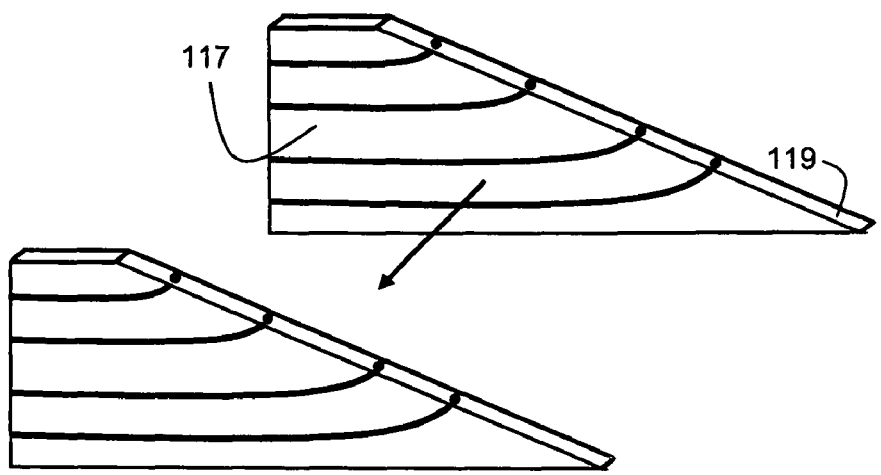

FIGS. 26a-b is a schematic illustration of configurations in which light is coupled out from the device via an arrangement of transmitting elements, according to various exemplary embodiments of the present invention.

Figure 27A:
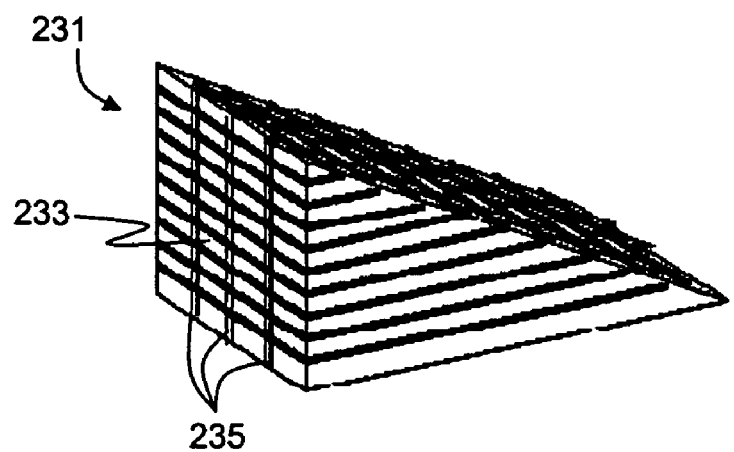
Figure 27B:
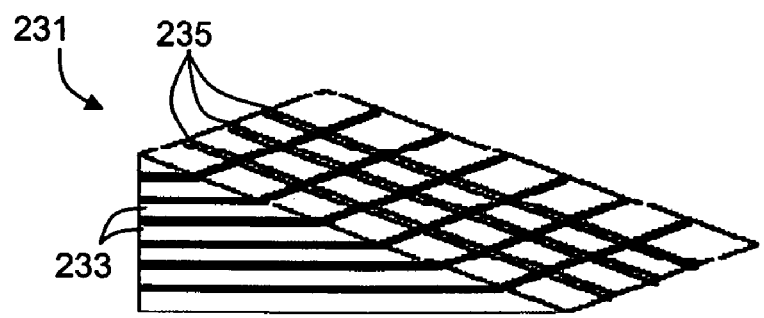

FIGS. 27a-b are schematic illustrations of process for manufacturing slanted optical resizing element, in various exemplary embodiments of the invention.

FIGS. 27c-h are schematic illustrations of an expanding structure, according to various exemplary embodiments of the present invention.

Figure 28A:
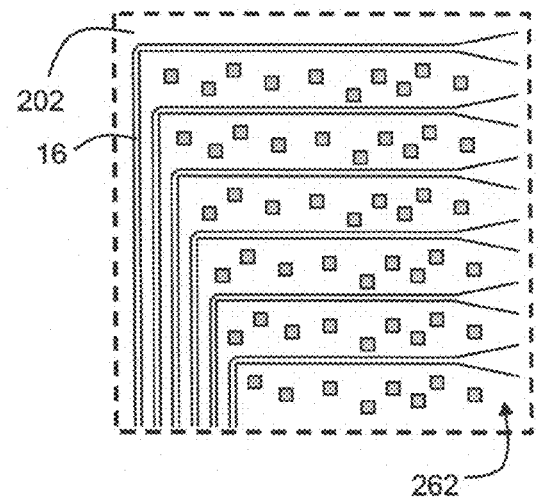
Figure 28B:
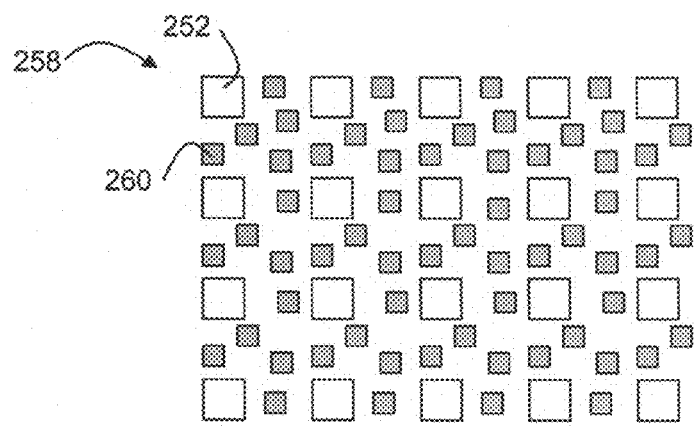
Figure 28C:
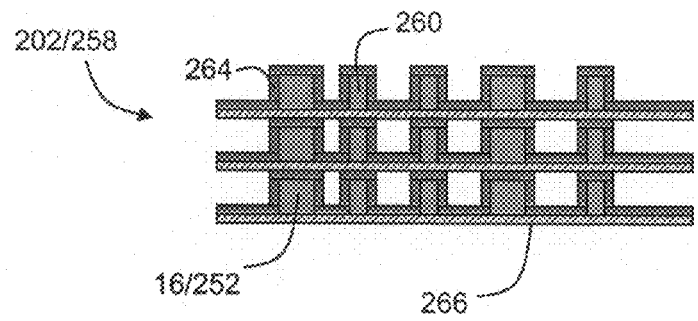

FIGS. 28a-c are schematic illustrations of a top view (FIGS. 28a-b) and a side view (FIG. 28c) of layers of a device similar to the device of FIG. 20-22 in a preferred embodiment in which the layers are low-weight layers.

FIGS. 29a-e are schematic illustrations of a preferred folding technique for manufacturing a device similar to the device of FIG. 20-22, according to various exemplary embodiments of the present invention.

Figure 30A:
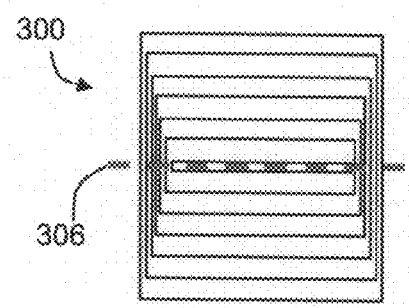
Figure 30B:
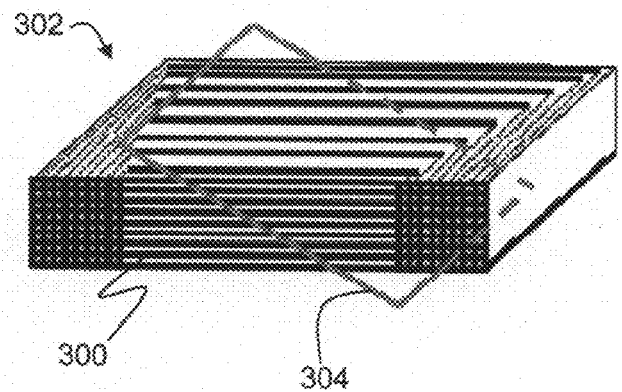

FIGS. 30a-b are schematic illustrations of a simultaneous process for manufacturing a plurality of optical resizing elements, in various exemplary embodiments of the invention.

FIG. 31 is a schematic illustration of a device similar to the device of FIG. 20-22 in a preferred embodiment in which the device receives light from a plurality of sources.

FIGS. 32a-b are schematic illustrations of a top view (FIG. 32a) and a cross sectional view (FIG. 32b) of a device similar to the device of FIG. 20-22 in a preferred embodiment in which the device receives optical input in the form of a plurality of monochromatic light sources.

Figure 33A:
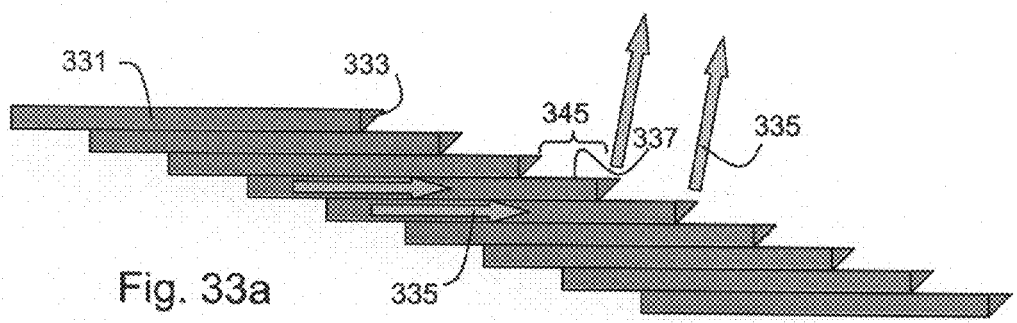
Figure 33B:
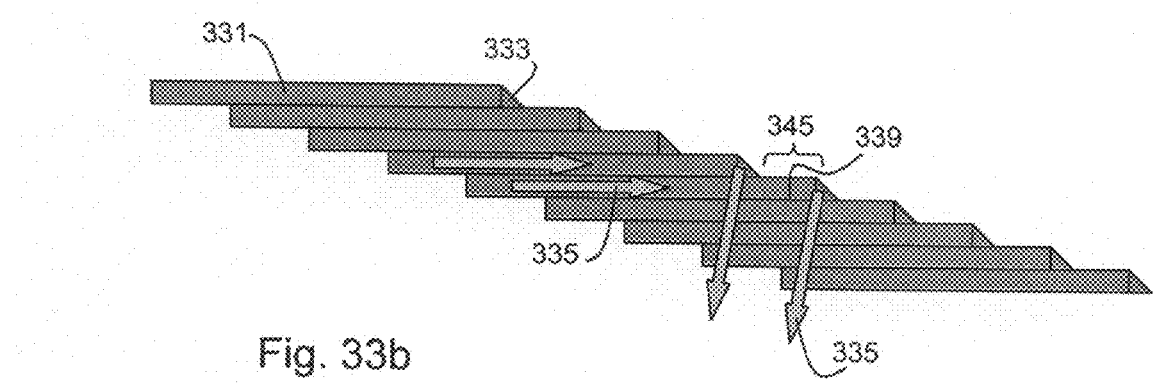
Figure 33C:
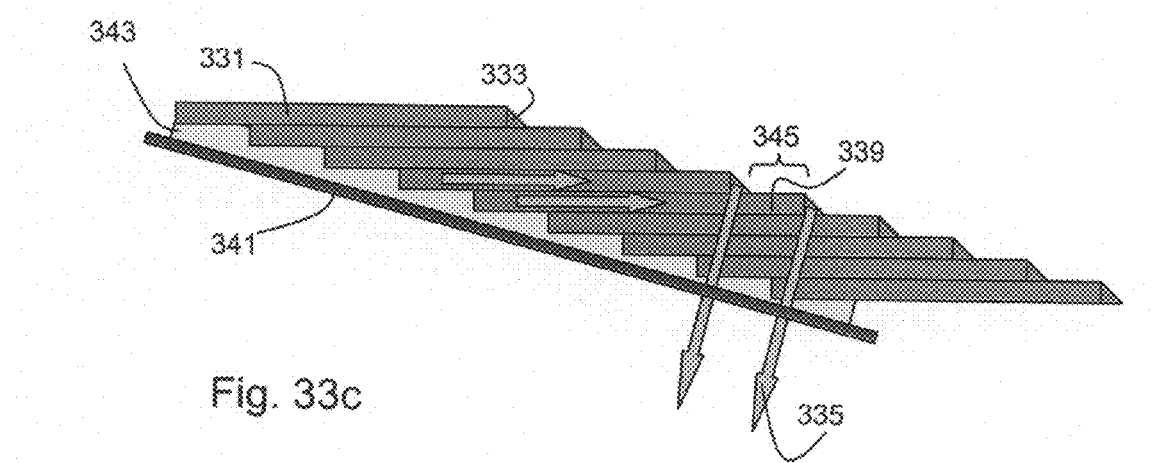

FIGS. 33a-c are schematic illustration of techniques for coupling light out of the layers of a device similar to the device of FIG. 20-22, according to various exemplary embodiments of the present invention.

FIGS. 34a-35c are schematic illustrations of a device similar to the device of FIG. 20-22 in a preferred embodiment in which the device is used to provide an autostereoscopic image.

Figure 36:
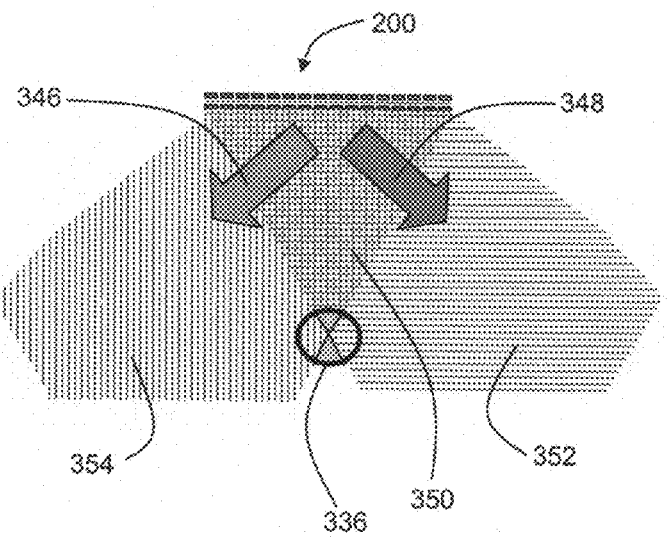

FIG. 36 is a schematic illustration of different optical regions in the field-of-view of a device similar to the device of FIGS. 34a-35c.

Figure 37A:
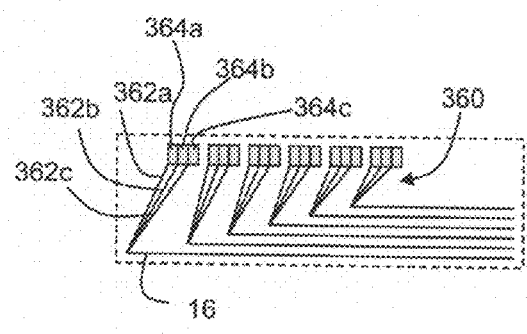
Figure 37B:
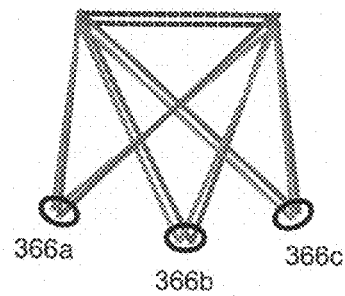

FIGS. 37a-b are schematic illustrations of one layer (FIG. 37a) and the resulting field-of-view (FIG. 37b) in the preferred embodiment in which a plurality of autostereoscopic images are provided.

Figure 38:
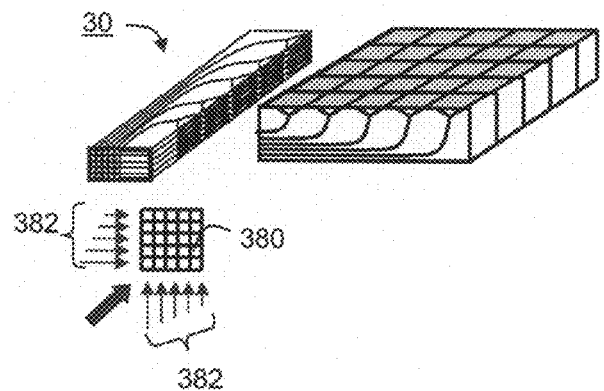

FIG. 38 is a schematic illustration of the optical resizing device in a preferred embodiment in which the input image has a non uniform brightness so as to compensate differential waveguide losses.

Figure 39A:
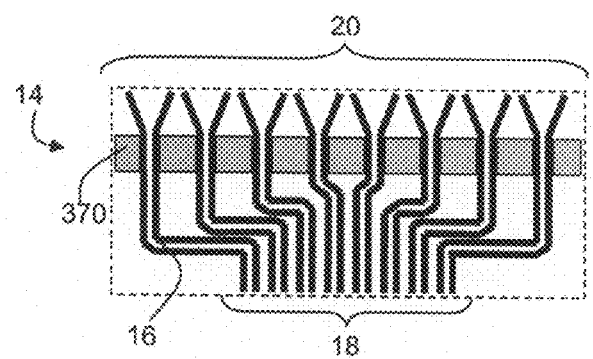

FIG. 39a is a schematic illustration of a layer of the optical resizing element in a preferred embodiment in which the layer comprises light absorbers.

Figure 39B:
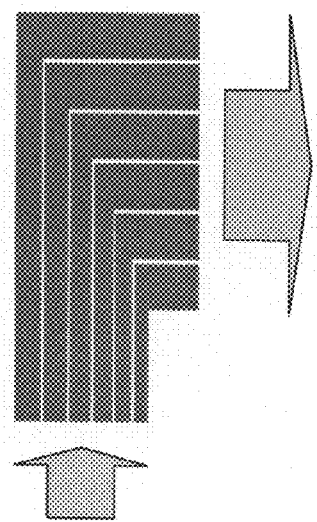

FIG. 39b is a schematic illustration of waveguides with variable cross-sections, according to a preferred embodiment of the present invention.

Figure 40:
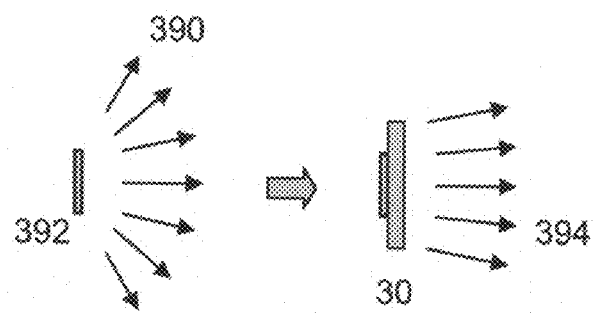

FIG. 40 is a schematic illustration a procedure for improving the brightness of the output light, in various exemplary embodiments of the invention.

Figure 41:
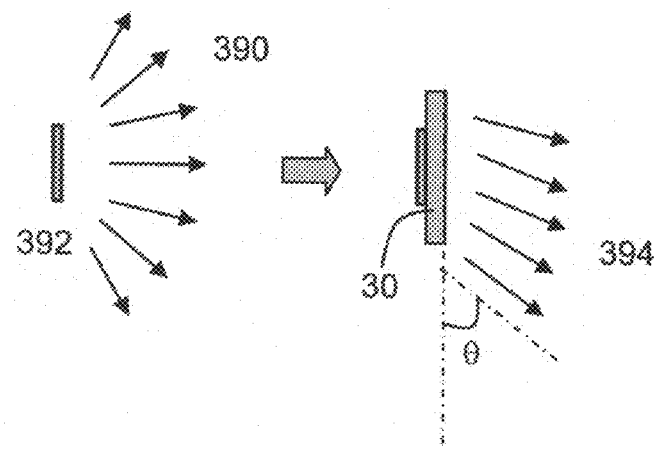

FIG. 41 is a schematic illustration of a procedure for modifying the field-of-view of the device, in various exemplary embodiments of the invention.

Figure 42A:
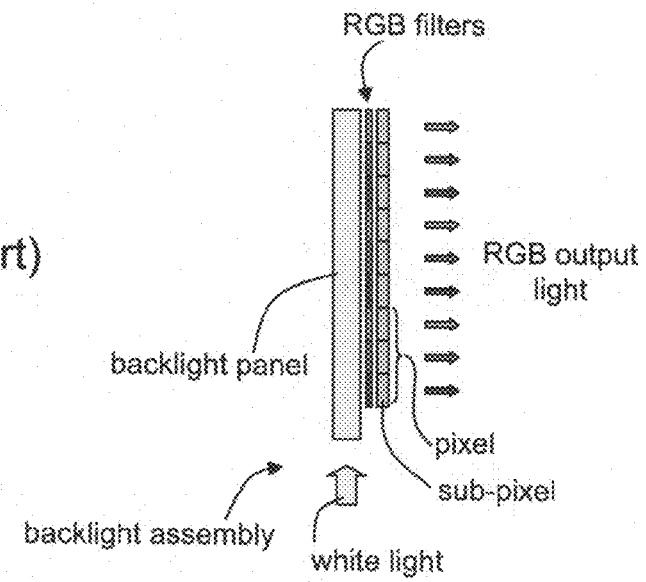

FIG. 42a is a schematic illustration of a conventional edge illuminated LCD device.

Figure 42B:
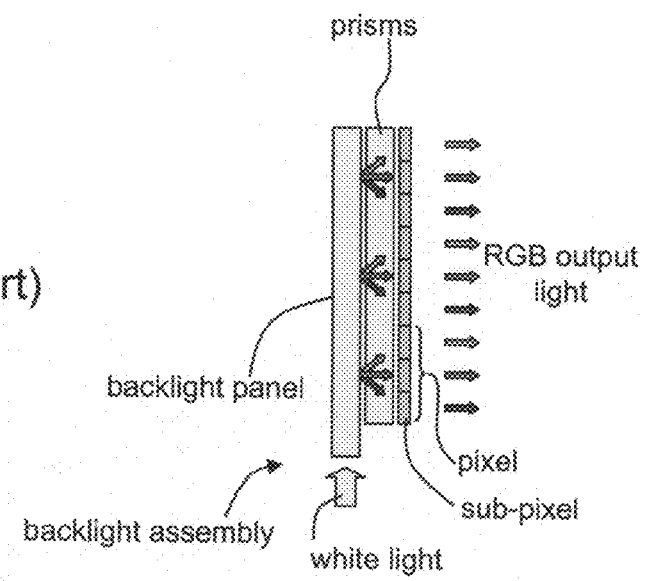
Figure 42C:
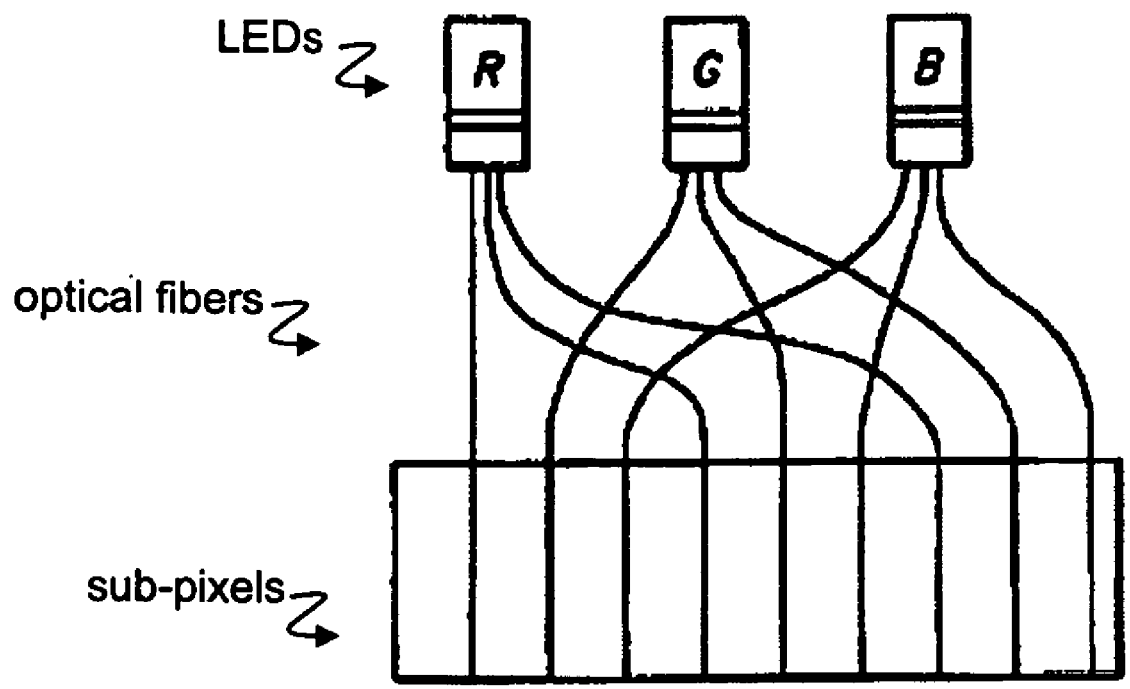

FIGS. 42b-c are schematic illustrations of backlighting techniques designed to overcome intrinsic ⅔ power loss.

FIGS. 43a-c are schematic illustrations of a display apparatus employing one or more of the optical element of the present embodiments.

Figure 44A:
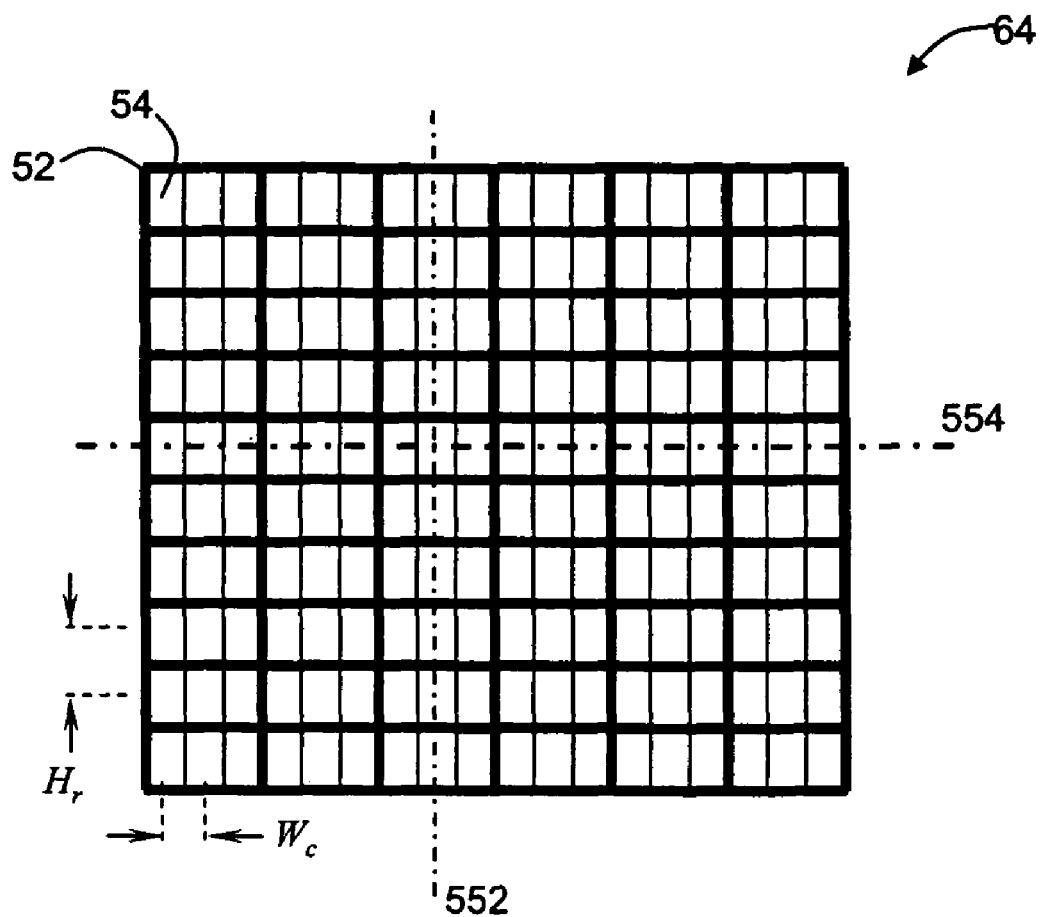
Figure 44B:
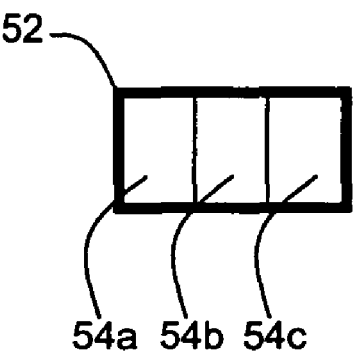
Figure 44C:
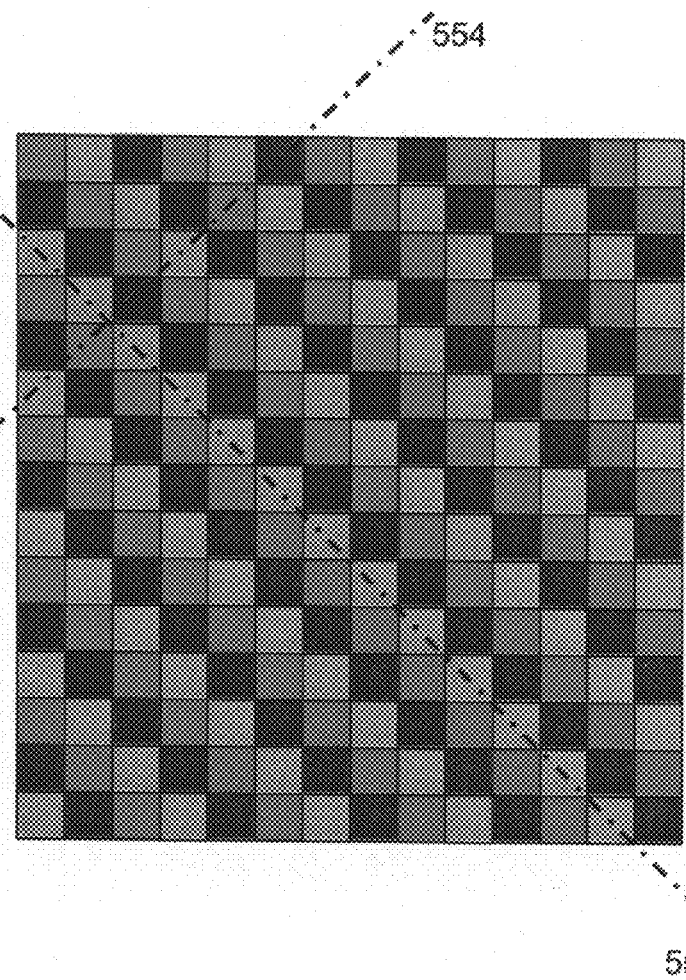

FIGS. 44a-c are schematic illustrations of a passive display panels (FIGS. 44a and 44c) and a pixel region thereof (FIG. 44b).

Figure 45:
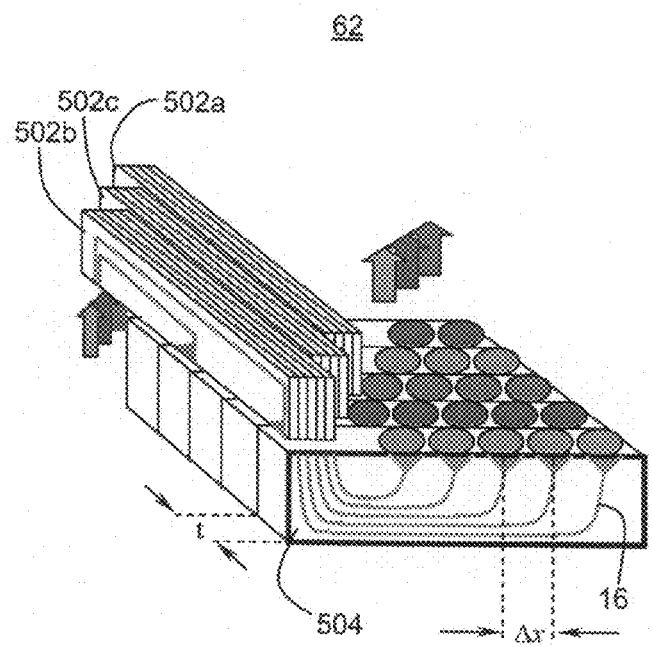

FIG. 45 is a schematic illustration of a backlight assembly, according to various exemplary embodiments of the present invention.

Figure 46A:
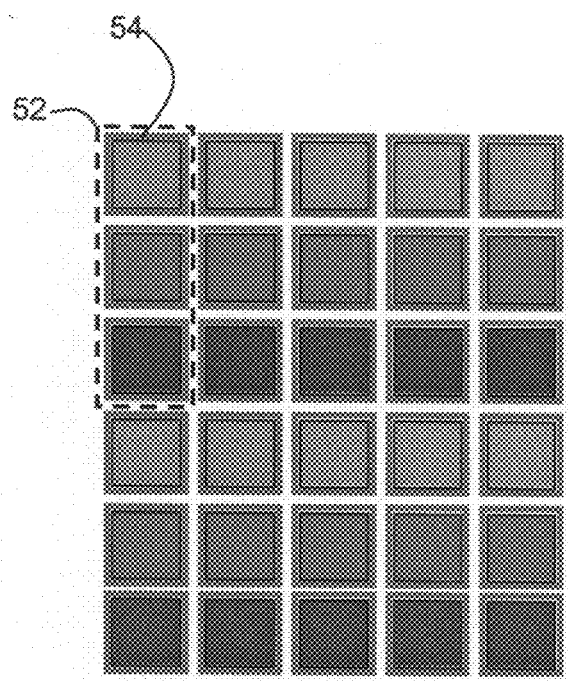
Figure 46B:
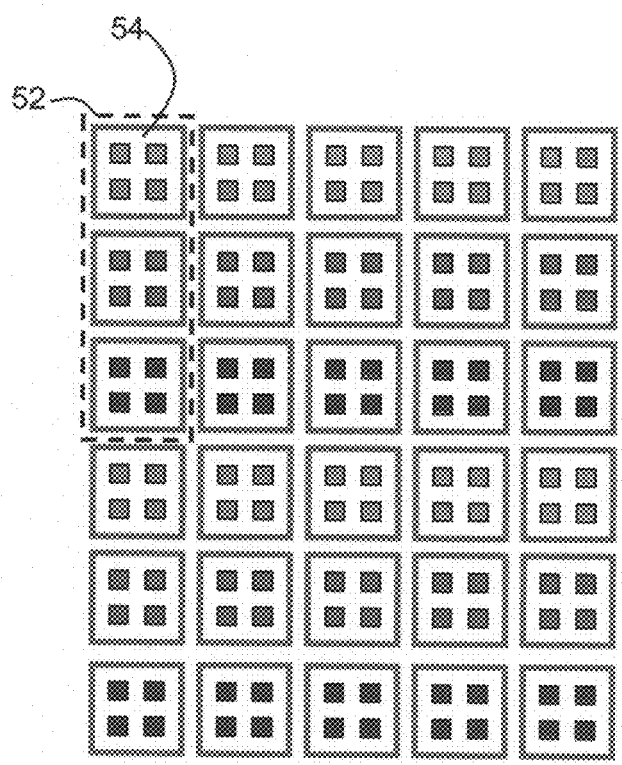

FIGS. 46a-b are schematic illustrations of color distributions of backlight illumination provided by the backlight assembly to a passive display panel, according to various exemplary embodiments of the present invention.

Figure 47A:
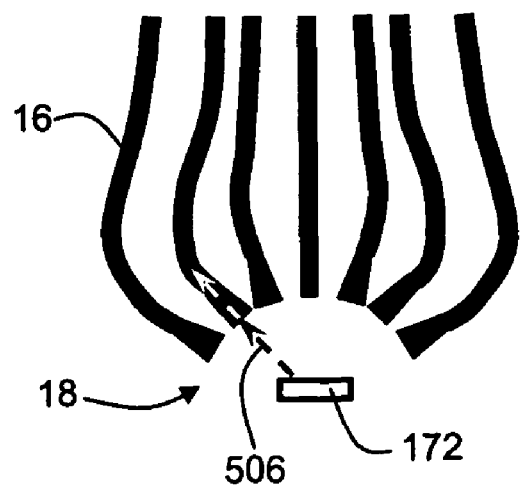
Figure 47B:
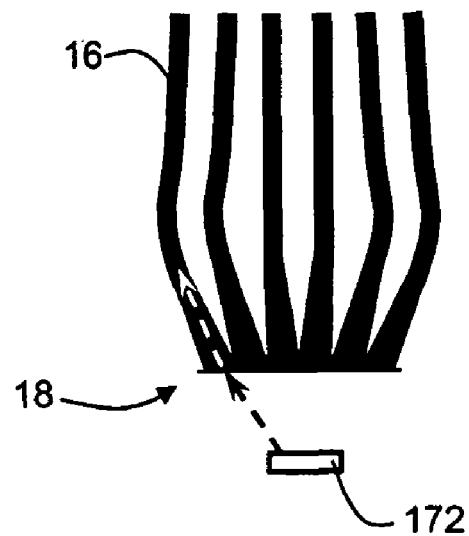

FIGS. 47a-b are schematic illustrations of preferred techniques for coupling the light to the backlight assembly, according to which the waveguides are arranged in each layer such that the terminal part of each waveguide is substantially collinear with at least one light path characterizing the light source.

FIGS. 48a-e are schematic illustrations of techniques for redirecting light out of a waveguide, according to various exemplary embodiments of the present invention.

Figure 49A:
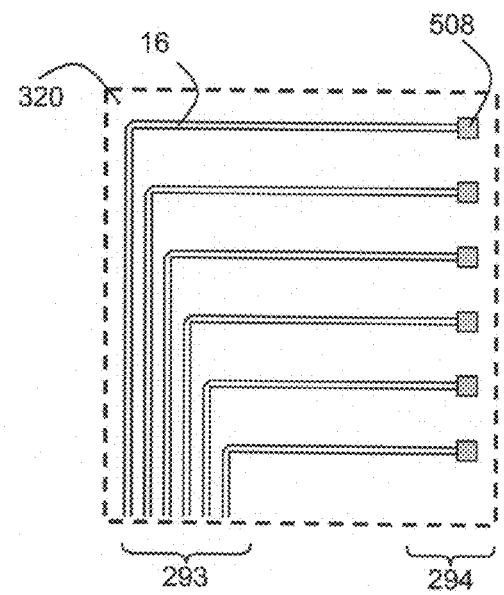
Figure 49B:
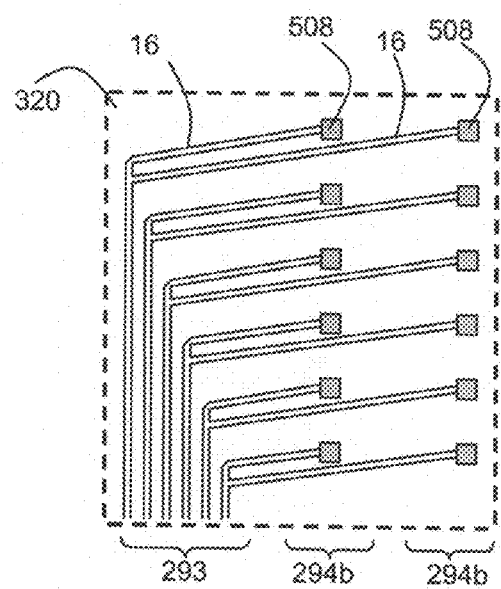

FIGS. 49a-b are schematic illustrations of preferred layer designs for configuration in which the waveguides of the layer illuminate one (FIG. 49a) and two (FIG. 49b) sub-pixels per row.

Figure 50:
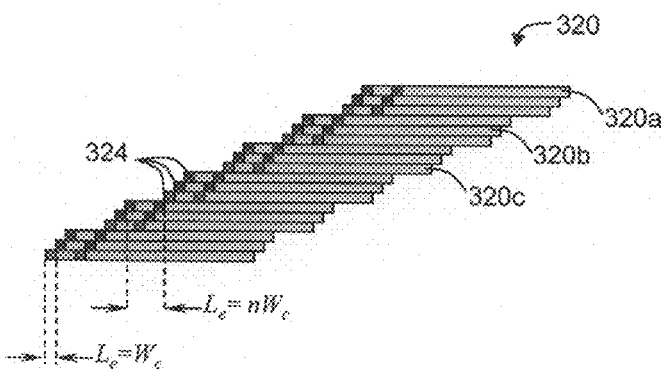

FIG. 50 schematically illustrates a side view of a stack of layers of the type illustrated in FIG. 49b.

Figure 51:
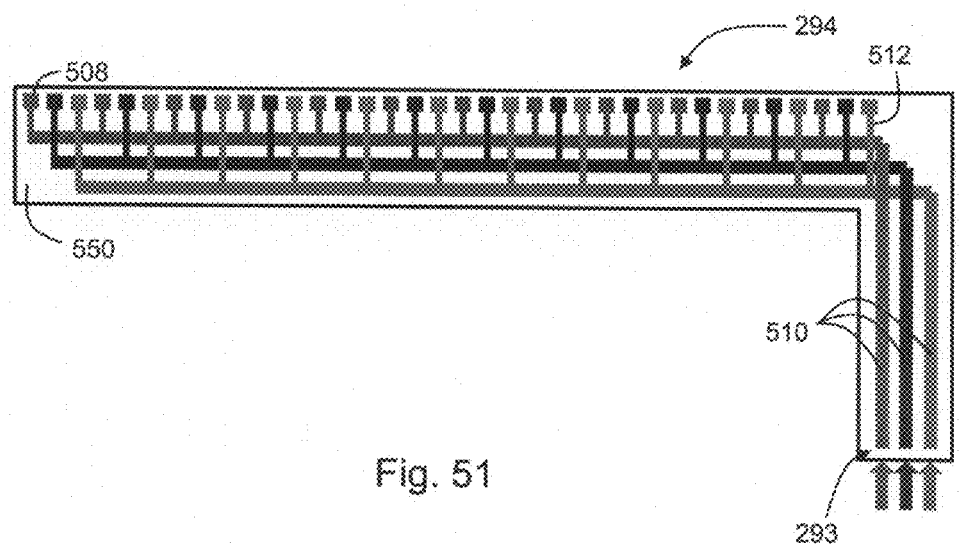

FIG. 51 is a schematic illustration of a single layer which comprises a primary waveguide brunched into a plurality of secondary waveguides extending to an output region, according to various exemplary embodiments of the present invention.

Figure 52A:
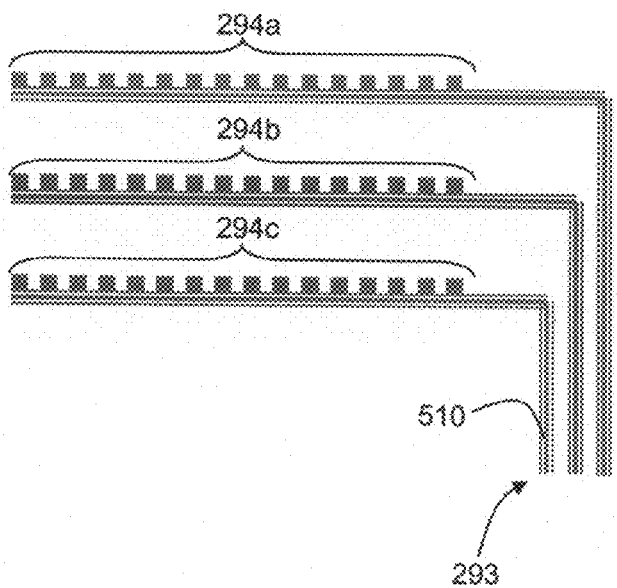
Figure 52B:
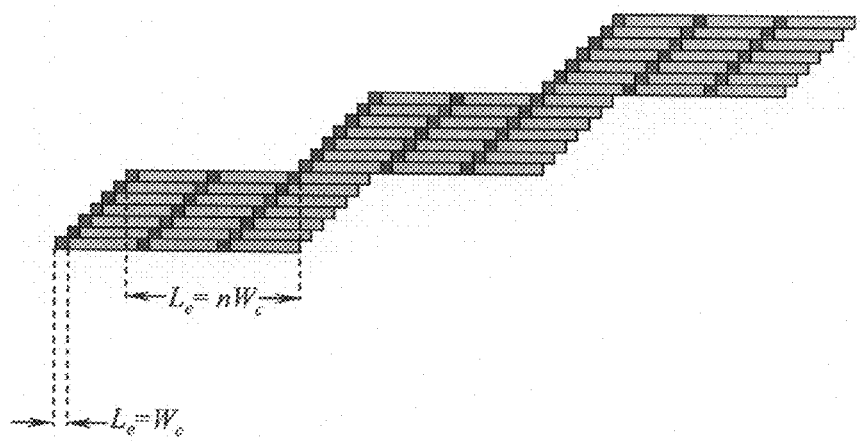

FIGS. 52a-b are schematic illustrations of a preferred embodiment for guiding a plurality of color channels in a single layer, according to which a plurality of primary waveguides extend from one input region to a plurality of output regions.

Figure 53A:
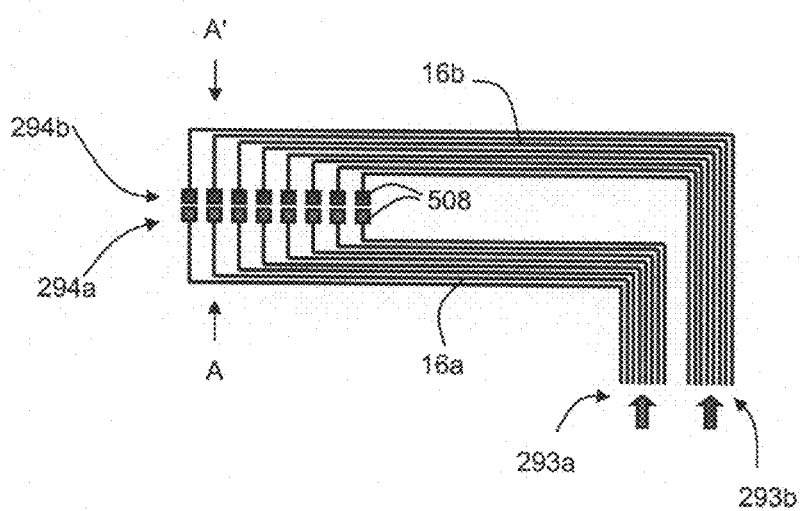
Figure 53B:
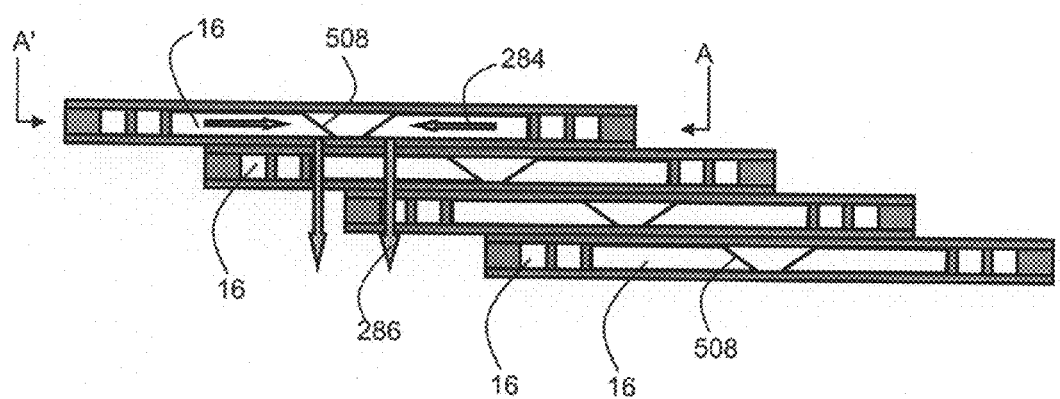

FIGS. 53a-b are schematic illustrations of a preferred embodiment for guiding a plurality of color channels in a single layer, according to which the layer comprises waveguides extending from a plurality of input regions to a plurality of output regions, where each color channel enters the layer at one input region, propagate through the waveguides and exits the layer at one output region.

Figure 54A:
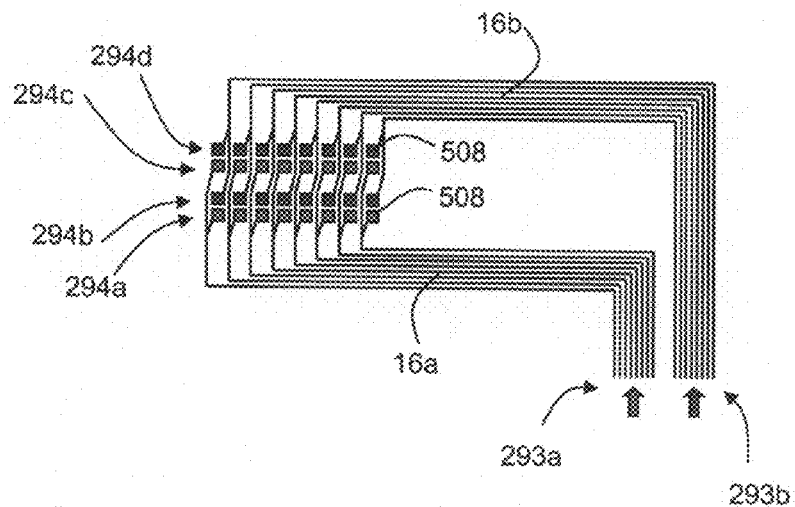

FIG. 54a is a schematic illustration of a single layer according to another preferred embodiment for guiding a plurality of color channels in a single layer. In this embodiment the layer comprises two input regions and four output regions.

Figure 54B:
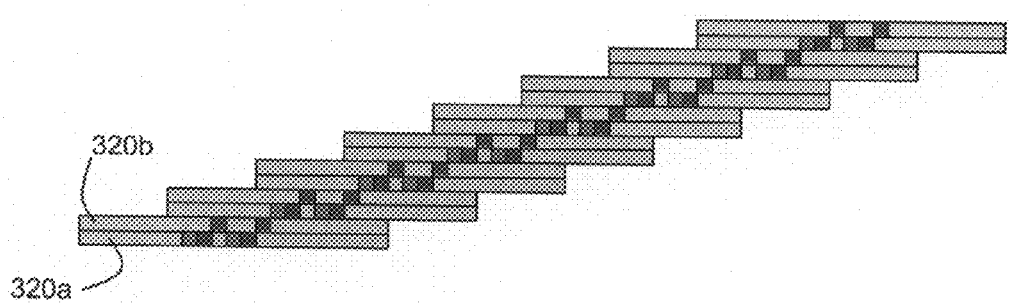

FIG. 54b is a schematic illustration of a side view of an optical device having an alternating sequence of the layers of FIG. 49a and the layers of FIG. 54a, according to various exemplary embodiments of the present invention.

Figure 55A:
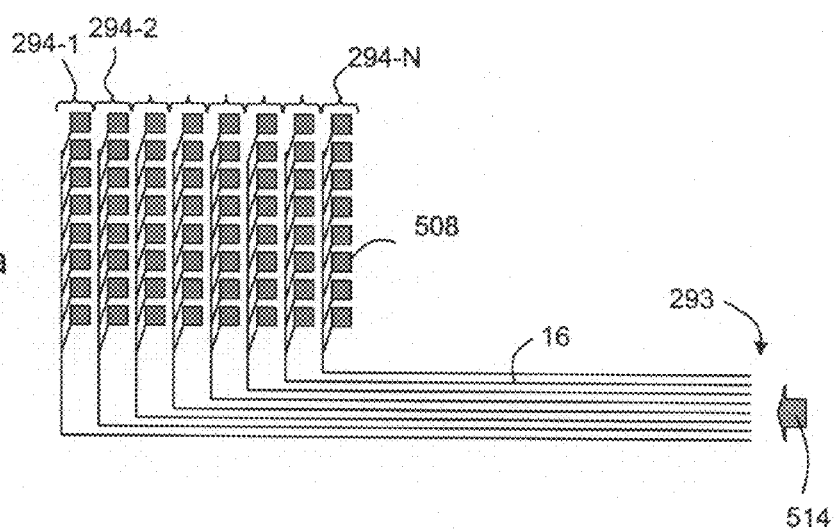
Figure 55B:
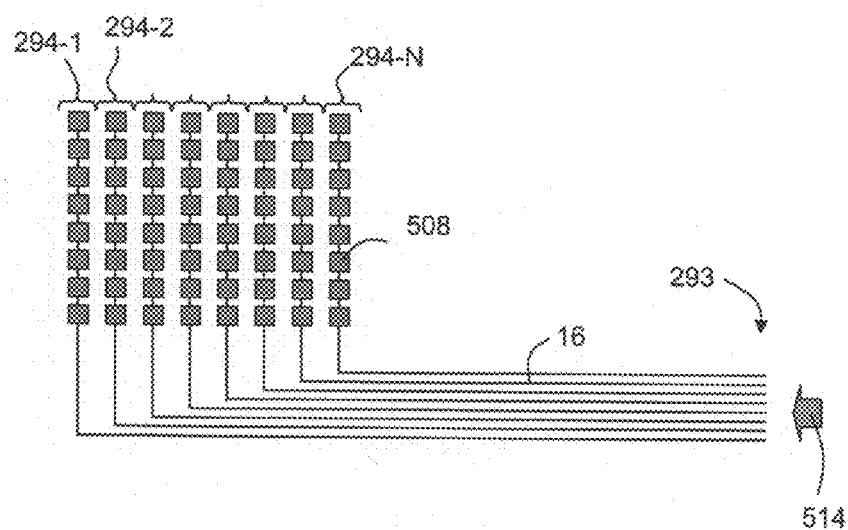
Figure 55C:
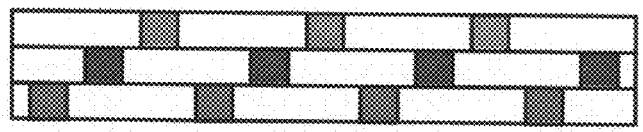

FIGS. 55a-c are schematic illustrations of a layer of waveguides in a preferred embodiment in which the waveguides extend from an input region to a plurality of output regions.

Figure 56A:
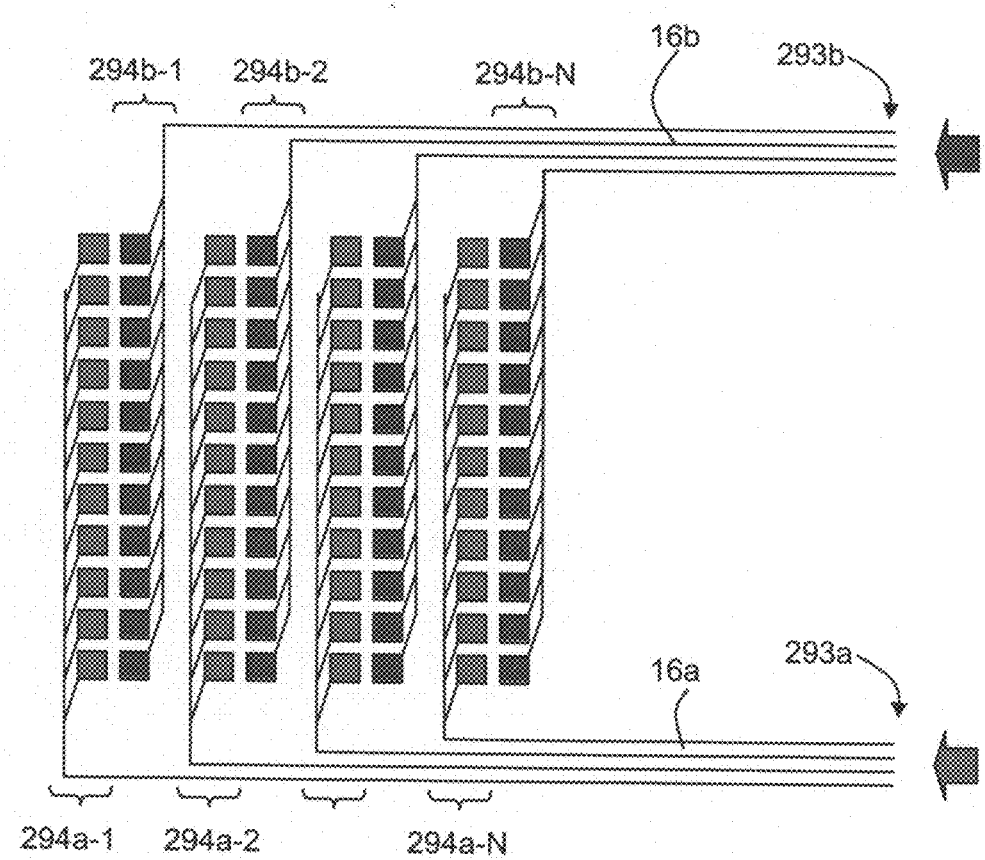
Figure 56B:
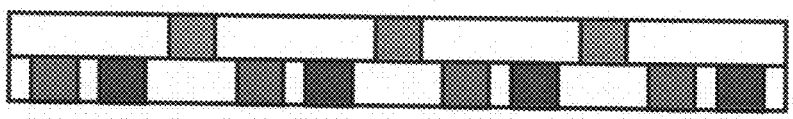

FIGS. 56a-b are schematic illustrations of a preferred embodiment in which a few layers comprise two input regions and plurality of output regions.

Figure 57A:
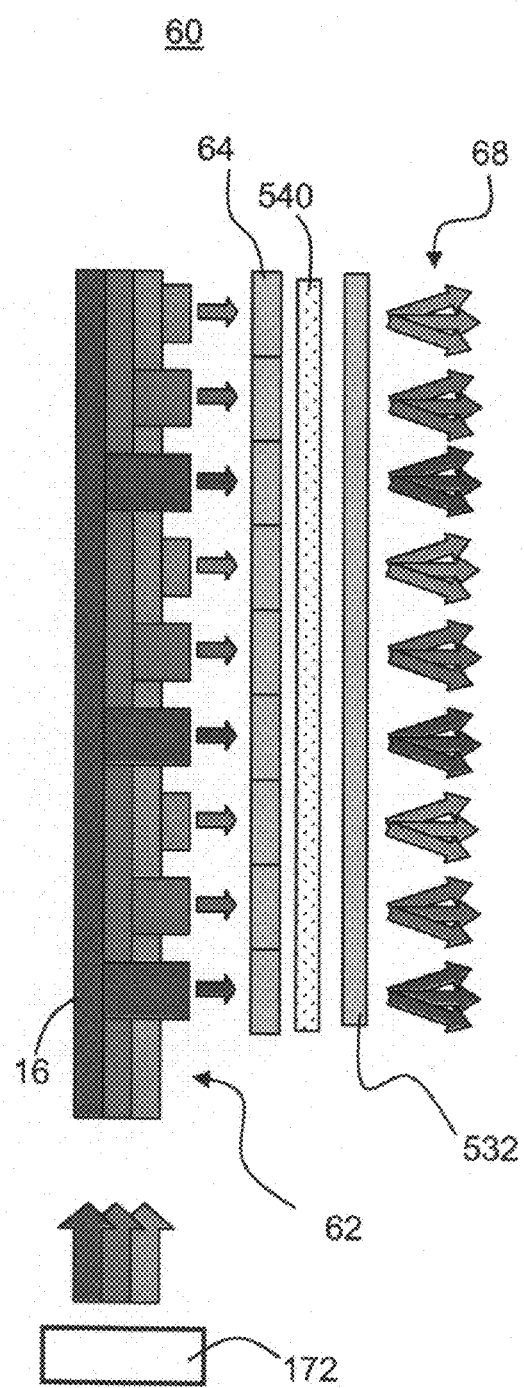

FIG. 57a is a schematic illustration of an LCD apparatus in a preferred embodiment in which the apparatus comprises an in-front light diffuser.

Figure 57B:
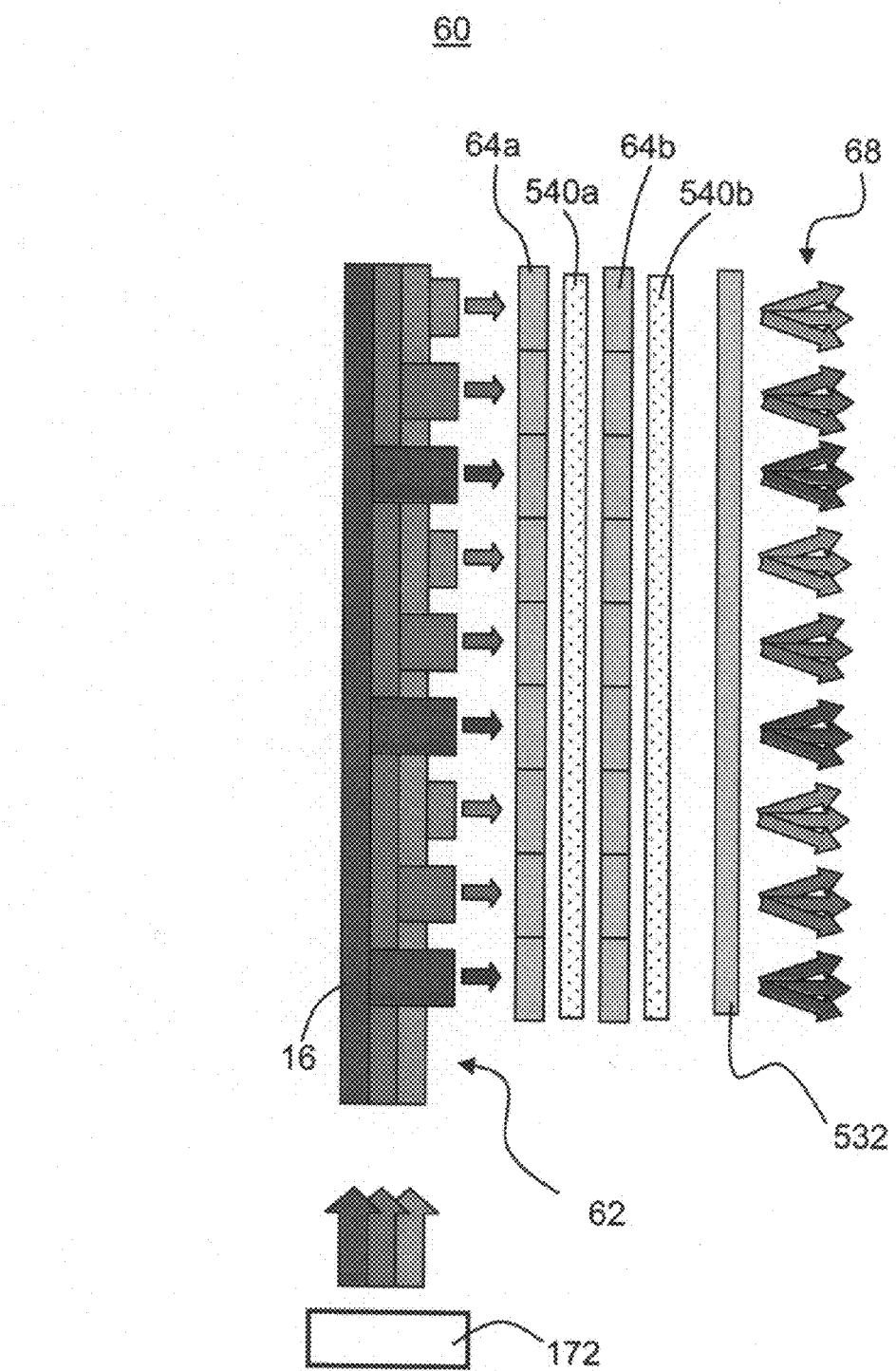

FIG. 57b is a schematic illustration of an LCD apparatus in a preferred embodiment in which the apparatus comprises two passive display panels.

Figure 58:
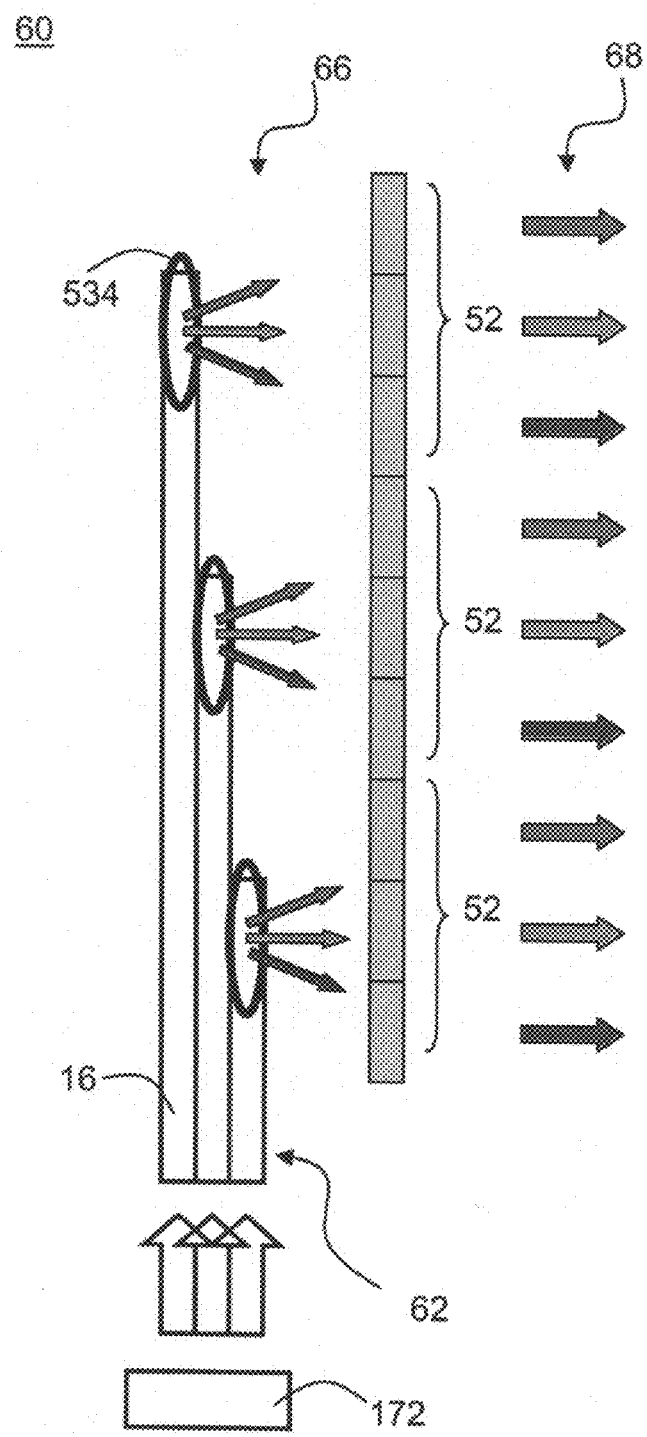

FIG. 58 is a schematic illustration of an LCD apparatus in a preferred embodiment in which monochromatic light propagates in the waveguides of the backlight assembly.

Figure 59:
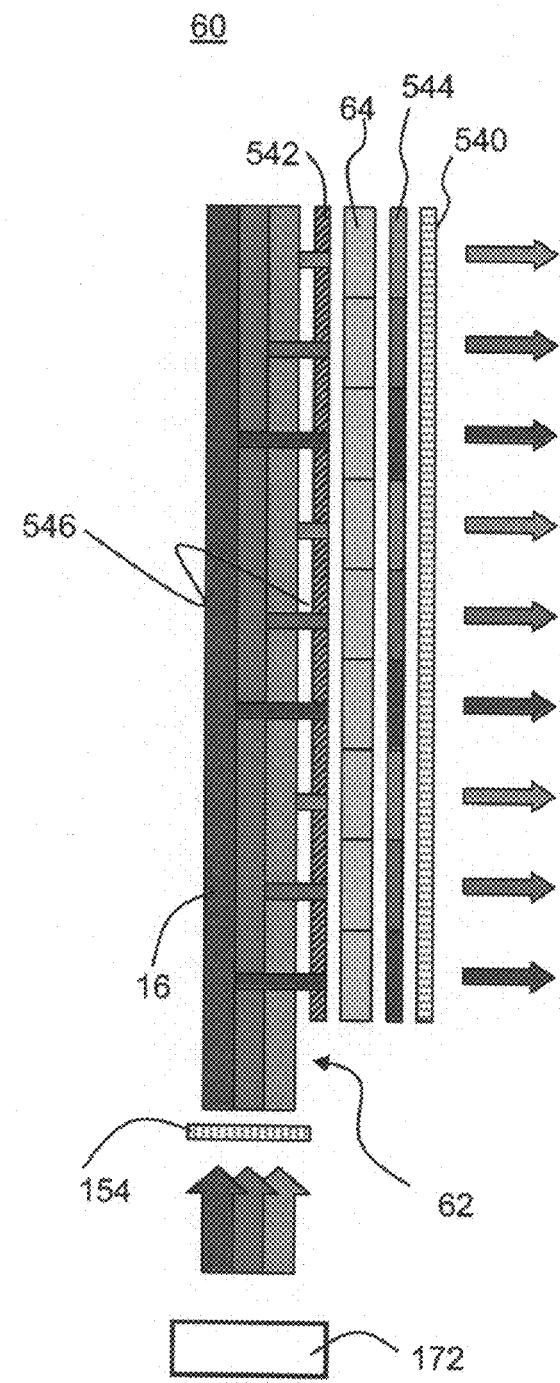

FIG. 59 is a schematic illustration of an LCD apparatus in a preferred embodiment in which the apparatus operates in a transflective mode.

Figure 60:
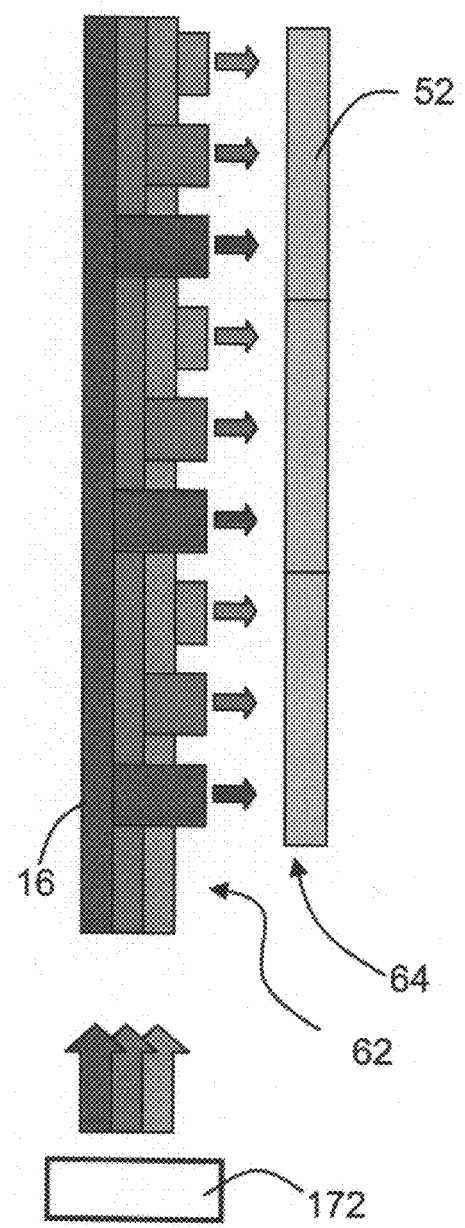

FIG. 60 is a schematic illustration of an LCD apparatus in a preferred embodiment in which the apparatus operates in color sequential mode.

FIGS. 61a-c and 62a-c are schematic illustrations of additional light coupling techniques, particularly, but not exclusively, useful in the embodiments in which there is a plurality of output regions (see, e.g., FIGS. 55a-56b).

Figure 63:
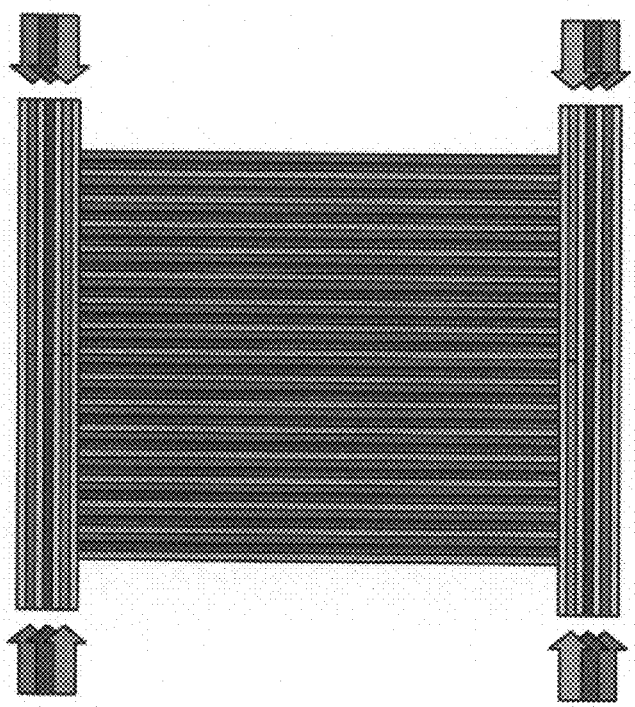

FIG. 63 is a schematic illustration of a backlight assembly which receives optical input from twelve monochromatic light sources.

Figure 64A:
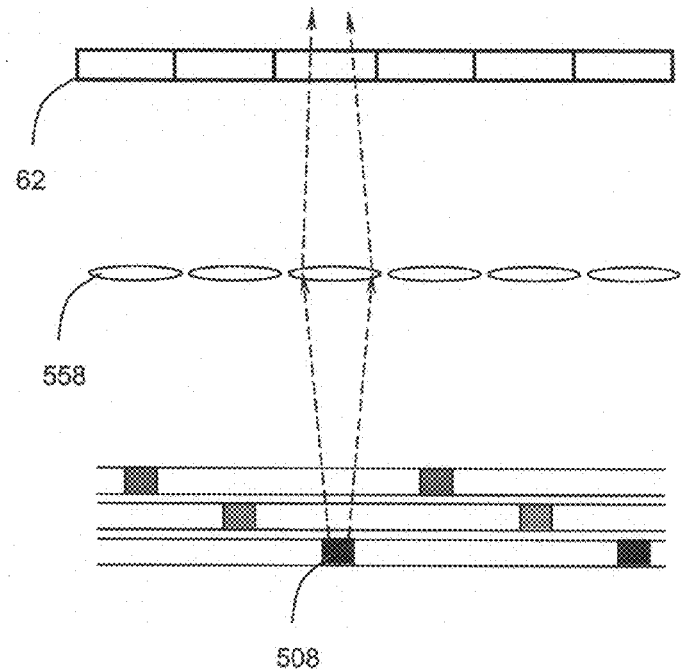
Figure 64B:
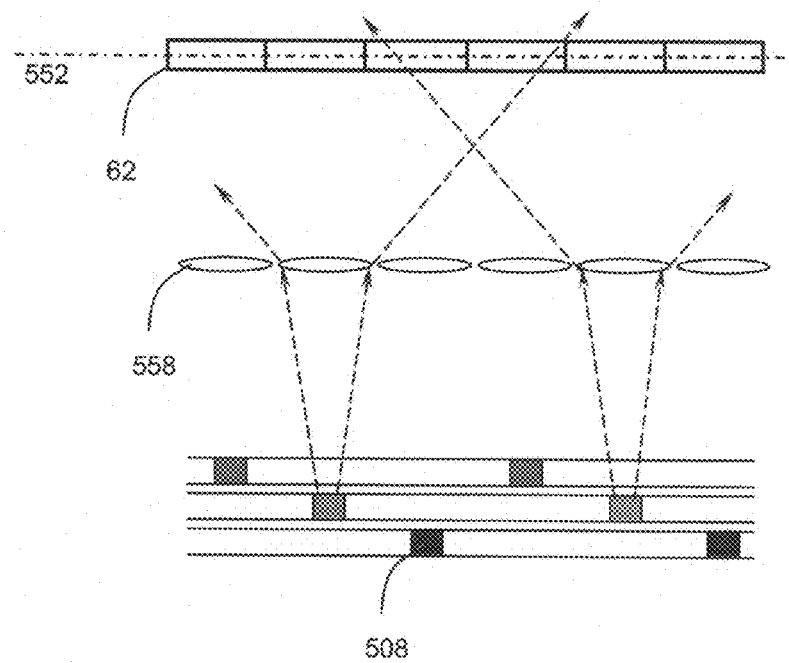

FIG. 64a-b are schematic illustration of the backlight assembly, in a preferred embodiment in which the assembly comprises a microlens array.

DESCRIPTION OF THE PREFERRED EMBODIMENTS

The present embodiments comprise method, optical element, device and assembly which can be used for optical resizing or illuminating light. Specifically, but not exclusively, the present invention can be used to provide optical resizing and/or illuminating light in various applications such as display systems and the like.

The term "optical resizing" as used herein refers to the expansion or contraction of an optical wavefront, which can be, for example, a planar light spot. In other words, optical resizing refers to the change (expansion or contraction) in the area occupied by the optical wavefront. For example, when light constitutes an image therein, the optical resizing refers to the magnification or reduction of the image, which can be effected by separation changes or size changes of picture elements (e.g., pixels) of the image. The size of the area occupied by the optical wavefront is interchangeably referred to herein as the transverse area of a light beam.

The term illuminating light refers to monochromatic or chromatic light. Typically, but not obligatorily, the illuminating light does not constitute an image and is used for illuminating a predetermined area. For example, the illuminating light can be used as a backlight for a passive display panel.

As used herein, "passive display panel" refers to any pixelated panel in which the pixels do not produce light and which requires backlight for operation. Representative examples of passive display panels include, without limitation, a liquid crystal panel and electrophoretic panel. In various exemplary embodiments of the invention the passive display panel is a liquid crystal panel.

The illuminating light can also be subjected to optical resizing as described above. For example, an illuminating light can originate from one or more light sources of relatively small dimensions and be expanded to illuminate a larger area.

The principles and operation of a device and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present embodiments exploit the technology of embedded waveguides to provide optical resizing or illuminating light. The embedded waveguides can be of any type known in the art, such as waveguides of Planar Light Circuits (PLC) or other arrays. Additionally, the waveguides can be single mode or multimode waveguides. The cross-section of the waveguides can be generally round, generally rectangular, or of any other geometrical figure.

Preferably, but not obligatorily, the embedded waveguides are arranged in one or more layers so as to allow their manufacturing in a layerwise fashion. However, this need not necessarily be the case, since, for some applications, the optical resizing can be achieved by an optical resizing element made of a bulk material as further detailed hereinunder.

In the embodiments in which the embedded waveguides are arranged in layers, the light can enter or exit the layers either through their surface or through their end as further detailed hereinunder. The optical resizing and/or backlighting of the present embodiments can be achieved by longitudinally expanding arrangements of waveguides of any type and shape. More specifically, the longitudinally expanding arrangements can comprise tapered waveguides, partially tapered waveguides, non-tapered waveguides or any combination thereof.

Generally, a longitudinally expanding arrangement refers to an arrangement of waveguides in which the distances between the different waveguides, as measured along one direction, increase along another direction.

Referring now to the drawings, FIGS. 3a-c illustrate a longitudinally expanding arrangement of non-tapered waveguides (FIG. 3a), a partially tapered waveguide (FIG. 3b) and a longitudinally expanding arrangement of partially tapered waveguides, (FIG. 3c), according to various exemplary embodiments of the present invention. As shown, the distances between the different waveguides, as measured along a transverse direction 17, increase along a longitudinal direction 19. FIG. 3d exemplifies the embodiment of FIG. 3c with more than one layer.

Before providing a further detailed description of the present embodiments, attention will be given to the advantages and potential applications offered thereby. The use of embedded waveguides allows the fabrication of planar routing and tapering elements. Additionally, when the PLC technology is employed, each or some of the waveguides can comprise several sections interconnected via mirror corners. Such design can be used to reduce or eliminate waveguide bends hence to reduce the thickness of the final product.

Another advantage of the present embodiments is that the PLC technology allows the fabrication of waveguides with rectangular core cross section, thereby increasing the filling factor and reducing coupling losses.

A particular feature of the present embodiments is that when the waveguides are used in a backlight assembly for a passive display panel, an passive display apparatus, such as an LCD apparatus can be manufactured without the use of color filters. It is recognized that the color filters are costly and that they are responsible for more than ⅔ of the power lost since they transfer only one color. The present embodiments are therefore advantageous over conventional LCD apparatus from the stand points of cost and optical transparency.

The use of embedded waveguides allows the fabrication of flexible elements which can be easily assembled. For example, an optical device can be assembled with partially overlapping flexible layers, whereby instead or in addition to the bending of the individual waveguides, an entire layer can be bended. Additionally, a layerwise production process facilitates the manufacturing of foldable optical devices, whereby different layers are only partially attached there amongst.

Figure 4A:
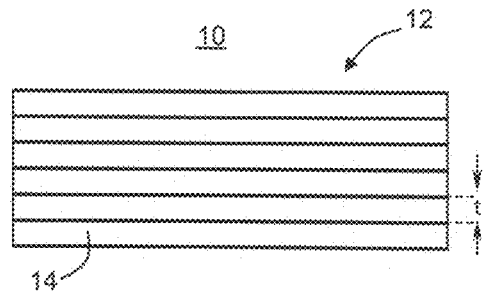
Figure 4B:
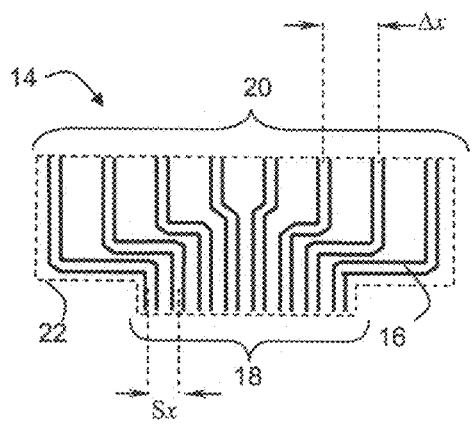

With reference to FIGS. 4a-b, according to one aspect of the present invention there is provided an optical element generally referred to herein as element 10. Optical element 10 can serve as an optical resizing element or as an element for providing illuminating light, e.g., to a passive display panel as further detailed hereinunder. Element 10 comprises a substrate 12 formed of one or more layers 14. Each layer of element 10 has an arrangement of waveguides formed and/or embedded therein. The separation between adjacent layers is denoted by t. According to a preferred embodiment of the present invention the arrangement of waveguide in each layer is a longitudinally expanding arrangement. FIG. 4b is a schematic illustration of a layer 14 of element 10. Layer 14 preferably comprises a plurality of waveguides 16 extending from a first region 18 to a second region 20 of layer 14 thereby defining a circumferential boundary 22 within layer 14. Boundary 22 is illustrated as a dash line in FIG. 4b. First region 18 can be an input region through which light enters the waveguides, and second region 20 can be an output region through which light exits the waveguides. In the exemplified configuration shown in FIG. 4b, first 18 and second 20 regions are substantially parallel and located at opposite sides of layer 14. However, this need not necessarily be the case, since, for some applications, it may not be necessary for the regions to be parallel to each other. Thus, regions 18 and 20 can have any geometrical relation therebetween. For example, as further exemplified hereinunder (see, e.g., FIG. 4e-f), regions 18 and 20 can be located at adjacent sides of layer 14 (e.g., in substantially orthogonal relation) or at the same side of layer 14 (e.g., in substantially collinear relation or substantially parallel offset relation).

As used herein, "substantially parallel" refers to a relative orientation of less than 20°, more preferably less than 10°, most preferably less than 5°, say about 0°. The term "parallel", as used herein is to be understood as substantially parallel.

As used herein, "substantially orthogonal" refers to a relative orientation of from about 70° to about 110°, more preferably from about 80° to about 100°, most preferably from about 85° to about 95°, say about 90°.

As used herein, "substantially collinear" refers to a relative orientation of less than 20°, more preferably less than 10°, most preferably less than 5°, say about 0°. In addition, as used herein, "substantially parallel offset" refer to a case where the facets are substantially parallel but are also substantially offset by less than 50 mm, more preferably less than 1 mm, most preferably less than 0.1 mm, say about 0.01 mm.

Furthermore, although the waveguides are shown to have a substantial linear shapes, this need not necessarily be the case, since, for some applications, it may be desired to have non-linear (i.e., curved) shapes. Additionally, the waveguides can be formed of non continuous sections interconnected by corner mirrors as further detailed hereinunder.

In any event, the length characterizing boundary 22 is smaller at first region 18 than at second region 20. Thus, the distance $S_x$ between adjacent waveguides along region 18 is smaller than the distance $\Delta x$ between adjacent waveguides along region 20.

One of ordinary skill in the art will appreciate that such arrangement provides optical resizing in one dimension defined by regions 18 and 20 of the layer. For example, when region 18 serves as an input region and region 20 serves as an output region, a light beam enters layer 14 from first region 18, propagate through waveguides 16 and exits from second region 20. In this configuration, the transverse area of the light is expanded in a direction substantially parallel to regions 18 and 20. Conversely, when region 20 serves as an input region and region 18 serves as an output region, the light beam enters layer 14 from second region 20 and exits from first region 18. In this the transverse area of the light is reduced in the direction parallel to regions 18 and 20.

Figure 4C:
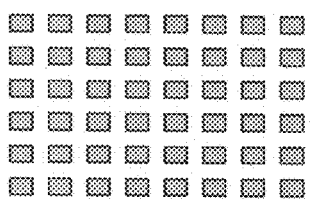
Figure 4D:
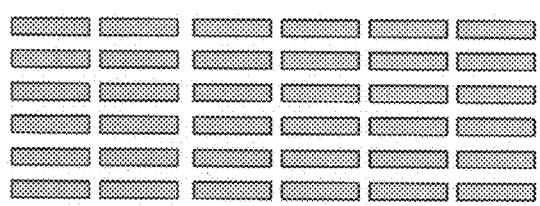

FIGS. 4c-d are schematic illustrations of facets of element 10 in a preferred embodiment in which the layers are stacked such that the smaller regions of the layers form a small facet 24 and the larger regions of the layers form a large facet 26.

Figure 4E:
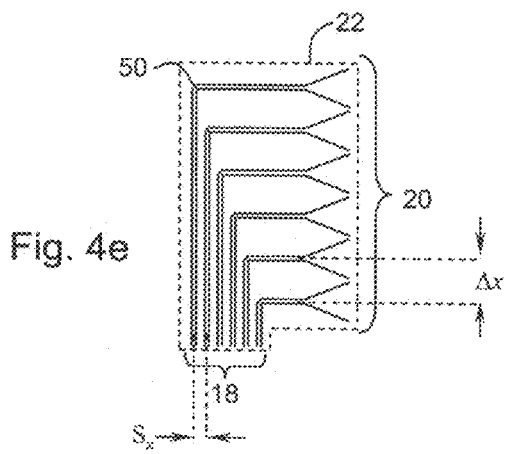
Figure 4F:
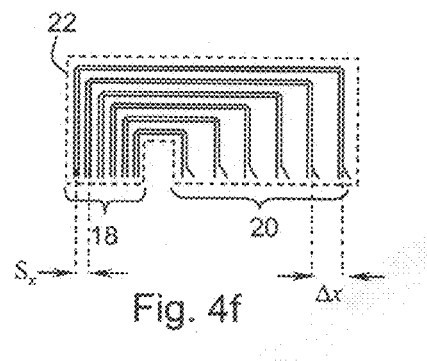

The waveguides, as stated, can be tapered such that the resizing is achieved due to both the longitudinally expanding arrangement and the tapering of the individual waveguides. FIG. 4e is a schematic illustration of a preferred embodiment in which tapered waveguides are employed in a configuration in which first region 18 is substantially orthogonal to second region 20. Still, the length characterizing boundary 22 is preferably smaller at first region 18 than at second region 20, so as to ensure the optical resizing. FIG. 4f is a schematic illustration of a preferred embodiment in which tapered waveguides are employed in a configuration in which first region 18 is collinear with second region 20.

Figure 4G:
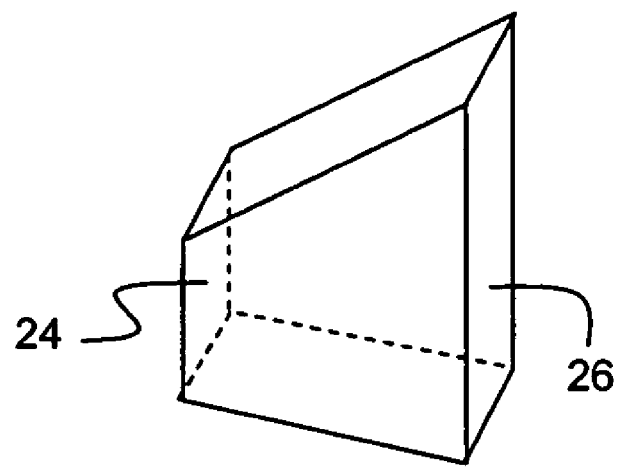
Figure 4H:
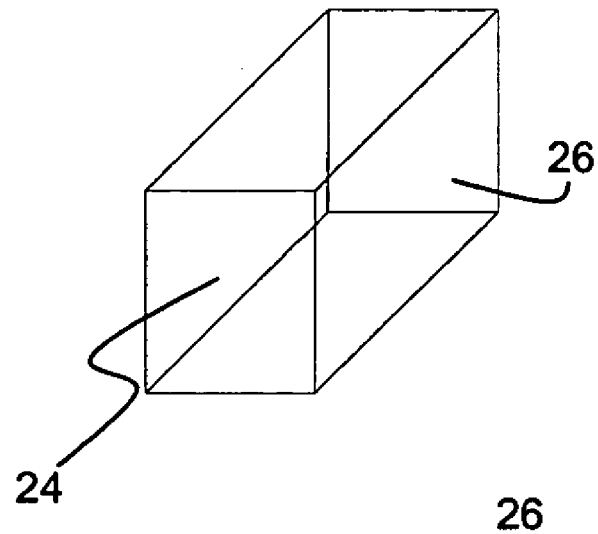
Figure 4I:
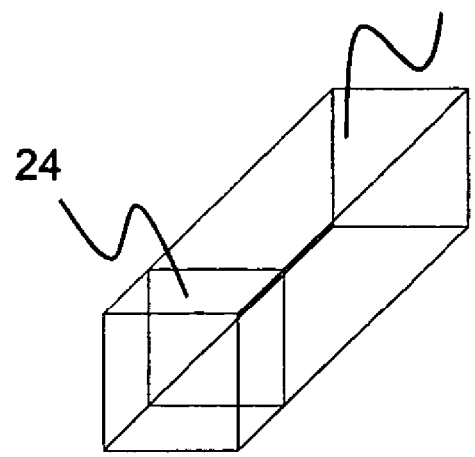

Depending on the construction of regions 18 and 20 of the layers of element 10, small facet 24 and large facet 26 can have any geometrical relations therebetween. FIGS. 4g-i schematically illustrate several geometrical relations between facets 24 and 26, according to various exemplary embodiments of the present invention. Thus, when regions 18 and 20 of the layers are parallel and located at opposite sides of the layers (see. e.g., FIG. 4b), small facet 24 is parallel and opposite to large facet 26 (FIG. 4g); when regions 18 and 20 of aligned at an angle with respect to each other (for example, substantially orthogonal, see, e.g., FIG. 4e), facets 24 and 26 are also aligned at the same angle (FIG. 4h); and when regions 18 and 20 are located at the same side of the layer (for example, substantially collinear, see, e.g., FIG. 4f), facets 24 and 26 are coplanar (FIG. 4i). It is to be understood, that the more detailed reference to the geometrical relations shown in FIGS. 4g-i is not intended to limit the scope of the present embodiments to any specific angle between facets 24 and 26. The present embodiments thus contemplate any value for the angle between facets 24 and 26.

Waveguides suitable for the present embodiments can have a core of high refractive index and cladding of lower refractive index, or they can comprise photonic bandgap materials. Thus, layers of waveguides suitable for the present embodiments can be manufactured, for example, by etching grooves in layers of a low refractive index material serving as the waveguide cladding, and depositing a high refractive index material serving as the waveguide core, into the grooves. The waveguide core can be subsequently coated by an additional layer of low refractive index serving as a top cladding layer.

Photonic bandgap material waveguides can be manufactured by forming (e.g., etching) optical periodic structures on a substrate of dielectric material, leaving stripes serving as the core waveguide, with no periodic structure. The optical periodic structures are characterized by spatially periodic variations in the refractive index with cycles in the sub-micrometer to micrometer range, which define a wavelength band in which no propagation of light occurs (photonic bandgap). The optical periodic structures can then be coated by a cladding layer. The advantage of using photonic bandgap materials is that there is no radiation loss in the photonic bandgap, even in waveguides sections of high curvature.

Preferably, but not exclusively, the PLC polymer lithography technology is employed (see, e.g., Eldada et al., "Advances in polymer integrated optics," IEEE J. Selected Topics in QE, vol. 6, 54-68, 2000). Contemplated processes for fabricating the layers of waveguides include also, without limitation, the Photobreaching process [Gallo et al., "High-density interconnects for 2-dimensional VCSEL arrays suitable for mass scale production," ITCom 2001, paper 4532-47, 2001], the casting/molding process [Kopetz et al., "Polysiloxane optical waveguide layer integrated in printed circuit board," Elec. Lett. Vol. 40, 668-669, 2004], and the soft lithography process [Huang et al., "Bottom-up soft lithography fabrication of three-dimensional multilayer polymer integrated optical microdevices," Appl. Phys. Lett., vol 85, 3005-3007, 2004].

The waveguides of the present embodiments can also be arrays of optical fibers embedded in the layers by means of adhesive materials, preferably without external frame, as known in the art (to this end see, e.g., U.S. Pat. Nos. 5,381, 506, 6,597,845 6,885,800).

The optical element of the present embodiments preferably comprises many layers of waveguides. Typically, the number of layers is of the order of a several hundreds (e.g., about 500 layers) to several thousands of layers (e.g., about 5000 layers). When the optical element serves for providing backlight illumination to a passive display panel, the number of layers are of the order of the square root of the number of pixels or sub-pixels on the passive display panel. For example, the number of layers can be the number of pixels or sub-pixels in a row of the passive display panel, or the number of pixels or sub-pixels in a column of the passive display panel, as further detailed hereinunder.

As used herein, when a quantity X is referred to as "of the order of" another quantity Y, the quantity X can have any value from 0.1Y to 10Y.

The layers can be stacked together by processing a polymer wafer layer after layer or by stacking together laminated layers. The layers can also be stacked using a combination of these techniques. Once the wafer layers are stacked, the wafer is sawed to stripes and the required facets are polished. Alternatively, the stripes can be sawed before stacking. It will be appreciated that since the optical element is wide and short, many such elements can be fabricated in a parallel process.

The optical element of the present embodiments can be used, as stated, for illumination and/or providing optical resizing. Thus, the optical element can be incorporated in many applications, including, without limitation, display apparatus where the optical element can serve as a component either in the display unit of the apparatus, in which case the optical element displays imagery information on one or more of its facets, or in the backlight unit of the apparatus, in which case the optical element provides illuminating light to the display unit.

FIGS. 43a-c are schematic illustrations of applications of the optical element of the present embodiments. In FIG. 43a, the optical element is, or serves as a component in a display unit 63 of a display apparatus 60, and in FIGS. 43b-c the optical element is, or serves as a component in, a backlight assembly 62 of display apparatus 60. As will be appreciated by one of ordinary skill in the art, in the exemplified configuration of FIG. 43a the optical elements transmits light 68 which is encoded by imagery data, while in the configurations of FIGS. 43b-c, the optical elements transmits illuminating light 66, which is preferably non-encoded. The display apparatus of FIGS. 43b-c is preferably a passive display apparatus (e.g., an LCD apparatus) which further comprises a passive display panel 64, and optionally a front polarizer 540. As shown in FIGS. 43*b-c*, panel 64 is fed by illuminating light 66 provided by backlight assembly 62. When an electric field modulated by imagery data is applied to liquid crystal molecules in panel 64 the optical properties of the liquid crystal are changed and the illuminating light 66 passing through panel 64 is encoded by the imagery data.

A schematic illustration of passive display panel 64 is shown in FIG. 44*a*. Panel 64 has a plurality of pixel regions 52 each being defined by two or more sub-pixel positions 54. The sub-pixel positions of each pixel region correspond to the color channels characterizing the pixel region. Thus, a pixel region of two color channels has two pixel positions; a pixel region of three color channels has three pixel positions, etc.

A single pixel region of three color channels (e.g., a red channel a green channel and a blue channel) is schematically illustrated in FIG. 44*b*. The three sub-pixels positions are shown at 54*a*, 54*b* and 54*c*. When the optical element of the present embodiments is used for illuminating panel 64 it preferably illuminates each sub-pixel position by light which is characterized by a sub-spectrum corresponding to the respective color channel of the sub-pixel position. This can be achieved in more than one way.

In one embodiment, illustrated in FIG. 43*b*, monochromatic light propagates in the waveguides and illuminates the sub-pixel position. More specifically, pixel region 52 is illuminated by at least two waveguides, each being disposed to illuminate one of the sub-pixel positions of pixel region 52 by the respective color channel. Thus, in this embodiment, waveguides guiding different color channels are designated to different sub-pixel positions of panel 64. Yet, one or more waveguides can be aligned such that one waveguide illuminates several sub-pixel positions associated with a particular color channel. Alternatively, each sub-pixel position can be illuminated by a different waveguide.

In another embodiment, illustrated in FIG. 43*c*, multichromatic light (e.g., white light) propagates in the waveguides and being demultiplexed near the pixel region to the different sub-pixel positions. The illumination of each sub-pixel position by the respective color channel allows the use of passive display panel with no color filters which are known to transmit one third of the light produced by each pixel. This is advantageous because it increases the optical efficiency and significantly reduces the cost of the display apparatus.

Generally, the pixel regions and sub-pixel positions of panel 64 are arranged gridwise. In the representative example shown in FIG. 44*a*, the grid is rectangular, with a sub-pixel resolution along the rows the rectangular grid and a pixel resolution along the columns thereof. Thus, the width of a column generally equals the width of a sub-pixel position and the height of a row generally equals the height of a pixel region. The distance between adjacent sub-pixel positions on the same row is referred to herein as the inter-column separation of panel 64 and is denoted $W_c$. The distance between adjacent sub-pixel positions on the column is referred to herein as the inter-row separation of panel 64 and is denoted $H_r$. It is to be understood that the rectangular grid in FIG. 44*a* is presented for illustrative purpose only and it is not intended to limit the scope of the present invention to any specific geometry. For example, in another preferred embodiment a triangular grid is employed Typically, but not obligatorily, the sub-pixel positions of each pixel region are ordered according to a predetermined fixed order (e.g., the leftmost position for the red channel, the middle position for the green channel and the rightmost position for the blue channel). With such ordering, two adjacent sub-pixel positions on the same row correspond to different color channels, whereas two adjacent sub-pixel positions on the same column correspond to the same color channels. It is to be understood that the terms "row" and "column" are introduced for clarity of presentation, and are not to be interpreted as a reference to any specific orientation in space.

Generally, a "row" or "column" of pixels or sub-pixels refers to any one-dimensional arrangement of pixels or sub-pixels. Thus, a pair of adjacent pixels or sub-pixels along such one-dimensional arrangement can share a side, a vertex or can have any tangential relation. The distinction between a "row" and "column" is by the color channel associated with two adjacent sub-pixels. Thus, a "column" of sub-pixels positions refers to a one-dimensional arrangement of sub-pixels positions in which all sub-pixel positions are associated with the same color channel, and a "row" of sub-pixels positions refers to a one-dimensional arrangement of sub-pixels positions in which every two adjacent sub-pixels positions along the one-dimensional arrangement are associated with different color channels.

In the representative example of FIG. 44*a*, a column is shown along line 552 and a row is shown along line 553. As shown, every two adjacent sub-pixel position along lines 552 or 553 share a side. Another example for columns and rows of sub-pixel positions is illustrated in FIG. 44*c*, where, again, a column is shown along line 552 and a row is shown along line 553. In this example, every two adjacent sub-pixel position along lines 552 or 553 share a vertex. FIG. 44*c* further demonstrates the color association of each sub-pixel position. As illustrated, all sub-pixel positions along line 552 are associated with the same color channel (green in the present example), while adjacent sub-pixel positions along line 553 are associated with different color channels.

In any of the above exemplified applications, one or more optical elements can be employed. For example, several optical elements which are similar in their principles and operations (but not necessarily in size) to element 10 can be assembled together to provide an optical device to be used in any of the above exemplified applications. In various exemplary embodiments of the invention the optical element is used, singly or in combination with other elements, for providing optical resizing in two-dimensions, preferably two substantially orthogonal dimensions.

Following is a description of preferred embodiments in which several optical resizing elements are assembled for two-dimensional optical resizing or for illuminating a passive display panel. Description of other preferred embodiments in which two-dimensional optical resizing or backlight illumination is achieved without such assembling is provided hereinafter.

Reference is now made to FIG. 5 which is a schematic illustration of an optical device 30, according to various exemplary embodiments of the present invention. Device 30 preferably comprises a first optical resizing element 32 which provides optical resizing in a first dimension 36, and a second optical resizing element 34, which provides optical resizing in a second dimension 38. Elements 32 and 34 can each independently operate similarly to element 10 above. Alternatively, one of elements 32 and 34 can be manufactured similarly to element 10 while the other can be manufactured by conventional techniques.

To provide optical resizing in both first 36 and second 38 dimensions, element 34 is coupled to element 32 such that light exiting element 32 enters element 34. Thus, element 34 serves as a receiving element while element 32 serves as a transmitting element within device 30. The coupling between elements 32 and 34 can be in any way known in the art, such as via direct contact, fiber bundle, or any other optical coupling arrangement. It is advantageous to manufacture the optical resizing elements such that the smaller facet of one element matches the larger facet of the other element. Being manufactured in such manner, one of the optical resizing elements is larger than the other. Specifically, when device 30 is used for expanding light beam (i.e., the light beam's transverse area is larger at the output than at the input), the first element is smaller than the second element, and when device 30 is used for the contracting light (i.e., the light beam's transverse area is smaller at the output than at the input), the first element is larger than the second element.

For example, in the embodiment illustrated in FIG. 5, elements 32 and 34 are manufactured such that light enters the small facet 40 of element 32, expanded along dimension 36, exits element 32 through facet 42 and enters element 34 through facet 44, which preferably has the size as facet 42 of element 32. The light then propagates within element 34, expanded along dimension 38 and exit through large facet 46 expanded in both dimensions.

When both element 32 and 34 are manufactured similarly to element 10, they can be processed using the same photomask layout (such as, for example, the photomasks shown in FIGS. 3a, 3c, 4e and 4f) but different layer thickness. Thus, for example, element 32 can be formed of thinner layers defining the large facet illustrated in FIG. 4d above (see also the three-dimensional illustration of FIG. 3d) while element 34 can be formed of thicker layers defining the small facet illustrated in FIG. 6a. A three-dimensional illustration of the waveguides of element 34 according to the presently preferred embodiment of the invention is shown in FIG. 6b.

Device 30 can serve either as a display unit of a display apparatus or as a backlight assembly. In the former case, element 32 preferably receives multichromatic (e.g., white light) or monochromatic light encoded by imagery data while in the latter case element 32 preferably receives non encoded light. When device 30 is used as a backlight assembly for passive display panel, each sub-pixel position is preferably illuminated by light corresponding to the respective color channel of the sub-pixel position. When multichromatic light enters element 32, the light is preferably demultiplexed near the pixel region as further detailed hereinafter.

Reference is now made to FIG. 7a which is a three-dimensional schematic illustration of device 30 in the embodiment in which the entry and exit facets of each optical resizing element are substantially orthogonal to each other. Specifically, in element 32, small facet 40 is substantially orthogonal to large facet 42, and in element 34, small facet 44 is substantially orthogonal to large facet 46. Facet 42 and facet 44 are parallel and preferably in contact to allow optical coupling between element 32 and element 34. It will be appreciated that when this embodiment is used to transmit an image (i.e., when an encoded light enters element 32) the image exiting device 30 is a mirror image of the original image. The advantages of the embodiment shown in FIG. 7a are that there are less waveguide bends 48 and there is no scattered light from the propagating beam toward the large facet.

The resizing technique of the present embodiments can be repeated. Specifically, device 30 can comprise two or more pairs of optical resizing elements whereby each pair functions according to the above description; namely, one element of the pair provides the optical resizing in one dimension and the other element of the pair provides the optical resizing in other dimension. This embodiment is particularly useful when high magnification or reduction is required or in order to avoid dealing with high aspect ratio waveguides during the fabrication process. For example a 30 times magnification can be achieved with two pairs of optical resizing elements, whereby the first pair provides 3 times magnification (in two dimensions) and the second pair provides 10 times magnification (in two dimensions).

A representative example of the presently preferred embodiment of the invention is illustrated in FIG. 7b, for the case in which two pairs of optical resizing elements 32, 33, 34 and 35 are employed. As shown in FIG. 7b, element 33 expands a light beam 72 in one dimension (say, along the x direction) to provide expanded light beam 74; element 35 expands light beam 74 in another dimension (say, along the y direction) to provide an expanded light beam 76; further, elements 32 expands light beam 76 in one dimension (say, along the x direction) to provide expanded light beam 78; and elements 34 expands light beam 78 in another dimension (say, along the y direction) to provide expanded light beam 80. Original light beam 72 is therefore expanded twice along the x direction and twice along the y direction.

The waveguides of each layer of the optical resizing element of the present embodiments can be formed using a photomask which is similar to the photomask illustrated in FIG. 4e, above. The waveguide bends 48 shown in FIGS. 7a-b can be replaced with the corner mirrors 50 (see FIG. 4e) so as to further reduce the thickness of the optical resizing elements.

Reference is now made to FIG. 8 which is a schematic illustration of device 30 in a preferred embodiment in which the facets of one optical resizing element are parallel and the facets of the other optical resizing element are substantially orthogonal. With specific reference to exemplified embodiment, in element 32 (the transmitting element in the present example), small facet 40 is parallel to large facet 42, and in element 34 (the receiving element in the present example), small facet 44 is substantially orthogonal to large facet 46. Facet 42 and facet 44 are parallel and preferably in contact to allow optical coupling between element 32 and element 34. The advantage of this embodiment is that the length of the waveguides in element 32 is shorter (about half compared to the embodiment shown in FIG. 7) thus reducing the overall optical loss of the device. Still, because the input/output facets of the larger element (element 34) are substantially orthogonal, the device enjoys the aforementioned advantageous of reduced thickness and scattered light.

Reference is now made to FIG. 9 which is a schematic illustration of device 30 in a preferred embodiment in which the facets of the optical resizing elements (facets 40, 42, 44 and 46) are coplanar. The waveguides of each layer of the optical resizing element can be formed using a photomask which is similar to the photomask illustrated in FIG. 4f, above, whereby regions 18 and 20 are collinear. Thus, a light beam 92 enters small facet 40 of element 32, propagates with element 32, experience a 180° change in direction and exit facet 42 expanded along first dimension 36. The (expanded) light beam exiting facet 42 is designated in FIG. 9 by numeral 94. Expanded light beam 94 enters small facet 44 of element 34, propagates with element 34, experiences an additional expansion along dimension 38 and an additional 180° change in direction, and exit facet 46 expanded along both dimensions 36 and 38. The light beam exiting facet 46 is designated by numeral 96. The light passing through device 30 thus experiences two expansions, one in each dimension, and two propagation flips. To this effect, the light exits device 30 propagating along its original direction and being expanded in two dimensions.

It is to be understood that the more detailed reference in the above description to specific propagation directions of the exiting light beam is not intended to limit the scope of the present invention to any entry-exit angular relations. In various exemplary embodiments of the present invention the light exits device 30 at any predetermined angle with respect to its entry angle. Thus, the angle between the entry and exit propagation directions of the light can be 0°, 90°, 180° or any other angle. The entry-exit angular relation depends on the orientation of the waveguides relative to the facets of the optical resizing elements. For example, as further detailed hereinunder, the light may enter any of the optical resizing elements of device 30 at a right angle to the surface of the input facet and be emitted at a non-right angle from the output facet. As will be appreciated by one of ordinary skill in the art, for parallel or substantially orthogonal facets, such configuration corresponds to an entry-exit angle which is other than 0°, 90° or 180°.

Broadly speaking, as device 30 typically includes a small element and a large element, most or all the area of device 30 has the thickness of the larger element. As will be appreciated by one of ordinary skill in the art, the thickness of each optical resizing element can be rather small due to the expanding arrangement of the waveguides. This thickness can be further reduced by down-tapering the waveguides at predetermined sections of each layer. Representative examples of the thickness of the optical resizing element of the present embodiments include, without limitation, a thickness of from about 0.1 mm to about 100 mm, more preferably, from about 1 mm to about 10 mm.

Reference is now made to FIGS. 10a-b, which are schematic illustrations of a photomask layout for manufacturing an arrangement of waveguides, according to various exemplary embodiments of the present invention. FIGS. 10a-b illustrate the preferred embodiments in which regions 18 and 20 are parallel and located at opposite sides of the layer. One of ordinary skills in the art, provided with the details described herein would know how to adjust the photomask layout of the present embodiment for other cases.

As shown in FIG. 10a, the waveguides are down-tapered and squeezed before they are up-tapered and expanded towards region 20. The down-tapering is advantageous, firstly because it can further reduced the thickness of each optical resizing element, and secondly because it allows the separation between the parallel waveguides so as to reduce or eliminate crosstalk.

In the embodiment in which regions 18 and 20 are parallel and located at opposite sides of the layer, the thickness of device 30 is mainly dictated by the waveguide separation $S_y$, see FIG. 10b. The thickness can be approximated by the expression $0.5\, S_y(N_1+N_2)$ where $N_1 \times N_2$ is the number of waveguides (for example, when device 30 is used for resizing an image, $N_1 \times N_2$ can be the number of pixels in the image).

In the embodiment in which regions 18 and 20 are located at adjacent sides of the layer (e.g., in substantially orthogonal relation, see FIG. 4e above) the thickness of the optical resizing element is dictated by the input pixels array size. If waveguide bends 48 are employed (rather than corners mirrors 50), then the bend radius should be added to the overall thickness of the element. However, as further detailed hereinunder, parasitic losses are preferably added to the shorter waveguides by reducing the bend radius. Thus, the thickness of device 30 can be dictated by the bend radius, irrespectively of the number of pixels/waveguides.

In order to increase waveguide separation (for eliminating crosstalk) also along the vertical direction, the waveguides can be vertically tapered at the input and output facets. With the PLC technology, vertical tapering is a well known technology (see, e.g., T. Bakke, et al. "Polyeric optical spot-size transformer with vertical and lateral tapers," J. Light. Tech., vol 20, 1188-1197, 2002). A process of manufacturing waveguides which are tapered both vertically and laterally is illustrated in FIGS. 11a-b for a single waveguide (FIG. 11a) and a stack of waveguides (FIG. 11b). Other methods for producing vertical tapers are discussed by Moerman et al., "A review on fabrication technologies for the monolithic integration of tapers with III-V semiconductor devices", IEEE J. Sel. Topics Quantum Electron. Vol 3, 1308-1320, 1997. Thus the waveguide separation at the facet is much smaller than at the entire device, allowing improved efficiency in light coupling to the waveguides (at the facet) and reduction or elimination of crosstalk between the waveguides in the device.

According to a preferred embodiment of the present invention device 30 receives light from a plurality of sources. There are several advantages for this embodiment. First, the use of more light sources can reduce the thickness of device 30; thickness can be reduced since the number of parallel waveguide from the input facet to the output facet is reduced. The thickness reduction factor equals the number of input light sources employed. For example, for two light sources the thickness can be halved. Another advantage is that each individual light source can have lower resolution (fewer pixels) while preserving the desired brightness. An additional advantage is that the use of plurality of sources can facilitate production of three-dimensional images, as further detailed hereinunder. The use of a plurality of light sources is particularly advantages when device 30 is used as a backlight assembly. Thus, monochromatic light sources can be selected accordance with the desired color channels such that the produced monochromatic light can propagate in the waveguides to directly illuminate the sub-pixel position.

Receiving light from multiplicity of sources can be achieved in more than one way. Hence, in one embodiment, exemplified in FIG. 12a, two light rays 122 and 124 enter first optical resizing element 32 from two different light sources (not shown). Configurations with more than two light sources are also contemplated. Although in the exemplified illustration shown in FIG. 12a, element 32 is manufactured in accordance with the embodiment in which regions 18 and 20 (not shown) are collinear, but this need not necessarily be the case because, as will be appreciated by one of ordinary skill in the art, several light beam can be inputted to element 32 also in other cases. Thus, according to the presently preferred embodiment of the invention element 32 comprises two input facets, designated 40a and 40b, and one output facet 42. When more than two light sources are employed, the number of input facets of element 32 are preferably adjusted accordingly (i.e., three input facets for three light sources, etc.).

Both light beams exit element 32 through facet 42 expanded in one dimension and enter element 34 through facet 44 where they are expanded in the other dimension as further detailed hereinabove.

Figure 12A:
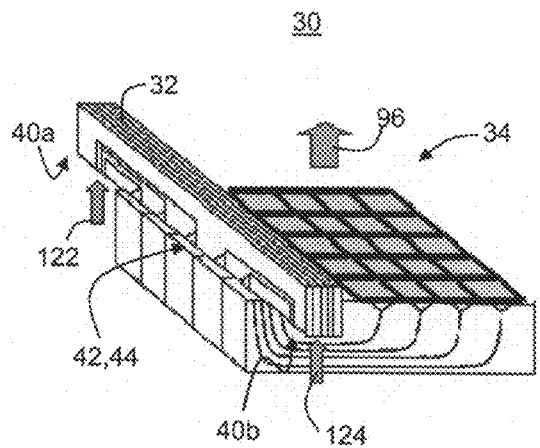
Figure 12B:
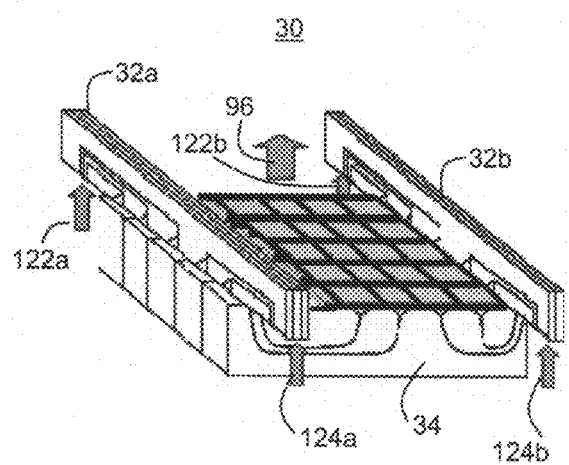
Figure 12C:
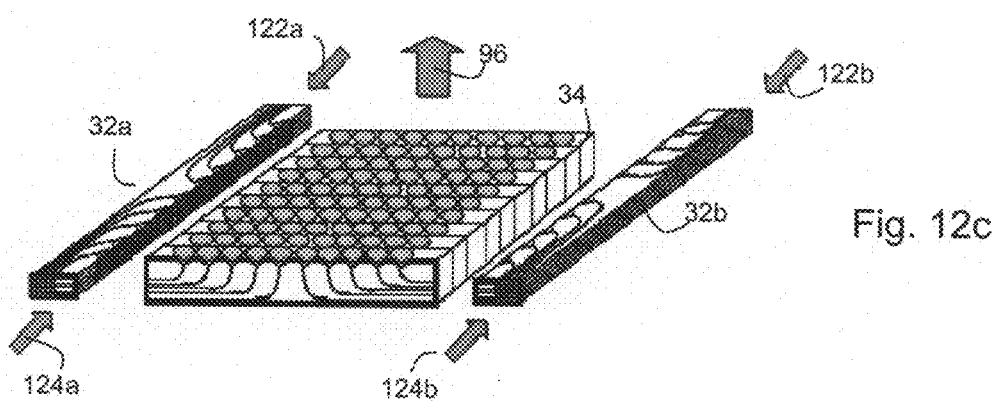

In another embodiment, exemplified in FIG. 12b-c, device 30 comprises two optical resizing elements, designated 320a and 320b, both serving as transmitting elements within device 30, and one optical resizing element, designated 34 serving as receiving element within device 30. Four light rays, 122a,b and 124a,b, enter elements 320a and 320b and conjointly exit element 34 as further detailed hereinabove. The illustration of FIG. 12b is for the embodiment in which each of optical resizing elements 320a and 320b is manufactured in accordance with the embodiment in which regions 18 and 20 (not shown) are collinear, and the illustration of FIG. 12c is for the embodiment in which each of optical resizing elements 320a and 320b is manufactured in accordance with the embodiment in which regions 18 and 20 are located on adjacent sides of the layer. All combinations between the above embodiments are also contemplated.

Figure 12D:
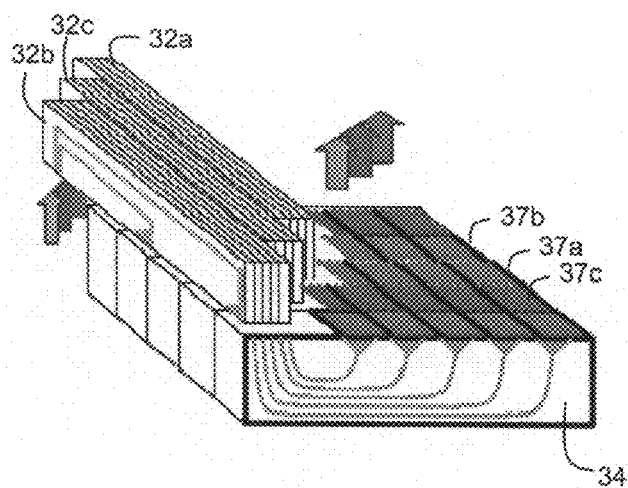
Figure 12E:
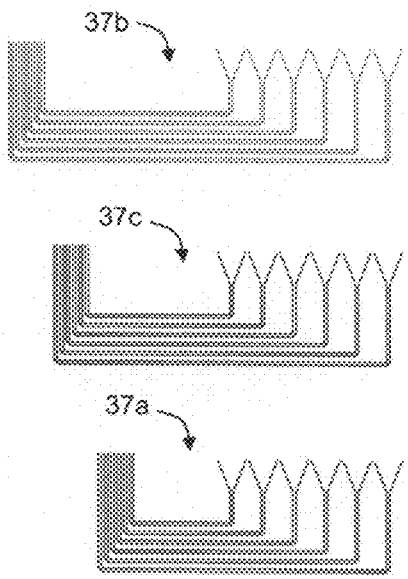
Figure 12F:
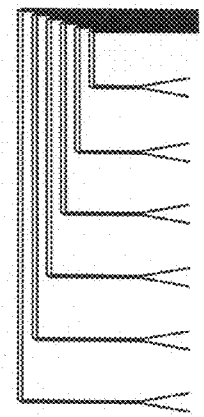

In an additional embodiment, exemplified in FIG. 12*d-f*, device 30 receives optical input in the form of a plurality of monochromatic light sources and uses the optical input to produce a resized chromatic light beam. For example, a plurality of monochromatic images can be magnified and combined by device 30 to provide a magnified chromatic image.

In the representative example shown in FIG. 12*d*, three monochromatic images (e.g., a red image a green image and a blue image) are transmitted from three monochromatic image sources (not shown) to enter three optical resizing elements 32*a* 32*b* and 32*c*, respectively. Each of elements 32*a*, 32*b* and 32*c* magnifies the respective monochromatic image in one dimension and transmits it to element 34. Element 34 magnifies the monochromatic images and combines them in the other dimension to provide a magnified chromatic image.

To combine the monochromatic images to a chromatic image, element 34 is preferably manufactured from an alternating sequence of layers, whereby the waveguides of each layer are preferably optimized according to the average wavelength of one monochromatic image. Shown in FIG. 12*d* are three types of layers, designated by numerals 37*a*, 37*b* and 37*c*. Layers 37*a*, 37*b* and 37*c* can be optimized, for example, to typical average wavelengths of red, green and blue monochromatic images, respectively. The length of the waveguides is selected according to the position of elements 320*a*, 320*b* and 320*c* relative to element 34. FIG. 12*e* is a schematic illustration of layers 37*a*, 37*b* and 37*c* in the alternating sequence, for the case of red, green and blue images. This embodiment is advantageous because the use of wavelength specific waveguides reduces or eliminates possible dispersion. An additional advantage of this embodiment is that the image source can have less optical elements such as lenses and multiplexers. Thus, instead of being built at the input source with multiplexers and lenses, the image source is multiplexed at element 34.

Elements 320*a*, 320*b* and 320*c*, which, as stated receive and transmit monochromatic images, can all be manufactured using similar or identical photomasks, see, e.g., the photomask illustrated in FIG. 12*f*.

As stated, the present embodiments are suitable for imagery optical data as well as non imagery optical data. It is therefore to be understood that the above reference to imagery data is not to be interpreted as limiting the scope of the invention in any way. Thus, for example, the present embodiments can be used to provide a chromatic image or a chromatic back illumination for another display device, e.g., LCD panel with a stripe matrix of red-green-blue (RGB) light from three filtered light source, LEDs or laser sources.

Reference is now made to FIG. 45, which is a simplified illustration of backlight assembly 62, according to various exemplary embodiments of the present invention. Backlight assembly 62 preferably comprises a plurality of waveguides 16 formed and/or embedded one or more substrates. The waveguides are arranged to feed illuminating light to each sub-pixel position of passive display panel 64 (not shown, see FIGS. 43*b*, 44*a* and 44*b*) in a manner such that each pixel region 52 is illuminated by two or more waveguides. Specifically, for each pixel region 52 (not shown in FIG. 45, see FIGS. 43*b* and 44*a-b*) each waveguide or a part thereof is disposed to illuminate one sub-pixel position 54 (not shown in FIG. 45) of pixel region 52 by the respective color channel of sub-pixel position 54.

Exemplified color distributions of backlight illumination provided by assembly 62 to panel 64 are schematically illustrated in FIGS. 46*a-b*. In FIG. 46*a* the illumination area of each waveguide generally equals the area of the sub-pixel position illuminated thereby. In FIG. 46*b*, the illumination area of each waveguide is substantially smaller than the area of the respective sub-pixel position, thus allowing each sub-pixel 54 of the panel to be illuminated by more than one waveguide.

Backlight assembly 62 can comprise any number of substrates. Four such substrates are illustrated in FIG. 45: three input substrates 502*a*, 502*b* and 502*c* and one output substrate 504. The principles and operations of the waveguides in substrates 502*a*, 502*b* and 502*c* are similar to the principles and operations of elements 32*a-c* described above, and the principles and operations of the waveguides in substrate 504 are similar to of principles and operations of element 34. In various exemplary embodiments of the invention the separation t between layers in output substrate 504 is compatible with the separation between adjacent sub-pixels associated with the same color channel (along a column of passive display panel 64), and the separation Δx between waveguides in output substrate 504 (at the output region, see, e.g., region 20 in FIG. 4*e* or 4*f*) is compatible with the separation between adjacent sub-pixels associated with the different color channel (along a row of passive display panel 64). Typically, but not obligatorily, $t=W_c$ and $\Delta x=H_r$, where $W_c$ and $H_r$ are, respectively, the inter-column and inter-row separations characterizing panel 64.

Reference is now made to FIG. 13*a-c* which are schematic illustrations of device 30 in preferred embodiments in which there is more than one optical output from the device.

In one embodiment, schematically illustrated in FIG. 13*a*, optical element 32 transmits light to more than one direction. Shown in FIG. 13*a* are three optical elements, 32 34*a* and 34*b* whereby element 32 transmits light to both elements 34*a* and 34*b*. Thus, in the presently preferred embodiment of the invention element 32 serves as a transmitting element within device 30 and elements 34*a* and 34*b* both serve as receiving elements within device 30. Specifically, a light beam 132 enters element 320 and being transmitted thereby in the form of two light beams 134*a* and 134*b*. It is to be understood that element 32 can transmit more than two (e.g., three, four) light beams.

At least one, more preferably both light beams 134*a* and 134*b* are independently resized (e.g., expanded) in one dimension with respect to light beam 132. For example, when beam 132 constitutes an image, beams 134*a* and 134*b* can be a three time magnification image and a two time magnification image of the original image, respectively. Alternatively, if desired, one beam can be a magnification image of the original image and the other can be a reduction thereof. Elements 34*a* and 34*b* respectively receive light beam 134*a* and 134*b* from element 32 and resize them in the other dimension, preferably, by the same extent as the resizing performed by element 32 so as to preserve the aspect ratio. Device 30 thus provides two output light beams 136*a* (produced by element 34*a*) and 136*b* (produced by element 34*b*), each independently being resized in two dimensions relative to input light beam 132.

In another embodiment, schematically illustrated in FIG. 13*b*, optical element 34 receives (expanded) light beam 134 from element 32 and transmits it to more than one direction. In the representative example of FIG. 13*b* element 34 bifurcates the light and produces two light beam 136*a* and 136*b* propagating in two opposite directions.

The embodiments illustrated in FIGS. 13a-b can be combined, such that light beams 134a and 134b (see FIG. 13a) are both transmitted to element 34 such that the two optical outputs (beams 136a and 136b) are produced by the same optical element.

Additionally, element 34 can be optically fed by a plurality of optical elements, each transmitting to element 34a different light beam originated from a different light source. A representative example of this embodiment is schematically illustrated in FIG. 13c, where there are two light sources (138a and 138b) transmitting light beams 132a and 132b to two optical elements 320a and 320b which respectively resize the beams in one dimension to produce light beams 134a and 134b. Element 34 receives light beams 134a and 134b from elements 320a and 320b, expands them in another dimension to produce light beams 136a and 136b and transmits them to two different directions (opposite directions in the present example).

With reference to FIGS. 14a-b, according to a preferred embodiment of the present invention device 30 comprises one or more additional optical elements 142 for performing various optical operations and/or to ease the manufacturing process. The additional optical element(s) can be formed of a plurality of waveguides in expanding or non-expanding arrangement, depending on the desired functionality thereof. In the representative example shown in FIG. 14b, additional element 142 is an image rotating element 144. In use, light beam 146, constituting an image therein, enters element 144 where the image is rotated by, say 90°, and exits element 144 as a rotated light beam 148. Subsequently, light beam 148 enters elements 32 and 34 where it is being expanded, first in one dimension (light beam 150) then in the other dimension (light beam 152) as further detailed hereinabove. Image rotating element 144 is particularly useful in the embodiments in which the optical resizing elements are manufactured such that their small facet and large facet are substantially orthogonal to each other.

FIG. 15 is a schematic illustration of a layer (e.g., layer 14) of the optical element in a preferred embodiment in which the layer comprises a polarizer 154. Polarizer 154 can be formed, for example, by depositing metal or alloy (e.g., Cr, Au, Al, etc.) at gaps 156 between waveguides 16 so as to attenuate the transverse polarization mode. Preferably, the waveguides are made narrower at the region of the polarizer for efficiently stripping the transverse polarization modes. The use of optical elements with polarizer 154 can allow the use of input light source which produces unpolarized light, or, when the light source produces polarized light this configuration can improve the state of polarization.

Polarized light is particularly useful when the optical element is used in a backlight assembly for a passive display panel where it is desired to illuminate the liquid crystal molecules by polarized light. For such applications the backlight assembly preferably comprises a polarizer 154 which can be incorporated in the layer of the optical element, as described above, or it can be positioned between the light sources 172 and the waveguides 16 (see FIG. 43b). The advantage of positioning polarizer 154 between the light source and the waveguides is the replacement of the traditional costly large panel polarizer with a small polarizer sheet. Alternatively or additionally, light sources 172, as stated, can be configured to provide polarized light.

The coupling between device 30 and the light source can be achieved by direct contact, or, alternatively, via one or more additional optical elements, such as, but not limited to, an arrangement of microlenses or diffractive optical elements.

When device 30 serves in a display unit of a display apparatus, the optical element receive light which is encoded by imagery data and the optical coupling between device 30 and the light source is preferably done so as to preserve the image constituted by the inputted light beam. On the other hand, when device 30 is used as a backlight assembly, the backlight assembly is preferably coupled to light source(s) which generate non-encoded light. In this case the waveguides can be inputted in a non-pixelized manner. Optical coupling of device 30 to an image source is provided hereinbelow, and optical coupling of to non imagery light is provided hereinafter.

FIGS. 16a-b are schematic illustrations of the coupling between device 30 and an image source. Shown in FIG. 16a are several waveguides 16 of device 30, an image source 160 and a coupler 162 for providing optical coupling between device 30 and image source 160. In the present example, image source 160 is an LCD micro-display. Coupler 162 preferably comprises a microlens array 164 and a polarizer 166. The use of microlens array 164 is advantageous because, typically, an LCD panel includes, on the output side, a polarizer and an LCD protective glass, and the microlens array provides better coupling efficiency. The microlens array can be manufactured using any way known in the art, for example, as disclosed in U.S. Pat. No. 5,508,834 and U.S. Patent Application No. 20040100700.

With reference to FIG. 16b, microlens array 164 can also be placed on the input optical element, such that each waveguide core is capped with one microlens, see, e.g., core 161 and microlens 168 in FIG. 16b. This can be done by etching the input facet of the optical resizing element with an etcher that etches the cladding 163 of waveguide 16 faster than core 161.

Alternatively, when the LCD microdisplay has a sufficiently thin polarizer and protective glass layers, the coupling can be carried out without the microlens array, e.g., by direct contact. For example, when the overall thickness of the polarizer and protective glass is about 20 μm or less, and the waveguides of the optical resizing element which couples to the LCD microdisplay have a sufficiently small numerical aperture (say, about 0.25 or less). In such configuration the cross talks between neighbor pixels, which can blur the picture, can be minimized.

FIG. 17 is a schematic illustration of a preferred embodiment in which an input image is focused on device 30 using a lens 176. In this configuration a pre-magnification can be also obtained, thus relieving the required aspect ratio of the waveguides or eliminating the need for two stages magnifications as further detailed hereinunder. This configuration is particularly useful with reflecting liquid crystal micro-displays, such as, but not limited to, LCD on Silicon (LCOS) or other input panels, such as, but not limited to, Digital Light Processor (DLP). Shown in FIG. 17 are a reflective liquid crystal micro-display 170, an external light source 172 and device 30. Light 174 from light source 172 is focused by a lens 175 on micro-display 170, which reflects the light. The reflected light constitutes an image therein is focused by another lens 176 on device 30.

A pre-magnification can be carried out also only in one dimension. Combining a distorted input (magnified in one dimension) with an optical resizing element can result in a compact thin device since in this case there is no need for two optical resizing elements in device 30, and the pre-magnification element (which can be a lens) is thin.

Reference is now made to FIGS. 18a-b which are schematic illustrations of the coupling between device 30 and a light source, in the preferred embodiment in which the coupling is by a fiber bundle. According to the presently preferred embodiment of the invention one (FIG. 18a) or more (FIG. 18b) fiber bundles 180 guide the light directly to the receiving optical resizing element of device 30. In the embodiments in which device 30 is used to resize an image, the fiber bundle(s) are preferably composed of many fibers with small cores to enable transmission of high resolution images. Denoting the number of rows and the number of columns in the fiber bundle by $X_1$ and $X_2$, respectively, the total number of fibers in the fibers is $X_1 \times X_2$. Representative examples for $X_1$ and $X_2$, include, without limitation, from about 500 to about 2000. Preferably, but not obligatorily $X_1=X_2$. The diameter of the core of the fibers is preferably less than 20 μm, more preferably less than 15 μm, say about 10 μm.

When device 30 receives optical input from a plurality of light sources (see FIG. 18b) each bundle transmits one optical channel. In the example shown in FIG. 18b the input fiber bundle 180 is separated to four fiber bundles (180a, 180b, 180c and 180d) which respectively feed four input facets (182a, 182b, 182c and 182d) of device 30.

Device 30 can also receive optical input in the form of focused light beams, e.g., a laser beam. A color image can be created from a plurality (e.g., two or more) of monochromatic laser devices, for example, red, green and blue laser devices which are scanned to form a picture. Such image can be projected on the input facet of device 30 which has a small cross-section. The advantages of using laser light are high brightness and the ability to calibrate the laser light spot intensity and location according to the transparency and location of the waveguides in device 30. Preferred transparency optimization procedures in accordance with various exemplary embodiments of the present invention are provided hereinunder in the Examples section that follows.

When device 30 is used as a backlight assembly, there are minimal or no alignment requirements between the layers at the input region. In particular, there are no limitations on the gaps between the layers. Thus, waveguides in different layers can have cladding of different thicknesses.

FIGS. 47a-b are schematic illustrations of preferred techniques for coupling the light to device 30, when device 30 is used as a backlight assembly. According to the presently preferred embodiment of the invention waveguides 16 are arranged in each layer such that, at input region 18 the terminal part of each waveguide is substantially collinear with at least one light path 506 characterizing light source 172. This embodiment is particularly useful when light sources having a wide field of view, such as LEDs are employed. Collinearity between the light path and the waveguides can be achieved, for example, by arranging input region in accordance with characteristic wavefront light of the light source. In the representative example illustrated in FIG. 47a, the light source emit light which expands elliptically and therefore input region 18 has an elliptical shape such that the waveguides are collinear with light path 506. In another embodiment, illustrated in FIG. 47b, the input region can has a linear shape but each waveguide is shaped and/or oriented differently so as to achieve the aforementioned collinearity. The waveguides are preferably up tapered towards input region 18 and individual widths of differently shaped and/or oriented waveguides preferably differ so as to compensate for the different power distribution at different angles.

As stated hereinabove, the light can emitted from device 30 at any predetermined angle with respect to the emitting facet. The predetermined angle can be about 90°, in which case the waveguides are formed in substantially orthogonal relation to the output facet, or any other angle in which case the waveguides are tilted with respect to the output facet.

Reference is now made to FIG. 19 which is a schematic illustration of one layer of one optical resizing element of device 30 in a preferred embodiment in which waveguides 16 are tilted with respect to the layer's end. The resulting optical resizing element emits light 194 are an angle θ (designated by numeral 190 in FIG. 19) with respect to the output facet.

According to a preferred embodiment of the present invention device 30 is designed and constructed to provide three-dimensional images. The three-dimensional images can be obtained by generating two different images, of two different polarizations or two different colors. The user can then view the images using a binocular device having a different polarization or a different color for each eye, hence mimicking a three-dimensional perception of the image.

Alternatively, device 30 can function as an autostereoscopic display, whereby it is not necessary for the viewer to wear special viewing implement to keep the two images separated. The autostereoscopic is provided to the user in the form of two different images which are directed to the left and right eyes of the user. A representative example of an autostereoscopic display, according to various exemplary embodiments of the present invention is provided hereinunder (see FIGS. 34a-35c and the accompanying description).

Display devices are typically manufactured under a constraint of "pixel to pixel" alignment between optical coupled display panels. Specifically, for a display device to function properly, it is required to align the pixels of optical coupled panels with tolerance of microns or sub-micron. It is recognized that this requirement complicates the manufacturing process and oftentimes completely disable product manufacturability. In the present embodiments, there is no need for pixel to pixel alignment between the input picture image and element 32 or between element 32 and element 34.

Furthermore, the numbers of pixels in the picture image can be different from the number of pixels in element 32 which in turn can be different from the number of pixels in element 34. For doing so, without loosing resolution, the number of pixels (waveguides) in the accepting element is preferably k times larger than the number of pixels (waveguide) in the transmitting element, where k is a number larger than 1, e.g., about 2 more preferably about 3. For more details, see U.S. Pat. No. 6,326,939, the contents of which are hereby incorporated by reference. Thus, there is no need for a correlation between the input image pixels and the pixels of device 30, and there is no need to align the waveguides of the two optical resizing elements.

With respect to misalignment between layer of the same optical element, misalignment of x microns between layers is translated to an effective misalignment (at the output) of $x(M-1)$ for the case in which the small and large facet are opposite and parallel, $xM$ for the case in which the small and large facet are substantially orthogonal, and $x(M+1)$ for the case in which the small and large facet are coplanar. Thus, for an output tolerance of about 0.2 mm and about ten times magnification, the layers can be stacked at the input waveguide region within about 20 microns accuracy. The alignment requirements are only in one dimension. In the embodiments in which the small and large facets are parallel (opposite or coplanar), there are no alignment requirement in the transverse direction. On the other hand, in the embodiment in which the small and large facets are substantially orthogonal, the tolerance at the transverse direction, is about x microns.

Misalignments of x microns due to lack of planarization in the transmitting optical resizing element (e.g., element 32) are translated to a misalignment of xM microns (where M is the magnification of the receiving element) at the output.

Rotation misalignment between the two optical resizing elements is preferably minimized so as to reduce image distortion.

Variations in the thickness and the width of the waveguides which lead to difference in the transparency of the waveguides can be added to the total loss budget of the waveguides. Preferably, some width and thickness variation can be introduced so as to suppress the Moiré fringe effects.

Reference is now made to FIG. 20 which is a schematic illustration of an optical device 200, in accordance with various exemplary embodiments of the invention. Similarly to device 30 above, device 200 can serve either as a display unit of a display apparatus or as a backlight assembly. Device 200 comprises a plurality of layers 202 forming a substrate 204 having a first facet 206 and a second facet 208. Layers 202 are arranged in a partially overlapping optical arrangement.

As used herein, "partially overlapping optical arrangement" of layers refers to an arrangement in which each layer includes at least one region which is optically exposed at the surface of the layer. An optically exposed region, as used herein, refers to a region capable of establishing optical communication with the environment. Thus, there is a substantially free optical path between the environment and each layer of device 200, which optical path passes through the surfaces and the optically exposed regions of the layers. The optically exposed region can therefore emit light directed outwardly from the surface of the layer, without being substantially absorbed, reflected or scattered from adjacent layers. The optically exposed regions can either emit light directed outwardly from or receive light directed inwardly to the surface of the layers, without being substantially absorbed, reflected or scattered from adjacent layers. A parameter which can be used for characterizing the arrangement of the layers is an exposure length, $L_e$, as shown, for example, in FIGS. 21a, 21b, 21d, 22c and 22f.

Figures 21A, 21B:
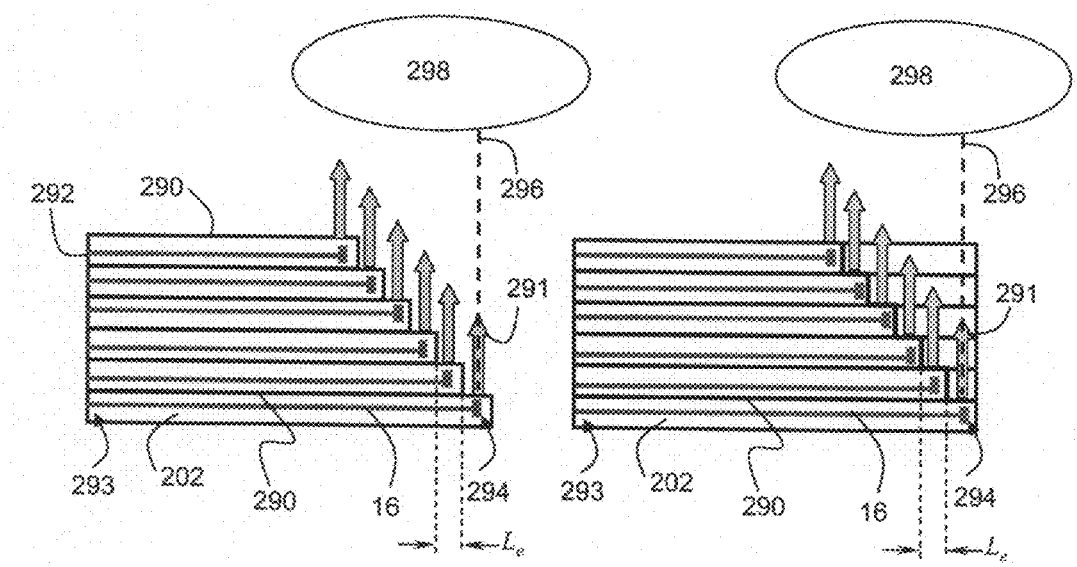

FIGS. 21a-b schematically illustrate a side view of two partially overlapping optical arrangements, according to various exemplary embodiments of the present invention. Shown in FIGS. 21a-b are layers 202 each having a surface 290 and an end 292. Waveguides 16 are embedded in layers 202 and extending, in each layer, from a first region 293 to a second region 294 of the layer, where first region 293 is preferably the input region and second region 294 is preferably the output region. The waveguides of one or more layers of device 200 can be arranged such that there is more than one input region and more than one output region. This embodiment is particularly useful when it is desired to reduce the number of layers in device 200. More detailed description of such configuration is provided hereinafter.

Second regions 294 are optically exposed. Thus, irrespectively of the position of the layer within the stack, there is a substantially free optical path 296 passing through surface 290 and connecting the environment 298 with optically exposed region 294. Thus, light 291 propagating within layers 202 (through waveguides 16) is allowed to exit layer 202 through surface 290 and into environment 298.

In the embodiment illustrated in FIG. 21a, regions 294 are physically exposed to the environment, thus establishing optical path 296. In the embodiment illustrated in FIG. 21b there is an overlap between adjacent layers at regions 294, such that optical path 296 passes through the layers. In this embodiment, layers 202 (or at least a portion of each layer) are manufactured from a material which enables transmission of visible light therethrough, so as to preserve optical path 296.

The skilled artisan would appreciate that the light can be coupled out of the layers through surface 290 irrespectively whether the layers are terminated at the optically exposed regions (as exemplified in FIG. 21a) or extend beyond them (FIG. 21b). Preferred configurations for coupling the light out of the layers according to various exemplary embodiments of the present invention are provided hereinunder.

When device 200 is used as a backlight assembly, the exposure length $L_e$ is preferably compatible with the inter-column separation $W_c$, and the separation $\Delta x$ between adjacent waveguides of the same layer along output region 20 is preferably compatible with the inter-row separation $H_r$ characterizing passive display panel 64. More specifically, $L_e = nW_c$ and $\Delta x = mH_r$, where n is an integer, and m is any number from about 0.1 to about 10. In various exemplary embodiments of the invention n=m=1 for ensuring that, for each layer, the waveguides illuminate all the sub-pixels of a respective column of panel 64 (hence to illuminate one sub-pixel per row). Alternatively, the integer n can equal 2 or more so as to allow each layer to provide illuminating light to two or more columns (hence to illuminate, in each row, two or more adjacent sub-pixels of the row). Different configuration for various choices of the integer's n and m are provided hereinunder.

According to a preferred embodiment of the present invention facet 208 of device 200 is defined by the optically exposed regions of the layers. Facet 208 can be slanted or it can have a two-dimensional stepped shape (a terrace). Each layer has an expanding arrangement of waveguides defined by a circumferential boundary as further detailed hereinabove, see e.g., circumferential boundary 22 in FIGS. 4b, 4e, 4f and 10a. Similarly to element 10 and device 30 above, a portion or all the waveguides 16 in each layer can be tapered or partially tapered, as desired. Additionally, the expanding arrangement of the waveguides 16 can be achieved by waveguide bends and/or corner mirrors, whereby waveguide bends are favored from the standpoint of optical losses while corner mirrors are favored from the standpoint of device thickness, as further detailed hereinabove.

As will be appreciated by one ordinarily skilled in the art, the expanding arrangement of the waveguides in each layer of device 200 results in optical resizing in one dimension shown by arrow 210 in FIG. 20, and the partially overlapping optical arrangement of the layers at facet 208 results in optical resizing in another dimension shown by arrow 212.

Figures 21C, 21D:
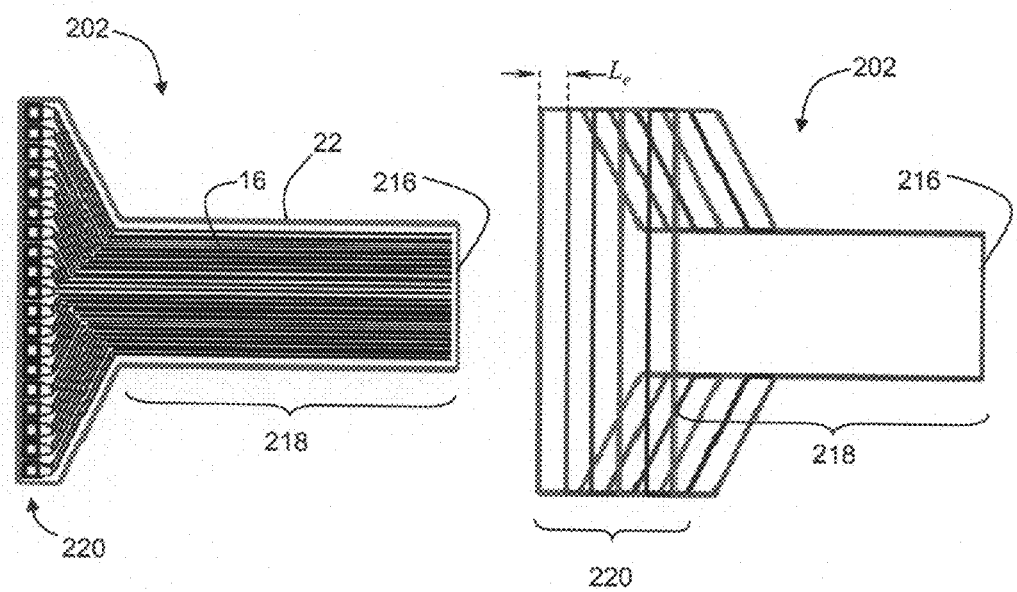

As illustrated in the representative example of FIG. 20, first facet 206 is defined by ends 216 of overlapping regions 218 of layers 202. FIGS. 21c-d schematically illustrate one (FIG. 21c) and several (FIG. 21d) layers of device 200, better showing end 216 of non exposed region 218. The exposed regions of layers 202 which form facet 208 are designated in FIGS. 21c-d by numeral 220.

Figures 22A, 22B:
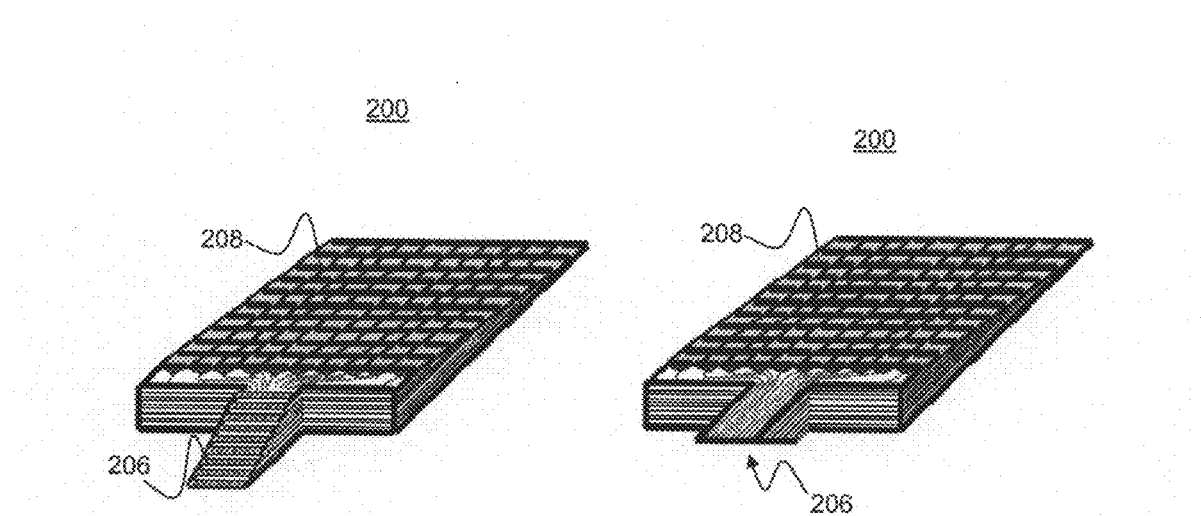
Figure 22C:
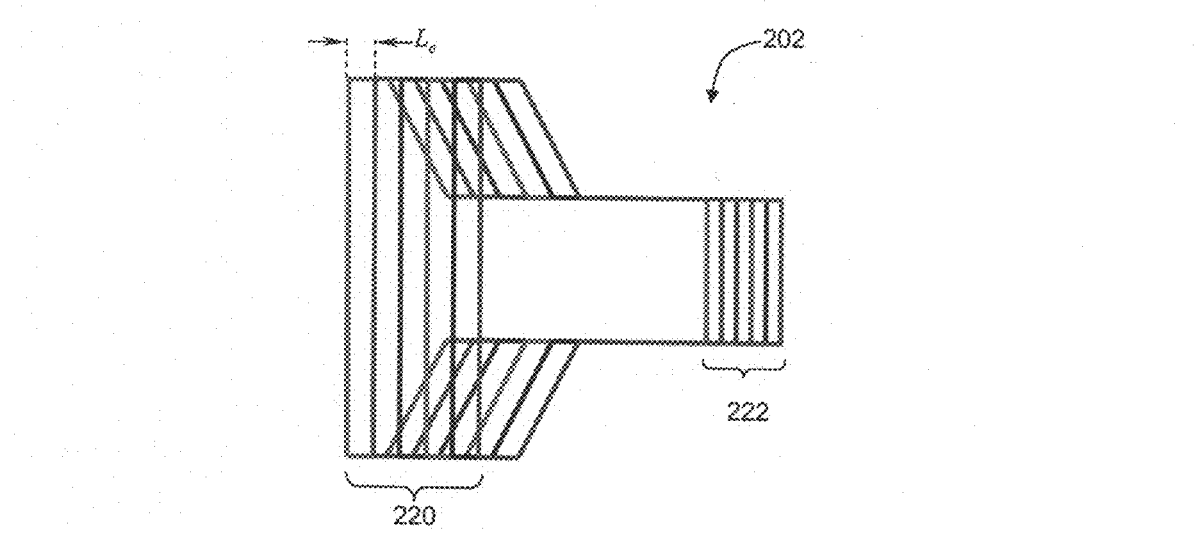

In an alternative embodiment, illustrated in FIGS. 22a-c, layers 202 are partially exposed at both first 206 and second 208 facets. Specifically, facet 206 (FIGS. 22a-b) is defined by exposed regions 222 (FIG. 22c) and facet 208 is defined by exposed regions 220. The difference between the above embodiments is that when facet 206 is defined by ends of overlapping regions, the light exits device 200 at a perpendicular direction to its direction on entry, while when facet 206 is defined exposed regions, the light exits device 200 at a parallel (FIG. 22b) or opposite (FIG. 22a) direction to its direction on entry.

Figure 22D:
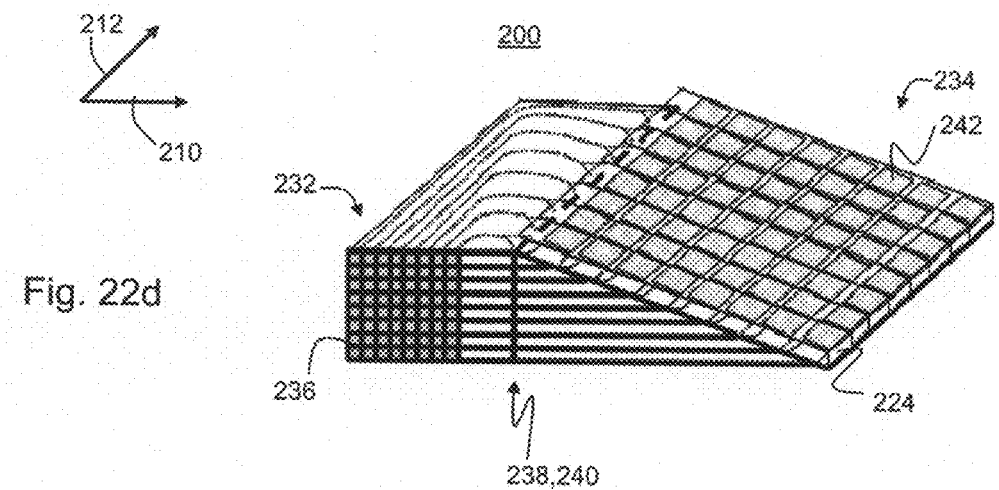

Reference is now made to FIG. 22d which is a schematic illustration of device 200 in a preferred embodiment in which device 200 comprises two optical elements 232 and 234, where element 232 provides optical resizing in one dimension (designated by arrow 212) and element 234 receives the partially resized light and resizes it the other dimension (arrow 210). Preferably, but not obligatorily, element 232 is smaller in size than element 234.

Figure 22E:
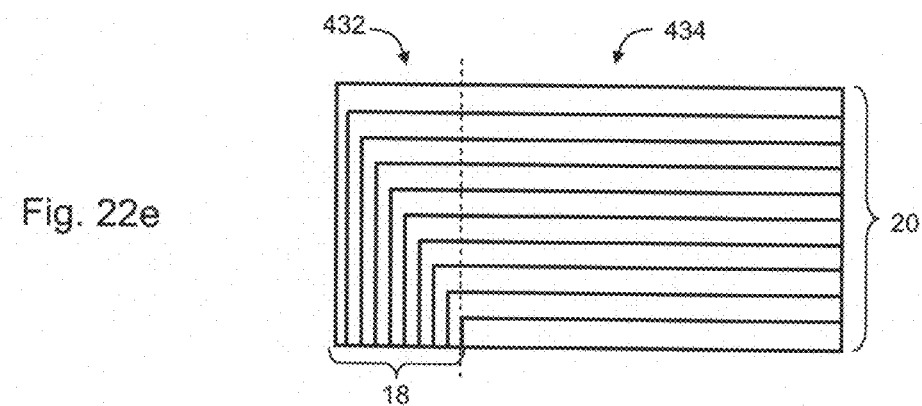
Figure 22F:
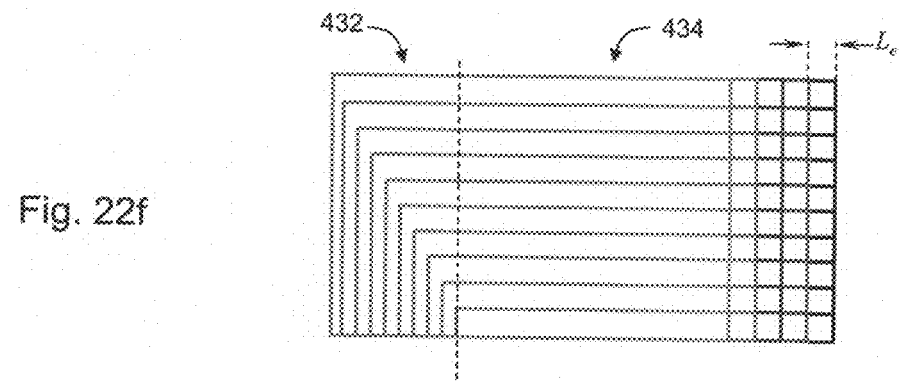

Elements 232 and 234 can be manufactured in separate manufacturing processes and be optically coupled thereafter, or, more preferably, they can be integrated element in which case their optical coupling can be achieved during the manufacturing process. In the latter embodiment, each layer of device 200 has two portions 432 and 434 (not shown, see FIG. 22*e-f*), portion 432 is designated for element 232 and portion 434 is designated to element 234. This embodiment is better illustrated in FIGS. 22*e-f* showing top view of one layer (FIG. 22*e*) and several layers (FIG. 22*f*) stacked one over the other in a partial overlapping optical arrangement. In the layer shown in FIG. 22*e*, the waveguides extend from a first region 18 to a second region 20, thereby forming a longitudinally expanding arrangement, as further detailed hereinabove. Also shown in FIG. 22*e* are first 432 and second 434 portion which, as stated are designated for elements 232 and 234, respectively. Once the layers are stacked, element 232 is formed from portions 432 and element 234 is formed from portions 434.

Figure 27C:
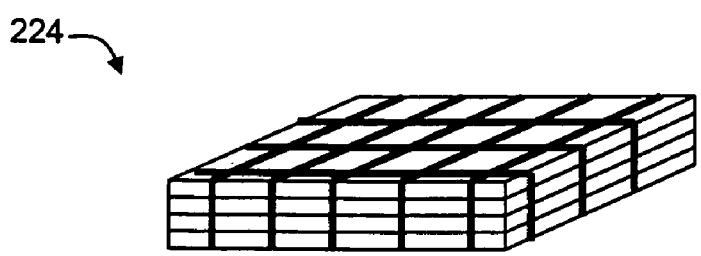
Figure 27D:
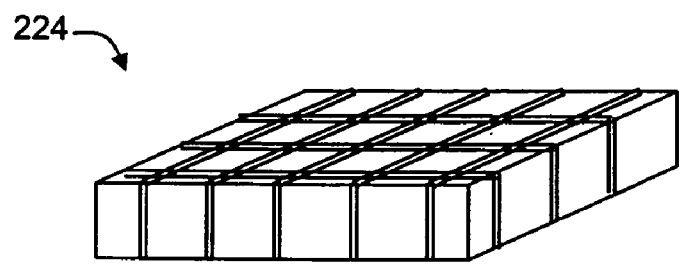
Figure 27E:
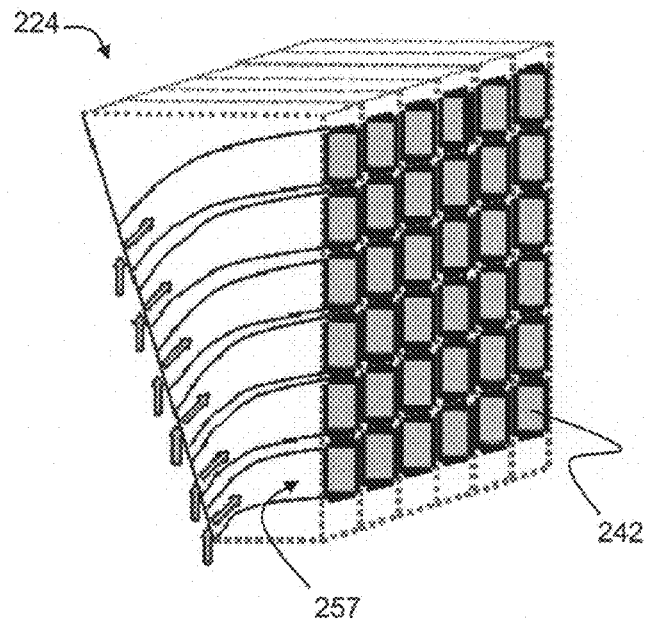
Figure 27F:
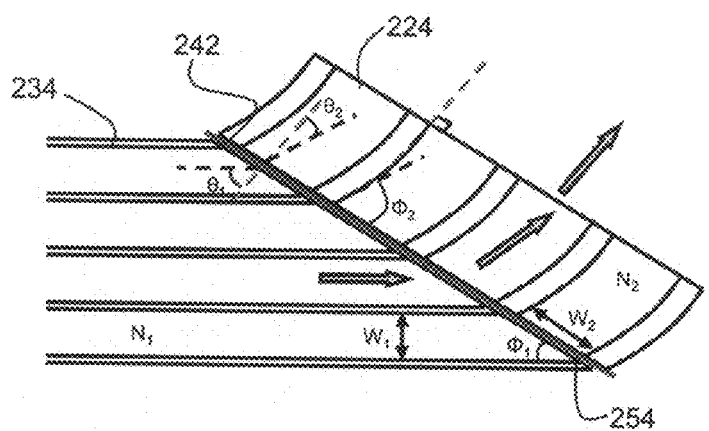
Figure 27G:
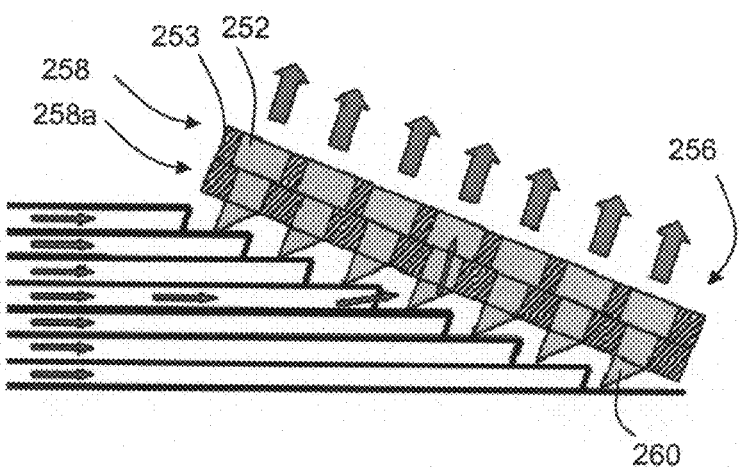
Figure 27H:
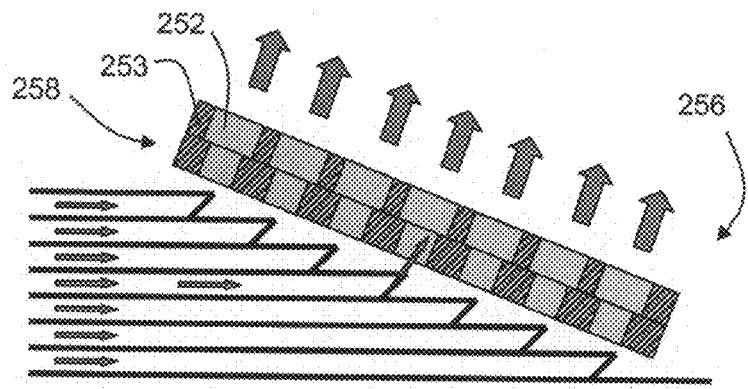

In the embodiment in which the optical element are manufactured in separate manufacturing processes, each of elements 232 and 234 can be independently manufactured layerwise or as a bulk, as further detailed hereinunder (see FIGS. 26-27*h* and accompanying description). According to a preferred embodiment of the present invention element 232 serves as the transmitting element within device 200, whereby light entering element 232 through facet 236 is transmitted by element 232 through facet 238 which is located at the interface between elements 232 and 234. In this embodiment, element 234 serves as the receiving element within device 200, whereby the light transmitted by element 232 is received by element 234 through facet 240, also located at the interface between the devices. After being resized in dimension 210 the light exits element 234 through facet 242.

In the exemplified configuration shown in FIG. 22*d* optical element 234 is manufactured according to the principle of partially overlapping optical arrangement, as further detailed hereinabove, whereby the exposed portions of its layers form facet 242. Similarly to facet 208 above, facet 242 can be slated or it can have a terrace shape. Also illustrated in FIG. 22*d* is an expanding structure 224 which according to a preferred embodiment of the present invention is optically coupled to facet 242. Expanding structure 224 serves for expanding light rays passing therethrough, as further detailed hereinunder.

As will be appreciated by one of ordinary skill in the art, the expanding arrangement of the waveguides in element 232 results in optical resizing in dimension 212, and the terrace or slanted shape of facet 242 of element 234 results in optical resizing in dimension 210. The cladding layers of device 200 can be made of an absorbing or non-absorbing material, as desired. The advantage of using absorbing material is that it improves the contrast, and the advantage of using a transparent material is that it allows the manufacturing of a transparent display which does not block the scene behind it. Additionally, polarizers can be added between the waveguides cores, as further detailed hereinabove (see FIG. 15).

The coupling of light out of the partially overlapping optical arrangement of the present invention can be achieved in more than one way. Broadly speaking, redirecting optical elements are employed for redirecting the light out of the waveguides. The redirecting elements can operate on any optical principle, including reflection, refraction, diffraction and any combination thereof.

Hence, in one preferred embodiment, the light is coupled out of facet 208 using an arrangement of reflecting elements. In this embodiment, the light propagates through the waveguides substantially in parallel to the surface of the layer until it impinges on the reflecting elements which redirect the light outwards through the surface. In another embodiment, the light is coupled out of facet 208 using an arrangement of transmitting elements (e.g., waveguides, transmissive diffractive elements etc.). Also contemplated, is a combination of reflecting and transmitting elements. Representative examples of redirecting optical elements suitable for the present embodiments include, without limitation, mirrors (e.g., total internal reflection mirrors, etched mirrors, coated mirror, planar facet mirrors, non-planar facet mirrors), wedge structure (e.g., diffractive wedge structures), Bragg reflectors, holographic optical elements and the like.

The number of redirecting elements can vary, from one to a plurality of redirecting elements per waveguide. When a layer of device 200 has one redirecting element per waveguide, each such waveguide emits the light from a single location along the waveguide at the optically exposed region of the layer. In this embodiment, when device 200 is used as a backlight assembly, the light emitted by each such waveguide illuminates a single sub-pixel position of the passive display panel. When a layer of device 200 has two or more redirecting elements per waveguide, each such waveguide emits the light from two or more spaced apart locations along the waveguide at the optically exposed region of the layer. In this embodiment, when device 200 is used as a backlight assembly, the light emitted by each such waveguide illuminates a plurality of sub-pixel positions along a column of the passive display panel. Thus, according to the presently preferred embodiment of the invention the separation between the spaced apart light emitting locations substantially equals the inter-row separation $H_r$ characterizing the passive display panel. The use of a plurality of redirecting elements per waveguide is also useful when multichromatic (e.g., white) light propagates in the waveguides of the backlight assembly. In this embodiment, the light emitted by each such waveguide illuminates a plurality of sub-pixel positions or pixel regions, either along a column or along a row of the passive display panel.

Following is a more detailed description of preferred techniques for coupling the light out of the waveguides. The embodiment in which the light is coupled out via an arrangement of reflecting, diffractive and/or refractive elements is described first, and the embodiments in which the light is coupled out via an arrangement of transmitting elements and various combinations of reflecting and transmitting elements are described hereinafter (see FIGS. 26-27*h*).

Reference is now made to FIGS. 23*a-b*, which are schematic illustrations of a side view (FIG. 23*a*) and a top view (FIG. 23*b*) of a portion of facet 208 of device 200 in a preferred embodiment in which facet 208 has a two-dimensional stepped shape (a terrace). Reference is also made to FIGS. 23*c-d* which are schematic illustrations of a mirror 282 placed in the layers of device 200, according to the presently preferred embodiment of the invention.

As shown in FIGS. 23*a-b*, a few mirrors 282 (e.g., total internal reflection mirrors) with different reflection coefficients are preferably placed in a reflection region 283 of each layer 202 of device 200. Mirrors 282 collect light propagating in the layers and redirect it so as to couple the light out of facet 208. The propagating light and redirected light are designated in FIGS. 23*a-b* by numerals 284 and 286, respectively. Mirrors 282 are preferably wide, so as to optimize the collection and coupling of the light. The different reflection coefficients of mirrors 282 can be realized by providing mirrors of different heights.

Alternatively, mirrors 282 can be narrow, without variations of reflection coefficients such that light striking the mirrors is fully reflected. Preferably, mirrors 282 are disposed substantially homogenously across reflection region 283 to facilitate efficient collection of light 284. Such configuration results in a substantially homogeneous reflection of light out of facet 208. As shown in the top view of facet 208 (FIG. 23*b*) redirected light 286 can be further expanded in two dimension upon striking the boundary between facet 284 and the external medium. Such expansion typically occurs when facet 284 is coated by a protective coat, such as, but not limited to, a glass or a polymer or when the light is coupled downside as illustrated in FIG. 33*b*. The redirected light before and after being expanded on the protective coat, is illustrated in FIG. 23*b* by squares 286 and circles 288, respectively.

Still alternatively, both methods can be combined, for example, by placing narrow partially reflecting mirrors across the terrace surface. The mirrors can be fabricated in polymer waveguides, e.g, by molding or ablation process.

With reference to FIGS. 23*c*-*d*, mirrors 282 can have a planar (FIG. 23*c*) or non-planar (FIG. 23*d*) shape. Flat mirrors are preferred in applications in which a narrow or moderate field-of-view is required and can be obtained, for example, using a series of laser ablation pulses. Non-planar mirrors are preferred in applications in which the required field-of-view is wide, and can be obtained, for example, using fewer (e.g., one) laser ablation pulse.

Reference is now made to FIGS. 48*a*-*d* which are schematic illustrations of an optical redirecting element 508 in preferred embodiments of the invention in which element 508 is a partially reflecting elements. Light 284 propagating in waveguide 16 bifurcates at element 508, such that a first portion 286 is redirected out of waveguide 16 while a second portion 287 continues to propagate in waveguide 16.

Figure 48A:
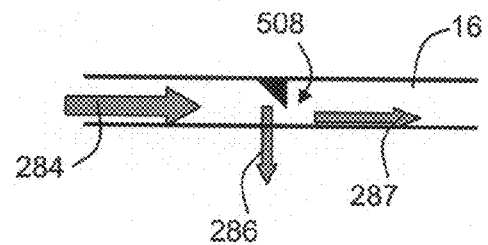

In the schematic illustration of FIG. 48*a* element 508 is a reflecting or diffractive element, such as, but not limited to, a wedge structure or a Bragg grating, which only partially occupies the cross section of waveguide 16. In this embodiment, redirected portion 286 is reflected off element 508 while non-redirected portion 287 passes at the gap between element 508 and waveguide 16. The relative amount of reflected and transmitted light depends on the size of the gap between element 508 and waveguide 16. Generally, small gap corresponds to high reflection and low transmission and vice versa.

Figure 48B:
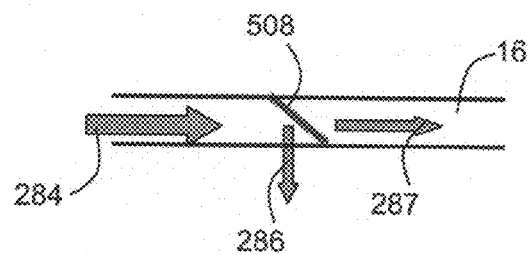

In the schematic illustration of FIG. 48*b* element 508 comprises a region characterized by a refractive index which differs from the refractive index of the core. In this embodiment, redirected portion 286 is reflected off element 508 while non-redirected portion 287 is refracted through element 508. The relative amount of reflected and refracted light depends on the difference in refractive indices. Generally, small difference corresponds to low reflection and high transmission and vice versa. The slanted pattern of element 508 can be achieved, for example, by molding the waveguide with a wedge pattern, depositing a thin layer of a different refractive index material into the dint, and refilling the dint with the core index material. The tilt angle of element 508 with respect to the axis of the waveguide is not limited and can be any acute angle.

Figure 48C:
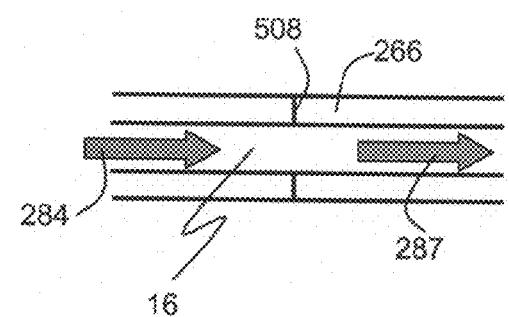
Figure 48D:
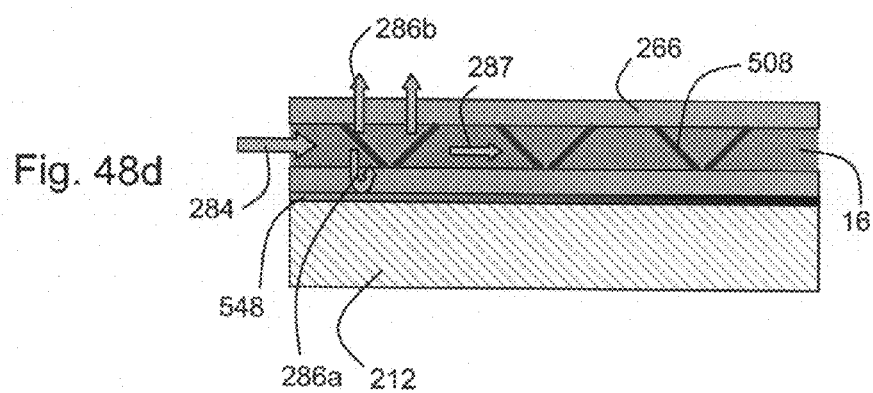

In the schematic illustration of FIG. 48*c* element 508 is placed at the cladding 266 of waveguide 16. In this embodiment, the redirected portion comprises the redirected evanescent waves (perpendicular to the plane of FIG. 48*c*) and non-redirected portion 287 comprises the main propagating beam guided in the core. The relative amount of redirected and transmitted light depends on the waveguide width or reflection element distance from the core. FIG. 48*d* schematically illustrates an embodiment in which element 508 comprises semi transparent wedge structures slanted at an angle to waveguide 16, such that there are two redirected portions of the light. One portion, designated 286*a* is reflected to one direction while the other portion, designated 286*b* is refracted to another direction. In this embodiment, substrate 12 is preferably coated by a reflective coat 548 such that one of the redirected portions is reflected back and exits the waveguide from the same side as the other redirected portion. The relative amount of redirected and transmitted light depends, inter alia, on the reflectivity of coat 548. When the waveguide has a plurality of elements 508, the invention coat 548 preferably has a gradually increasing reflectivity so as to provide a substantially uniform optical output.

The advantage of the partially reflecting elements is that the redirected portion can be polarized. This is particularly useful when device 200 is used as a backlight assembly, where it is desired to illuminate the liquid crystal molecule by polarized light. Thus, partially reflecting elements can be used instead of a back polarizer. For example, for refractive index difference of 0.05 between the core and the redirecting element (see, e.g., FIG. 48*b*) the reflected portion from a slot positioned at 45° is polarized to a ratio of 30 dB.

Figure 48E:
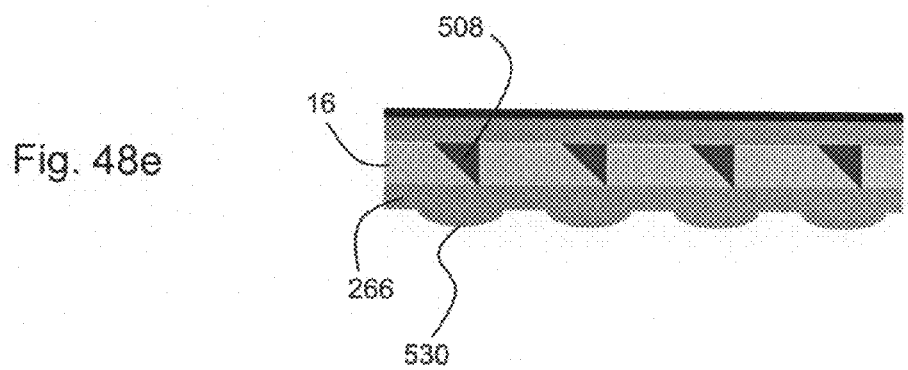

FIG. 48*e* schematically illustrates an embodiment in which cladding 266 of waveguide 16 is shaped such that the light is focused by cladding 266 subsequently to its redirection. This embodiment can be employed for any type of redirecting element. Cladding 266 can be shaped by means of etching or molding to achieve the desired scattering or focusing shape.

Reference is now made to FIGS. 24*a*-*e* which are schematic illustrations of a side view of optical element 234, according to various exemplary embodiments of the present invention. Layers 202 of element 234 serve for two purposes: (i) coupling the light out of element 234, and (ii) facilitating the optical resizing (expansion, in the present example) in dimension 210. The propagating light and the outgoing light are designated in FIGS. 24*a*-*e* by numerals 246 and 247, respectively. Also shown in FIGS. 24*a*-*e* is the typical pixel or sub-pixel size characterizing outgoing light 247. The pixel size designated in FIGS. 24*a*-*e* by numeral 249.

Figure 24A:
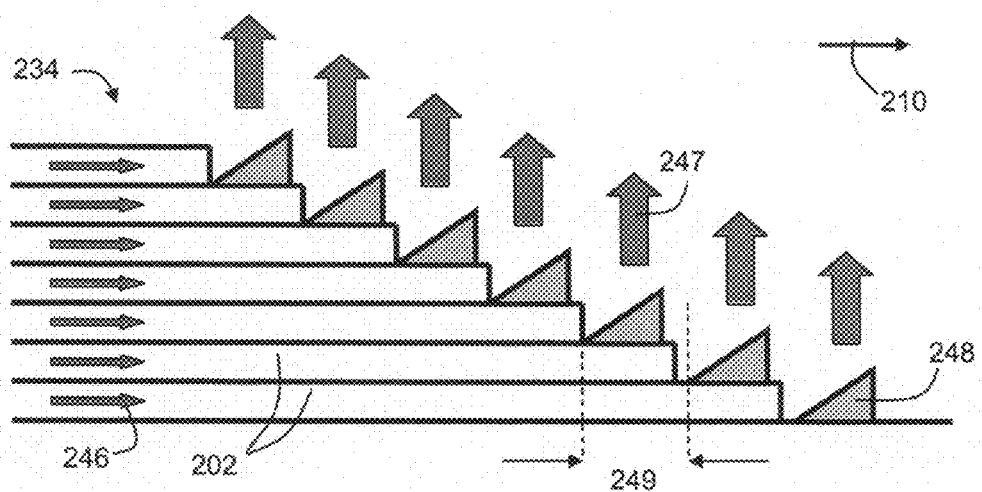
Figure 24B:
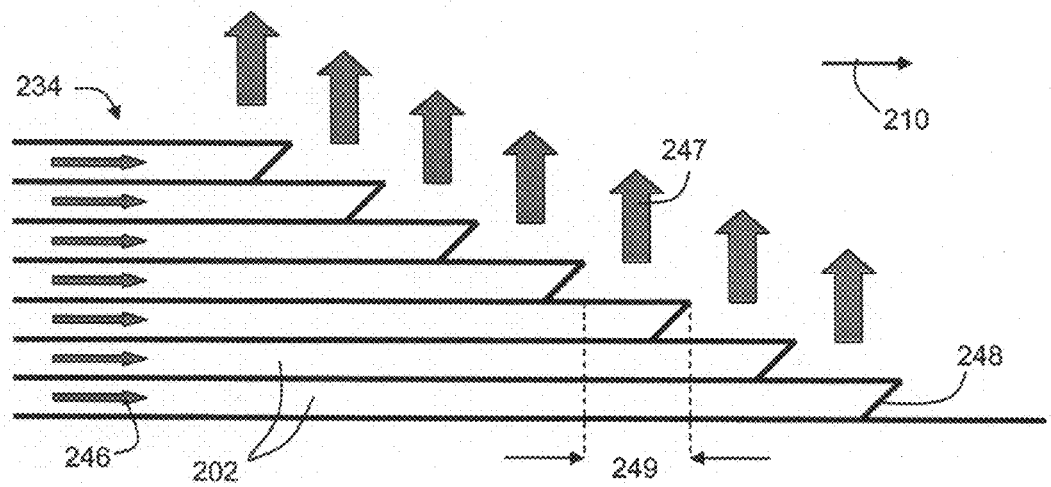

The coupling of light out of element 234 can be achieved in more than one way. In one embodiment, illustrated in FIGS. 24*a*-*b*, layers 202 comprises mirrors 248 positioned on the terminals the waveguide so as to redirect light rays 246 propagating therethrough. Mirrors 248 can be 45° mirrors—total internal reflection (TIR) mirrors, full or partially reflective mirrors and they can have a planar or non-planar shape, as further detailed hereinabove. Additionally, the mirrors can be coated with a high reflecting material. FIG. 24*a* illustrates the preferred embodiment in which 45° mirrors are used and FIG. 24*b* illustrates the preferred embodiment in which TIR mirrors are used.

Figure 24C:
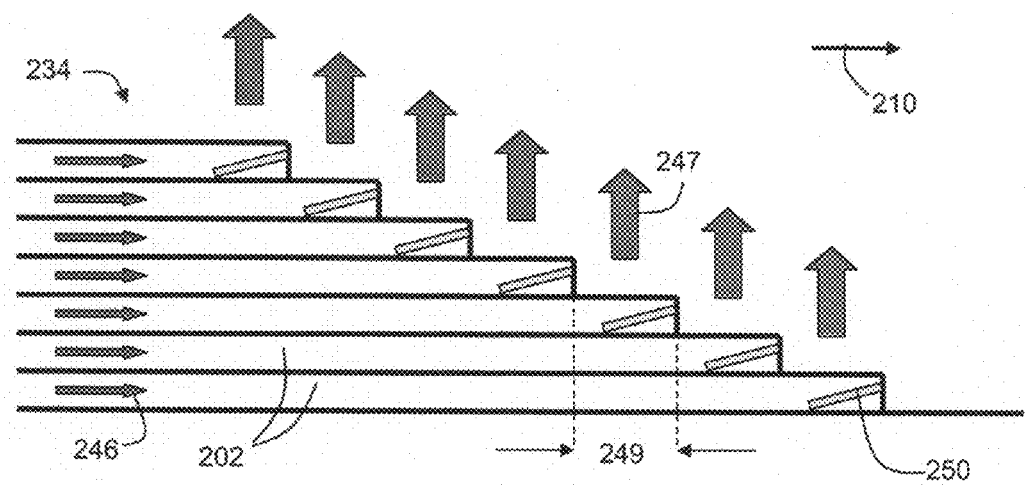
Figure 24D:
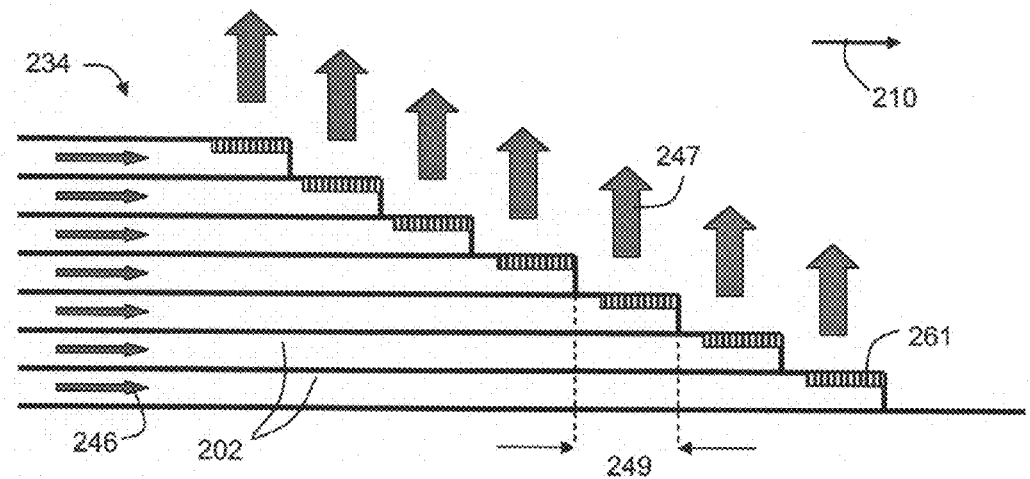
Figure 24E:
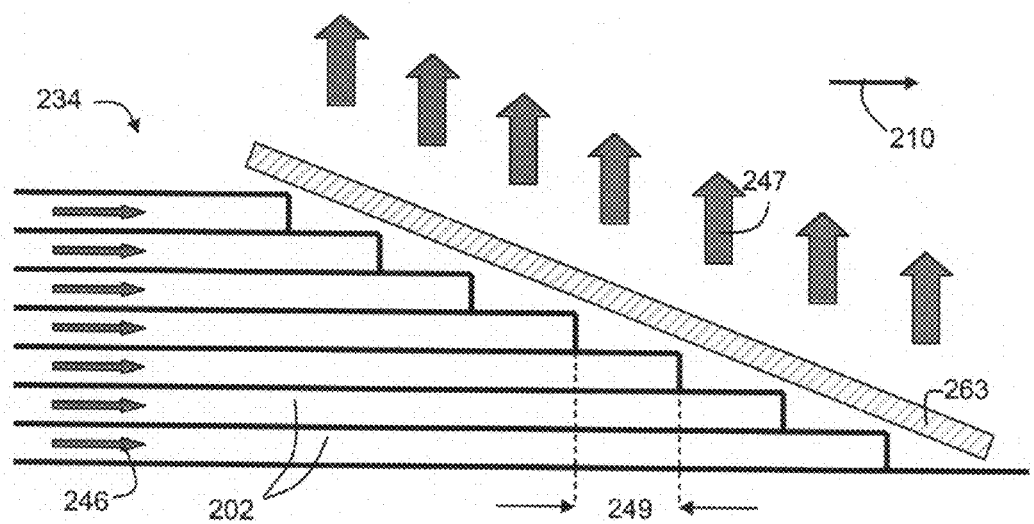

In another embodiment, illustrated in FIG. 24*c*, grooves 250 are formed in layers 202 so as to force total internal reflection hence redirection of light out of the layers. In an alternative embodiment, illustrated in FIG. 24*d*, element 234 comprises a Bragg reflector 261 which redirects the light rays out of light out of element 234. In still another embodiment, element 234 comprises a holographic optical element 263, designed and constructed the redirect the light rays out of light out of element 234.

Element 234 can be manufactured as a part of element 232, in which case the layers forming the elements are made of a single substrate, using, for example, a photomask of the type shown in FIG. 21*c* above. More preferably, each layer can be processed using a different mask so as to reduce potential vertical coupling. Such manufacturing process also reduces the length of the waveguides, whereby a single diagonal path can be utilized (rather than two perpendicular paths). The layers can be fabricated to their exact length and then stacked to form facet 242, or they can be first stacked to form the facet 242 and then polished or cut thereafter to form facet 236.

Element 234 can also be manufactured as a separate unit, for example by stacking layers with substantially parallel waveguides one over the other, to form a partially overlapping optical arrangement in which facet 242 has a slanted or terrace shape.

According to a preferred embodiment of the present invention, the layers of device 200 are made of polymeric material, more preferably a flexible polymeric material, to facilitate flexibility of device 200. Furthermore, the layers of device 200 can be attached to each other on one side (e.g., the input side) while allowing their other sides (e.g., the output side) to be detached. With such configuration, device 200 can be made foldable. A representative example of a foldable device is illustrated in FIG. 25, showing device 200 in which layers 202 are attached on their input side 251 and allowed to be detached on their output side 255. In the preferred embodiment in which device 200 is manufactured as two separate elements 232 and 234 which are coupled thereafter, it can be made foldable by fully attaching the layers of element 232 and partially attaching the layers of element 234.

Reference is now made to FIGS. 26*a-b* which are simplified illustrations of a side view (FIG. 26*a*) and an exploding diagram (FIG. 26*b*) of the preferred embodiment in which the light is coupled out via an arrangement of transmitting elements. With reference to FIG. 26*a*, an optical element 110 has a first 112 and a second facet 114, where facet 114 is slanted at an angle $\beta$ hence being larger than facet 112. Element 110 has a plurality of waveguides 16 extending from facet 112 and bended towards facet 114, thus providing optical resizing along direction 115.

In the exemplified configuration shown in FIG. 26*a*, waveguides 16 arrive at facet 114 at an angle $\psi$, conveniently defined relative to the normal 116 to the facet. $\psi$ can have any value which allows the optical communication between element 110 and the environment and provide optical resizing. Generally, optical communication and optical resizing can be achieved whenever with the environment for any value of $\psi$ which is lower than some angle $\psi_c$. Preferable, $\psi$ is approximately zero, in which case waveguides 16 arrive to facet 114 approximately perpendicularly.

Bended waveguides can be manufactured, e.g., according to the principles of element 10 above. For example, referring to the exploding diagram of FIG. 26*b*, layers of trapezoidal or similar shape can be stacked one onto the other, such that their surfaces 117 substantially overlap, and their ends 119 form slanted facet 114. Light thus propagates within the layers (through the waveguides) and exits the layer through end 119.

Element 110 can be optically coupled to any of the above optical elements such as to provide optical resizing in two dimensions. For example, element 110 can replace element 34 of device 30 or element 234 of device 200.

FIGS. 27*a-b*, schematically illustrates another preferred manufacturing process of element 234. In this embodiment, element 234 is processed by stacking alternating sheets of high index material and low index material to form a stack 231 before the formation of waveguides 233 therein. Subsequently, a slant cut is performed in stack 231 to form slanted facet 242. Once facet 242 is prepared individual waveguides 233 are formed in stack 231 by etching grooves 235 therethrough. To avoid too deep etching, the process can be executed in batches of, say, tens or hundreds of layers, whereby the grooves are etched batch by batch. Thus the manufacturing process preferably includes four steps, in which in a first step batches of stacked layers are prepared, in a second step the batches are etched to form the grooves therein, in a third step the batches are stacked one onto the other, and in the fourth step the stack of batches is cut along a slanted line to form slanted facet 242.

Grooves 235, which separate between the waveguides of each layer, may be filled with a filling material whose refractive index is lower than the refractive index of the waveguides (the high index material). If desired, the difference between the refraction indices of the filling material and the waveguides is preferably large (e.g., about 0.1 or more), so as to provide a wide field-of-view at the output of element 234. The filling material preferably has enhanced light absorbing properties to reduce scattered light. Representative example of such material include, without limitation, is a black tone added to the low index polymer. Alternatively, grooves 235 can remain unprocessed in which case the waveguides are separated by air.

An additional manufacturing process for device 200 is provided hereinunder (see FIGS. 29*a-e*, below).

Reference is made to FIGS. 27*c-h* which are schematic illustrations of expanding structure 224, according to various exemplary embodiments of the present invention.

As stated, structure 224 serves for expanding the light beam passing therethrough, in addition to the optical resizing provided by element 232 or as an alternative thereto. Thus, in the preferred embodiments in which structure 224 is employed, device 200 may or may not include optical element 232.

Referring to FIGS. 27*c-e*, in the preferred embodiment illustrated in FIG. 27*c*, structure 224 comprises a stack of patterned layers; in the preferred embodiment illustrated in FIG. 27*d* structure 224 comprises a bulk of guiding material patterned and grooved; and in the preferred embodiment illustrated in FIGS. 27*e-f*, structure 224 comprises a stack of layers of banded waveguide in expanding arrangement, similarly to the construction and operation of optical element 10. To reduce reflection at the interface between element 234 and structure 224, an antireflection coat or an index matching material 254 can be added between facets 242 and structure 224.

In the latter embodiment (FIGS. 27*e-f*), the shape and materials of element 234 and structure 224 are preferably selected such that guided light is bent towards the inner side 275 of facet 242 while scattered, non-guided light, continues to propagate in its original direction impinging on inner side 275 of facet 242 at an angle which is above the critical angle for total internal reflection. As will be appreciated by one ordinarily skilled in the art, when non-guided light is not emitted from facet 242, device 200 is less sensitive to contrast reduction due non-guided light.

Thus, according to the presently preferred embodiment of the invention the scattered light is not emitted from facet 242. In another embodiment the waveguides of structure 224 have higher index of refraction compared to the waveguides of element 234. In this way the aspect ratio (cladding layer width to thickness) at element 224 can be eased. Element 234, shown in FIG. 27*f*, is composed of layers of core material and layers of cladding material. Being deposited and not etched, cladding layers which can be substantially thinner than the core layers, can be fabricated. In the embodiment shown in FIG. 27*e*, structure 224 is composed of thick layers with wide core and relatively wide cladding barrier. As too narrow cladding barriers are difficult to be fabricated in a thick layer, it is preferred to increase the width of the waveguides (and barriers).

According to a preferred embodiment of the present invention the spatial and optical parameters of element 234 and structure 224 are selected so as to satisfy Snell's law. Specifically, $N_1 \sin \theta_1 = N_2 \sin \theta_2$ and $W_1/W_2 = \sin \phi_1/\sin \phi_2$, where $N_1, N_2$ are the refraction indices of the waveguides of element 234 and structure 224, respectively, $W_1, W_2$ are the thickness of the layers of element 234 and the width of layers of structure 224, respectively, $\phi_1$ is the slanting angle $\phi_1$ of facet 242, $\phi_2$ is the banding angle of the waveguides of structure 224, $\theta_1 = 90° - \phi_1$ and $\theta_2 = 90° - \phi_2$. As a numerical example, for $N_1 = 1.50$, $\theta_1 = 5.7°$, $N_2 = 1.7$ a ratio between $W_2$ and $W_1$ is $W_2/W_1 = 4.8$.

When the waveguides of element 234 are separated by grooves (rather than formed in the individual layers, see FIGS. 27a-b and the accompanying description), structure 224 is preferably manufactured using the same technology. The advantage of this embodiment is that it can reduce optical losses at the interface between element 234 and structure 224. Additionally, the use of the etching technology preserves a high index contrast. Thus, according to a preferred embodiment of the present invention structure 224 is fabricated and attached to stack 231 (see FIG. 27a-b) before etching. Thereafter, stack 231 and structure 224 are etched to form the grooves. Within structure 224, low spatial modes (perpendicular to the grooves) are guided between the cladding layers thereof and the high spatial modes are guided between the grooves.

In the embodiment illustrated in FIGS. 27g-h, structure 224 comprises a stack 256 of layers 258 with regions 252 of high refractive index and regions 253 of low refractive index. The regions can be cuboids or have any other geometrical shape. Light propagates through regions 252, substantially perpendicular to layers 258. The lower layer of structure 224 (designated layer 258a) is an array of high index cuboids terminated by mirrors 260 (e.g., TIR mirrors) which are preferably, but not obligatorily curved for enhancing the beam divergence with structure 224. Regions 252 of the other layers 258 of structure 224 are preferably larger than regions 252 of layer 258a for reducing alignment tolerance requirements. When the mirrors are formed of or coated with metal, the space between element 234 and structure 224 is preferably filled with low refractive index filling material for reducing back reflections and beam divergence. Within the layer of structure 224, the space between the regions 252 can be filled with absorbing black material to reduce scattered light and improve display contrast. Optical coupling between element 234 and structure 224 can also be effected by providing waveguides with slanted ends within element 234 (see FIG. 27h).

Reference is now made to FIGS. 28a-c which are schematic illustrations of a top view (FIGS. 28a-b) and a side view (FIG. 28c) of layers of device 200 in a preferred embodiment in which the layers are low-weight layers. FIG. 28a is a top view of layer 202 of one optical element (element 232, element 234 or both elements 232 and 234 in the embodiment in which they have common layers). As shown in FIG. 28a, waveguides 16 are only partially tapered at their end 262, while along most of their length the cross section remains substantially unchanged. According to the presently preferred embodiment of the invention waveguides 16 are coated with a thin layer 264 of lower index cladding material (not shown, see FIG. 28c) and the reminding space can be left substantially empty. Such configuration allows the reduction of weight of each layer hence also of device 200. For construction purposes, supporting members 260 are preferably placed between waveguides 16, so as to maintain the planar shape of each layer and prevent collapsing of layers. Supporting members 260 can be made of short section waveguides which are fabricated in parallel with the entire waveguides. Members 260 can have any geometrical shape (e.g., a cuboid).

FIG. 28b is a top view of layer 258 of expanding structure 224. In a similar way to layer 202, the high refractive index regions 252 of structure 224 can be spaced apart so as to reduce the weight of each layer of structure 224. Supporting members 260 can be placed between regions 252 to maintain the planar shape of each layer of structure 224 and prevent collapsing, FIG. 28c is a side view of layers 202 or 258, showing members 260 positioned between adjacent light transmitting elements (waveguides 16 or high refractive index regions 252). Also shown in FIG. 28c is the preferred construction of each individual layers in which the light transmitting elements are formed on a bottom cladding layer 266 and coated by a top cladding layer 264.

Another way to reduce the overall weight of device 200 is to minimize the empty areas on each layer by manufacturing layers in the shape of the circumferential boundary 22, as shown in FIG. 21c above.

Reference is now made to FIGS. 29a-e which are schematic illustrations of a preferred folding technique for manufacturing device 200, according to various exemplary embodiments of the present invention. The folding technique is advantageous in applications in which it is preferred to manufacture rectangular layers, e.g., to facilitate mass production of the layers. The folding technique can be employed both for manufacturing any part of device 200. Specifically, the folding technique can be employed for manufacturing elements which provide optical resizing in one dimension or two dimensions. In the representative examples illustrated in FIGS. 29a-e, the folding technique is employed for manufacturing optical element which provides optical resizing in two-dimensions, whereby the expanding arrangement of waveguides in each layer provides the optical resizing in the first dimension and the partially overlapping optical arrangement provides the optical resizing in the second dimension.

As stated hereinabove, the layers of device 200 are preferably formed of a flexible polymer. Additionally, the layers are preferably made sufficiently thin to allow their folding. Once a rectangular layer is formed it is being folded to form a predetermined angle of about 90° (with a radius of curvature allowed by the polymer waveguides so as not to increase the bend loss). The folded layer thus comprises an expanding arrangement of waveguides, whereby the input region is smaller than the output region. A representative example of a folded layer 270 with an input region 273 and an output region 271 is illustrated in FIG. 29a, and selected steps of the manufacturing process are illustrated in FIGS. 29a-d.

Figures 29A, 29B, 29C, 29D:
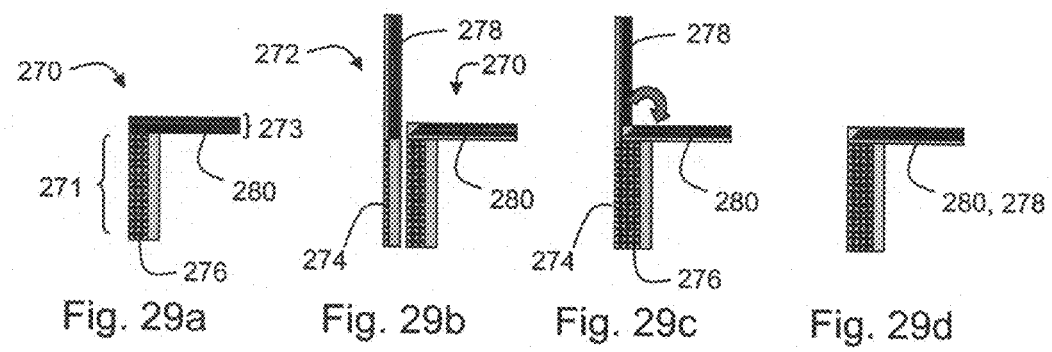
Figure 29E:
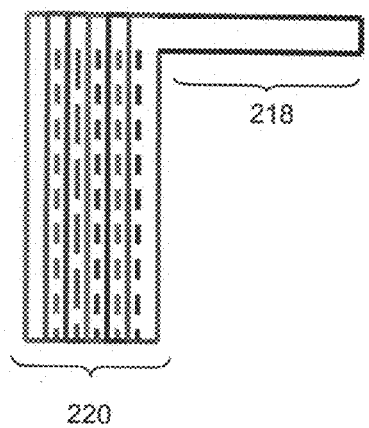

Shown in FIG. 29a-d are a folded layer 270 (FIG. 29a) having input waveguides 280 and output waveguides 276, and an additional layer 272 (FIG. 29b) which is added to folded layer 270, in a manner such that the output waveguides 274 of layer 272 are aligned to the output waveguides 276 of layer 270 (FIG. 29c). Layer 272 is then folded (FIG. 29d) such that the input waveguides 278 of layer 272 are aligned with the input waveguides 280 of layer 270. A top view of the resulting partially overlapping arrangement of layers is schematically illustrated in FIG. 29e, showing exposed regions 220 and overlapping regions 218.

It is understood that the above fabrication process can also be carried out in a reverse order. In this embodiment, the input waveguides 280 of layer 270 are aligned first and the output waveguides 274 of layer 272 are aligned thereafter.

FIGS. 30a-b are schematic illustrations of a simultaneous process for manufacturing four optical elements, in various exemplary embodiments of the invention. FIG. 30a illustrates a top view of layers 300 which can be used to form four optical elements. Once layers 300 are prepared, they are stacked and cut along vertical path 306 to form two stacks 302 of layers (see FIG. 30b). Subsequently stack 302 can be cut along a slanted path 304.

Reference is now made to FIG. 31 which is a schematic illustration of device 200 in a preferred embodiment in which device 200 receives light from a plurality of sources. In the representative example illustrated in FIG. 31, device 200 receives optical input from four light sources (not shown). Device 200 comprises two optical elements, designated 132a and 132b, both serving as transmitting elements within device 200, and one optical element, designated 134 serving as receiving element within device 200. Element 134 comprises a slanted or terrace facet 242 and is optically coupled to both elements 132a and 132b. The principles and operations of elements 132a and 132b are similar to the principles and operations of elements 320a and 320b above, mutatis mutandis the coupling to slanted element 134. Two light beams enter each one of elements 132a and 132b (beams 310a and 311a enter element 132a, beams 310b and 311b enter element 132b). The light beams are transmitted from elements 132a and 132b to element 134 and conjointly exit element 134, as expanded light beam 314.

Reference is now made to FIGS. 32a-b which are schematic illustration of a top view (FIG. 32a) and a cross sectional view (FIG. 32b) of device 200 in a preferred embodiment in which device 200 receives optical input in the form of a plurality (e.g., two or more) of monochromatic light sources. The optical input can be used for illuminating each sub-pixel position of passive display panel 64 by the respective color channel or to produce a resized chromatic light beam, e.g., for the purpose of provide a magnified chromatic image using a plurality of monochromatic images, as further detailed hereinabove. FIG. 32b is a cross sectional view along the cut AA' in FIG. 32a.

In the representative example shown in FIGS. 32a-b, device 200 comprises a plurality of layers 320 in a partially overlapping optical arrangement forming three input facets 326a, 326b and 326c, and one output facet 328 having a slanted or terrace shape, as further detailed hereinabove. Layers 320 can be manufactured using the folding technique or using any other of the aforementioned technique. It is to be understood that although FIGS. 32a-b describes the embodiment in which a single element (the waveguides stack) provides two-dimensional optical resizing, it is not intended to exclude the embodiment in which two optical elements are used, (e.g., elements 132 and 134, above).

As shown in FIG. 32a-b, three monochromatic optical inputs 322 (e.g., an RGB input) are transmitted from three monochromatic image sources (not shown) to device 200. Layers 320 of device 200 are preferably arranged in an alternating sequence, whereby the waveguides of each layer are optimized according to the average wavelength of one monochromatic input. Thus, for example, a first type of layers 320a is optimized for red light, a second type of layers 320b is optimized for green light, and a third type of layers 320c is optimized for blue light. The layers are coupled to the different monochromatic light sources in accordance with their wavelength optimization. Alternatively, one or more layers of device 200 can be designed for guiding and emitting more than one color channel. The advantage of guiding and emitting one color channel per layer is the low cross talk between the color channel, and the advantage of guiding and emitting two or more color channels per layer is the reduced number of layers. In any event, each layer couples the light out of device 200 using mirrors 324 (e.g., TIR mirrors) or using any other way described hereinabove. Mirrors 324 can also be optimized to the average wavelength of the corresponding optical input.

As stated, the present embodiments are suitable for imagery optical data as well as non imagery optical data. Specifically, the present embodiments can be used to provide a chromatic image or a chromatic back illumination for another display device, as further detailed hereinabove. Preferred configurations for layers which guide and emit one color channel are described first, and preferred configurations for layer which guide and emit a plurality of color channels are described hereinafter.

When device 200 is used as a backlight assembly, the exemplified configuration shown in FIGS. 32a-b is preferably constructed such that the exposure length $L_e$ equals the inter-column separation $W_c$ such that each waveguide of the layer illuminates one sub-pixel per row. A preferred layer design for the present embodiment is illustrated in FIG. 49a. As shown, according to the presently preferred embodiment of the invention waveguides 16 and optical redirecting element 508 are arranged to allow light to enter the layer at input region 293, propagate in waveguides 16 and exit the layer at output region 294.

A preferred layer design for configuration in which the waveguides of the layer illuminate two or more sub-pixels per row is schematically illustrated in FIG. 49b. In this embodiment, waveguides 16 in the layer generally extend from input region 293 to two output regions 294a and 294b, such that for each entry location of the light at region 293 there are two exit locations at regions 294a and 294b. In the exemplified configuration illustrated in FIG. 49b the waveguides are bifurcated downstream light propagation to facilitate light propagation from a single input region to two output regions, but need not necessarily be the case and other configurations are also contemplated. For example, each waveguide can be assigned with two redirecting elements, one at region 294a and the other at region 294b. Alternatively some waveguides can extend from region 293 to region 294a while other waveguides can extend from region 293 to region 294b. It is also to be understood that it is not intended to limit the scope of the present invention to one input region and two output regions. Specifically, each layer of device 200 can have any number of input/output regions.

FIG. 50 schematically illustrates a side view of device 200 in the preferred embodiment in which there are two exit locations (one at each output region) for each entry location. In this embodiment, the exposure length preferably equals $W_c$ for some layers and $4W_c$ for other layers. More specifically, for every third layer (i.e., the third, sixth, ninth, etc.) $L_e = 4 W_c$, while for all other layers $L_e = W_c$. Such selection of the exposure lengths ensure that the waveguides at each layer illuminate the sub-pixel positions of two adjacent pixel regions per row by the respective color channel.

The layers of device 200 are better shown in FIGS. 33a-c which schematically illustrate the coupling of light out of the layers. Shown in FIGS. 33a-c are layers 331, arranged in a partially overlapping optical arrangement. Each layer end with a mirror 333, preferably a TIR mirror, such that light 335 propagating within layers 331 is being redirected by mirrors 333 and coupled out of the layers.

Depending on the orientation of mirrors 333, light 335 can exit through the free side 337 of the layer's reflection region 345 (see FIG. 33a) or through a side 339 of reflection region 345 which is engaged by adjacent layers (see FIG. 33b-c). The embodiment illustrated in FIG. 33a is referred to herein as a forward light coupling and embodiment illustrated in FIG. 33b is referred to herein as a backward light coupling. Backward light coupling is preferred in configurations in which the layers have substantial uniform thickness and the overall thickness of the layers at the emitting region of device 200 is small (typically, without limitation, lower than 10 mm, e.g., about 2 mm). The advantage of the backward light coupling is in its simpler fabrication process and in its simple depositing of (high reflection) coating on the mirrors. The mirrors can be produced during or after the production of the waveguides, or they can be produced in a single step once several or all the layers are laminated.

According to a preferred embodiment of the present invention device 200 comprises a light transmissive plate 341 disposed in a slanted orientation over layers 331. Additionally, the gap between layers 331 and plate 341 can be filled with an index matching material 343 such that light 335 is coupled out of device 200 substantially perpendicularly to plate 341. Plate 341 is particularly useful in the backward light coupling embodiment in which roughness of the back surface can deteriorate the light out-coupling.

Following is a description of preferred embodiments of the present invention in which a layer of device 200 guides and emits a plurality of color channels. The description provided above for the coupling of light out of a single color channel layer, applies mutatis mutandis, to the embodiments described below for a multicolor channels layer. Thus, both forward light coupling and backward light coupling are contemplated, as described above and illustrated in FIGS. 33a-c. Additionally, a light transmissive plate can be disposed in a slanted orientation over the layers, with or without index matching material filling.

FIG. 51 is a schematic illustration of a single layer 550 of device 200 which comprises a plurality of primary waveguides 510 (three in the present example), each extending from input region 293 and being brunched into a plurality of secondary waveguides 512. Waveguides 512 extend to output region 294 and terminate by redirecting elements 508 as further detailed hereinabove. In the representative illustration of FIG. 51 the three primary waveguides respectively receive three color channels to allow propagation of the color channels therein. The light from primary waveguides 510 is distributed to secondary waveguides 512. Thus, when device 200 is used as a backlight assembly, light exiting the layer from region 294 illuminates a row of sub-pixel positions of the passive display panel. The advantage of the configuration shown in FIG. 51 is that the number of entry points of optical input into the layer is smaller than the number of exit points. Another advantage of this configuration is that the required number of layers is significantly reduced.

FIGS. 52a-b schematically illustrate another preferred embodiment for guiding a plurality of color channels in a single layer. In this embodiment, each color channel is coupled out of the layer from a different output region. In the representative illustration of FIG. 52a, each primary waveguide 510 extends from input region 293 to one of three output regions 294a, 294b and 294c, where the light is coupled out of the layer via redirecting elements 508. FIG. 52b schematically illustrates a side view of a plurality of layers of the type shown in FIG. 52a. According to the presently preferred embodiment of the invention, when device 200 is used as a backlight assembly the exposure length $L_e$ preferably equals $W_c$ for some layers and n $W_c$ for other layers, where n is an integer. In the representative example illustrated in FIG. 52 which is not to be considered as limiting, for every seventh layer (i.e., the seventh, fourteenth, twenty-first, etc.) $L_e$=21 $W_c$, while for all other layers $L_e$=$W_c$. Such ordering ensures that a sequential RGB lightening of passive display panel 64. The advantage of the configuration illustrated in FIG. 52a is that it avoids waveguide crossing in the layer.

FIGS. 53a-b schematically illustrate an additional preferred embodiment for guiding a plurality of color channels in a single layer. In this embodiment the layer comprises waveguides 16a extending from a first input region 293a to a first output region 294a, and waveguides 16b extending from a second input region 293b to a second output region 294b. A first color channel (e.g., red light) enters region 293a and being emitted from region 294a while a second color channel (e.g., a blue light) enters region 293b and being emitted from region 294b. According to a preferred embodiment of the present invention, the first color channel propagates in waveguides 16a and the second color channel propagates in waveguides 16b. FIG. 53b is a cross sectional view along the cut AA' in FIG. 53a. The propagating light and redirected light are designated in FIG. 53b by numerals 284 and 286, respectively. Redirecting elements 508 couple the propagating light out of waveguides 16.

The arrangement of waveguides 16 as illustrated in FIG. 53a can also be adapted such that there are more than two output regions, e.g., by means of the configuration illustrated in FIG. 49b.

Hence, FIGS. 54a-b are schematic illustrations of a preferred embodiment according to which the layer comprises waveguides 16a extending from first input region 293a to two output regions 294a and 294c, and waveguides 16b extending from second input region 293b to two other output regions 294b and 294c. As illustrated in FIG. 54a, each waveguide is bifurcated to two redirecting elements 508 thus allowing light propagating in the waveguide to be coupled out of the layer from spaced apart locations. Similarly to the embodiment illustrated in FIG. 53a, one color channel enters the layer at input region 293a and another color channel enters the layer at input region 293b. Thus, these exemplified configurations support transmission of two color channels.

In various exemplary embodiments of the invention an additional (third) color channel is transmitted separately by the waveguides of a layer designed according to any of the above embodiments, see, e.g., FIGS. 21c-d, 22e-f and 49a-b. Thus, according to the presently preferred embodiment of the invention device 200 comprises an alternating sequence of layers in which layers transmitting two color channels are interposed between layers transmitting a single color channel. FIG. 54b schematically illustrates a side view of a preferred alternating sequence of layers. Shown in FIG. 54b are two types of layer, designated by numerals 320a and 320b. In layers 320a two color channels are emitted from four output regions on the layer, in accordance with the embodiment illustrated in FIG. 54a, and in layers 320b a third color channel is emitted from two output regions, in accordance with the embodiment illustrated in FIG. 49b.

Reference is now made to FIGS. 55a-c which are schematic illustrations of a preferred embodiment in which one or more layers of device 200 comprises waveguides extending from an input region 293 to a plurality of output regions. The output regions are designated in FIG. 55 by 294-1, 294-2, ..., 294-N. This embodiment is particularly useful when device 200 is used as a backlight assembly either for multichromatic input light (e.g., white light) or for monochromatic input light.

According to a preferred embodiment of the present invention each output region can be aligned with a row or a column of pixels regions of passive display panel 64. Input light 514 propagate in waveguides 16 and being coupled out of waveguides 16 by redirecting elements 508. The optical output can be such that different pixel regions are illuminated by substantially spaced apart light beams, or, alternatively, such that a homogenous optical output illuminate a raw or a column of pixel regions.

When input light 514 is multichromatic, it can be demultiplexed near the pixel region to the different sub-pixel position, as further detailed hereinafter. When input light 514 is monochromatic, device 200 preferably comprises an alternating sequence of layers, where adjacent layers transmit different color channels. A side view of device 200 in this embodiment schematically illustrated in FIG. 55*c*.

As stated, elements 508 can be reflective, refractive, diffractive or any combination thereof. In the exemplified illustration of FIG. 55*a*, the waveguides furcate to reflecting elements and each reflecting element couples most of the optical energy out of the layer. In the exemplified illustration of FIG. 55*b*, each waveguide has a plurality of partially reflecting elements configured such that one portion of the propagating light is redirected out of the layer, while another portion of the light continues to propagates through the element.

Representative examples of suitable partially reflecting elements are illustrated in FIGS. 48*a-d* described above. The amount of reflection can be varied along the respective waveguide by controlling the width of element 508, the difference in refractive indices between element 508 and the core of the waveguide, the thickness of element 508, the characteristic reflectivity of the facet of element 508, the width of the waveguide, and/or the distance between element 508 and the core of the waveguide. Also contemplated are configurations in which light is inputted from both sides of the waveguides so as to increase the homogeneity of the optical output. Additionally, cladding 266 can be shaped so as to control the power distribution of the optical output as described above (see, e.g., FIG. 48*e*).

Reference is now made to FIGS. 56*a-b* which are schematic illustrations of a preferred embodiment in which one or more layers of device 200 comprises waveguides extending from two input regions 293*a* and 293*b* to a plurality of output regions, 294*a*-1, 294*a*-2, . . . , 294*a*-N, and 294*b*-1, 294*b*-2, . . . , 294*b*-N. A first color channel (e.g., red light) enters region 293*a*, propagates in waveguides 16*a* and being emitted from regions 294*a*-1, 294*a*-2, . . . , 294*a*-N, while a second color channel (e.g., a blue light) enters region 293*b*, propagates in waveguides 16*a* and being emitted from regions 294*b*-1, 294*b*-2, . . . , 294*b*-N. According to a preferred embodiment of the present invention, waveguides 16*a* are single mode waveguides configured to allow propagation of the first color therein, and waveguides 16*b* are single mode waveguides configured to allow propagation of the second color therein.

In various exemplary embodiments of the invention an additional (third) color channel is transmitted separately by the waveguides of a layer designed according to the any of the embodiments illustrated in FIGS. 55*a-b*. Thus, according to the presently preferred embodiment of the invention device 200 comprises an alternating sequence of layers in which layers transmitting two color channels are interposed between layers transmitting a single color channel. FIG. 56*b* schematically illustrates a side view of a preferred alternating sequence of layers.

In any of the above embodiments, the diversion of the exiting light can be controlled by appropriate design of the redirecting optical elements and/or using additional optical elements positioned on the light path of the outgoing light beam. When appropriate, the optical elements are preferably selected to prevent spectral crosstalks between different color channels. For example, when device 200 is used for providing backlight illumination, in which monochromatic light propagates in the waveguides, the optical elements are preferably designed and constructed to direct different color channels to different sub-pixel positions. Thus, in various exemplary embodiments of the invention the optical elements focus or collimate the exiting light on the sub-pixel positions. For example, the optical elements can be configured such that each redirecting element illuminates a single sub-pixel position.

FIG. 64*a* is a schematic illustration of backlight assembly 62, in a preferred embodiment in which assembly 62 comprises a microlens array 558 disposed between redirecting elements 508 and passive display panel 64. Microlens array 558 is preferably designed and aligned so as to reduce spectral crosstalks between different color channels.

The redirecting optical elements and/or additional optical elements (e.g., array 558) can also be designed such that redirecting element 508 provide illuminating light to more than one sub-pixel position associated with the respective color channel. This embodiment is particularly useful when a waveguide 16 is disposed columnwise with respect to passive display panel 64. Thus, the optical elements are preferably designed and aligned so as to ensure that two or more columnwise arranged sub-pixel positions are provided with illuminating light redirected by a single redirecting element.

FIG. 64*b* schematically illustrates backlight assembly 62, in a preferred embodiment in which microlens array 558 diverse the light to impinge on a plurality of sub-pixel positions. Array 558 and/or elements 508 are preferably designed and constructed such that when a light beam passes therethrough, a beam diversion of light beam is higher along a column 552 of passive display panel 64 than perpendicular to column 552. As will be appreciated by one ordinarily skilled in the art, such configuration ensures exclusive illumination of the sub-pixel positions. In other words, the presently preferred embodiment of the invention all sub-pixel positions illuminated by a particular redirecting element are associated with the same color channel. Typical beam diversion along a column of the panel is from about 0.5° to about 20°, and typical beam diversion perpendicular to a column (e.g., along a row of the panel) is below 10° degrees.

Devices 200 and 30 can also be used to provide three-dimensional images, by generating two different images, of two different polarizations or two different colors, as further detailed hereinabove. For two different polarizations device 200 can be constructed similarly to FIG. 32, with two optical inputs at two different polarizations (instead of different colors). The user can then view the images using a binocular device having a different polarization for each eye.

In another embodiment, devices 200 and 30 can function as an autostereoscopic display. This can be done in more than one way, as further detailed hereinbelow with reference to FIGS. 34*a-d* and 35*a-c*.

Hence, in various exemplary embodiments of the invention device 200 is manufactured with two input facets, 330 and 332 each receives a different image, designed to be viewed by the left eye and the right eye of the user. An output facet 338 directs the optical information arriving to input 330 into the left eye and the optical information arriving to input 332 into the right eye.

Referring to FIGS. 34*a-d*, the layers of device 200 can be arranged such that the optical information arriving to input 330 is directed to the left eye and the optical information arriving to input 332 is directed to the right eye. This can be done by an appropriate orientation of the mirrors 334 of the different layers to focus the output beam to a single spot 336, also known as the "sweet spot" of the autostereoscopic image (see FIG. 34c). The user can then view a three-dimensional image by placing the left eye in the left part 344 of the sweet spot and the right eye in the right part 342 of the sweet spot. When device 200 is flexible, the focusing of the output beam to spot 336 can be achieved by bending output facet 338, as shown in FIG. 34d. The advantage of the latter embodiment is that the sweet spot position can be varied by varying the curvature of facet 338.

Referring to FIGS. 35a-c, the layers of device 200 can be arranged such that the waveguides 16 have an appropriate orientation to focus the output beam to spot 336. The advantage of this embodiment is that the beam orientation is governed by the waveguide orientation and not by the mirror facet angle. Fabrication of waveguides with controlled orientation is much simpler than fabrication of mirrors with controlled facet angle. In another preferred embodiment the waveguides orientation is the same but the mirror orientation is altered in order to reflect the beams to the desired direction.

FIG. 36 schematically illustrates different optical regions in the field-of-view of device 200, in the preferred embodiment in which devices 200 provides two optical outputs, a "left" output 346 and a "right" output 348. As shown in FIG. 36, the field-of-view generally includes four optical regions. A mixed view region 350 in which both outputs are combined to a two-dimensional image, a sweet spot region 336 in which both outputs are combined to a three-dimensional image, and two single side regions 352 and 354 which are shadowed from one output hence contains only two-dimensional information of the other output: 348 or 346, respectively. Regions 352 and 354 can be resized (reduced or enlarged) as desired by controlling the width of the output field.

Reference is now made to FIGS. 37a-b which are schematic illustrations of one layer (FIG. 37a) and the resulting field-of-view (FIG. 37b) in the preferred embodiment in which device 200 provides a plurality of autostereoscopic images. As shown, the end portion 360 of each waveguide 16 designated to emit light through the output facet splits into a plurality of waveguides (three waveguides 362a, 362b and 362c in the present example), each being terminated by a separate mirror (in the present example mirrors 364a, 364b and 364c). The waveguides are oriented to focus the respective portion of light onto different sweet spots (spots 366a, 366b and 366c in the present example). As will be appreciated by one of ordinary skill in the art, the present embodiment can also be employed to provide a plurality of two-dimensional images, to a plurality of directions. For example, when device 200 is implemented in a display device, users observing the display from different directions can view different images.

As stated, when the device 30 or 200 is used in a backlight assembly, either monochromatic or multichromatic light can propagate in the waveguides thereof.

A representative example of LCD apparatus 60 in the preferred embodiment in which monochromatic light propagates in the waveguides of backlight assembly 62 is schematically illustrated in FIG. 57a. In the exemplified embodiment illustrated in FIG. 57a, a small divergent beam is coupled out of assembly 62. As shown, the light passes generally perpendicularly to passive display panel 64, thus increasing the efficiency of the LCD switching operation, which is commonly deteriorated at large viewing angles. To facilitate the required output light divergence, apparatus 60 preferably comprises a light diffuser 532 positioned in front of passive display panel 64. Alternatively, the light divergence from backlighting assembly 62 can be controlled by an appropriate selection of the refractive indices of the core and cladding of the waveguide, according to the expression $\sin \alpha = \sqrt{(n_1^2 - n_2^2)}$, where $n_1$ and $n_2$ refractive indices of the core and cladding, respectively, and $\alpha$ is half the angle of diffraction.

FIG. 57b schematically illustrates LCD apparatus 60 in a preferred embodiment in which apparatus 60 comprises two passive display panels 64a and 64b. The use of two passive display panels is advantageous because with such configuration the extinction ratio of apparatus 60 can be significantly improved. This embodiment is particularly applicable when the divergence of the optical output of assembly 62 is small (say, less than 20°), and the resolution of the first passive display panel is maintained. In various exemplary embodiments of the invention apparatus 60 further comprising a first front polarizer 540a, positioned in front of panel 64a, a second front polarizer 540b positioned in front of panel 64b, and a light diffuser 532 positioned in front of second front polarizer 540b.

A representative example of LCD apparatus 60 in the preferred embodiment in which monochromatic light propagates in the waveguides of backlight assembly 62 is schematically illustrated in FIG. 58. In this embodiment, one or more of the waveguides comprises a demultiplexer 534 for demultiplexing the light into two or more color channels and for coupling the light into a respective pixel region in a manner such that different sub-pixel positions are illuminated by different color channels. Demultiplexer 534 can be of any type known in the art, such as, but not limited to, a grating (see, e.g., FIG. 24d), a curved surface, and the like.

FIG. 59 is a schematic illustration of apparatus 60 in a preferred embodiment in which apparatus 60 operates in a transflective mode. Transflective LCD apparatus 60 is configured for enabling viewing both in a reflection mode, exploiting ambient light, and in transmissive mode, using backlight illumination. Unlike traditional transflective apparatus in which about half of the backlight illumination impinges on reflecting surfaces hence being wasted, the teachings of the present invention allows the transmission of the entire backlight illumination to the passive display panel.

Thus, according to a preferred embodiment of the present invention apparatus 60 comprises backlight assembly 62, panel 64 and a reflective surface 542 for reflecting ambient light into panel 64. Apparatus 60 further comprises a plurality of color filters 544 positioned in front of each subpixel position of panel 64 for selectively transmitting the respective color channel of the sub-pixel position. It is noted that in the transmissive mode of apparatus 60, the color filters do not reduce the light transmission since they are being fed by light at the respective color.

Apparatus 60 optionally further comprises light source 172, back polarizer 154 and front polarizer 540 as further detailed hereinabove. In various exemplary embodiments of the invention the backlight illumination is transmitted through apertures 546 in surface 542 the pixel thus leaving most of the sub-pixel area available for the reflection mode without loosing intensity. Alternatively, reflective surface 542 can be laminated or sputtered at the back side of the assembly 62. In this embodiment, no alignment is required between the waveguides and the apertures in surface 542.

FIG. 60 is a schematic illustration of apparatus 60 in a preferred embodiment in which apparatus 60 operates in color sequential mode. In this embodiment, light sources 172 preferably have the ability to be switched on and off at a fast rate, so as to form short light pulses. Panel 64 is synchronized with sources 172 such that for any color channel, only the corresponding color field of the image is transmitted through panel 64. Waveguides 16 of assembly 62 are preferably arranged such that two or more waveguides are aligned with each pixel region, such that the pixel region receives illumination from all the color channels.

The coupling between device 200 and the light source can include mutatis mutandis any of the techniques described above with respect to device 30. To this end see, e.g., FIGS. 16a-b, 17, 18a-b, 47a-b and accompanying description hereinabove. When the optical input is encoded by imagery data, the optical coupling between device 200 and the light source is preferably done so as to preserve the image constituted by the inputted light beam. For non-encoded optical input (e.g., when device 200 is used for providing illuminating light) the waveguides can be inputted in a non-pixelized manner.

Thus, the coupling between device 200 and the light source can be done utilizing a coupler, e.g., a microlens array with or without a polarizer, as further detailed hereinabove (see FIG. 16a). Alternatively, device 200 can function without a coupler or using a microlens array which is placed or formed on the input optical element, as further detailed hereinabove (see FIG. 16b). In another embodiment, an input image can be focused on device 200 using a lens or another focusing element as further detailed hereinabove and illustrated in FIG. 17. In an additional embodiment, the coupling between device 200 and the light source is via one or more fiber bundles, as further detailed hereinabove (see FIGS. 18a-b). Device 200 can also receive optical input in the form of a laser beam which can be projected on the input facet of device 200.

Additional techniques for coupling between device 200 and the light source, particularly, but not exclusively useful in the embodiments in which there is a plurality of output regions (see, e.g., FIGS. 55a-56b), are illustrated in FIGS. 61a-c and 62a-c.

Figure 61A:
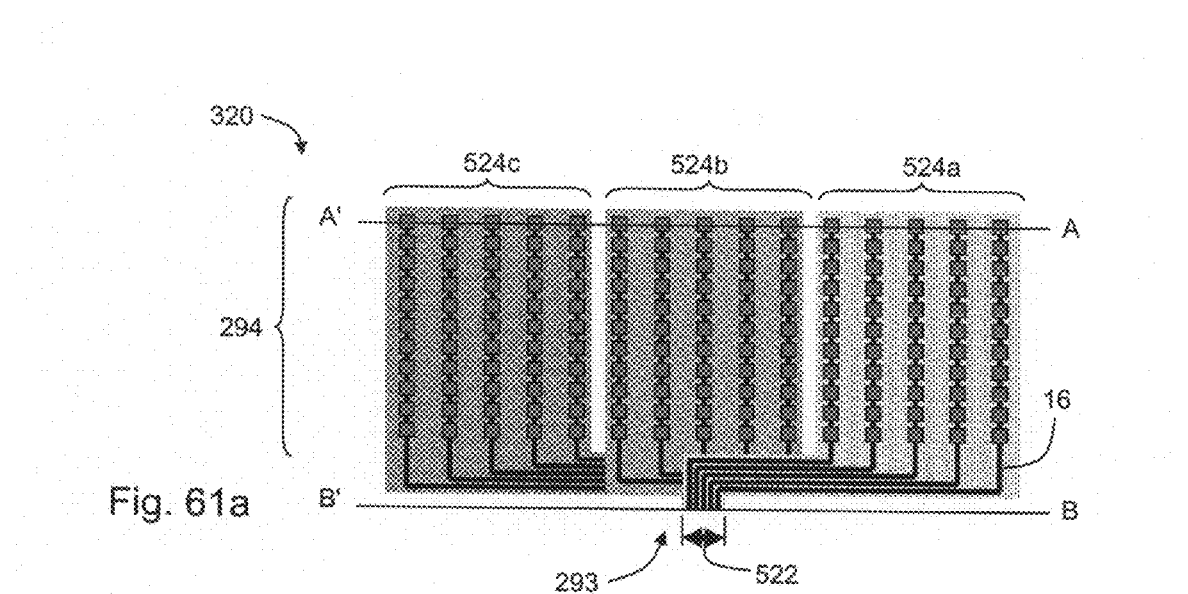
Figure 61B:
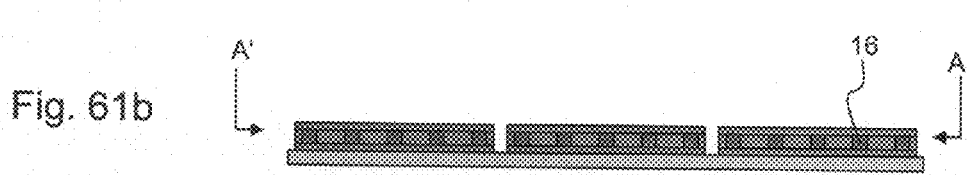
Figure 61C:
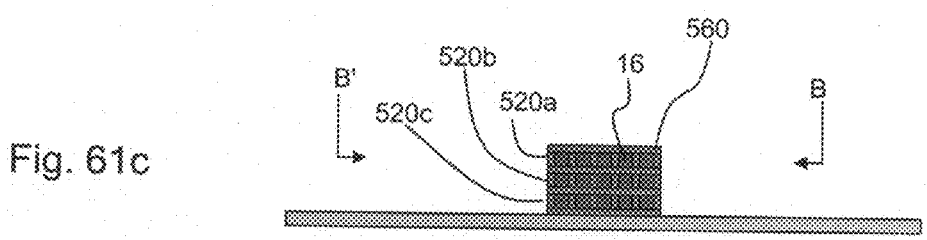

In the preferred embodiment illustrated in FIGS. 61a-c, input region 293 of layer 320 comprises two or more sublayers whereby waveguides 16 are stuck at input region 293 to form an input facet 560 for layer 320. Waveguides 16 extend from different sublayers of input region 293 to output regions 294. Shown in FIGS. 61a-c is a top view (FIG. 61a), a cross sectional view along cut AA' passing through output region 294 (FIG. 61b) and a cross sectional view along the cut BB' passing through input region 293 (FIG. 61c). It is to be understood that although FIG. 61a illustrates three sublayers (sublayer 520a, sublayer 520b and sublayer 520c) at input region 293, it is not intended to limit the scope of the present invention to any specific number of sublayers. As shown in FIGS. 61a-b, there is an overlap 522 at input region 293. From region 293 waveguides 16 occupying different sublayers preferably extend to different sub-regions of output region 294. In the representative examples illustrated in FIGS. 61a-c, output region 294 is divided to three sub-regions, 524a, 524b and 524c. The waveguides extend from sublayer 520a to sub-region 524a, from sublayer 520b to sub-region 524b and from sublayer 520c to sub-region 524c.

In the embodiments illustrated in FIGS. 62a-c, the waveguides are split to groups and are mechanically separated at input region 293 by forming dicing region 526 on the layer (FIG. 62a). The formed groups of waveguides are then bundled together (FIG. 62b) thereby forming an input facet. FIG. 62c illustrates an embodiment which is a combination of the embodiments illustrated in FIGS. 47a-b with the embodiment illustrated in FIGS. 62a-b. The waveguides are mechanically separated at input region 293 and are arranged such that, at input region 293, the terminal part of each waveguide is substantially collinear with the light path characterizing the light source.

As stated, any number of light sources can be coupled to device 200. A representative example with twelve monochromatic light sources and three color channels (four light sources for each color channel) is schematically illustrated in FIG. 63.

The thickness of the layers of device 200 can vary across device 200. For example, the thickness of the layers may be from 15 µm to about 30 µm at the input and from about 40 µm to about 60 µm at the output facet. At the output facet, the overlap between the layers is limited to only few layers, and therefore the overall thickness of device 200 is not affected by thicker layers at the output region. The advantage of a thicker waveguide layer is that such configuration increases the transmitting area from the redirecting optical elements. The layer thicknesses can be increased continuously or stepwise, as desired. For example, a step-wise increase in thickness can take place at the interface where the waveguides enter the exposed region.

In any of the above embodiments, the waveguides are preferably designed and constructed to provide homogenous optical output. This embodiment is particularly useful when the optical device of the present embodiments is used as a backlight assembly. Thus, according to a preferred embodiment of the present invention input non-homogeneity are corrected at the waveguides level by introducing variation in the waveguides dimensions, see for example the layout shown in FIG. 39b of the Examples section that follows. Alternatively, a homogenous light source can be used.

Yet, non-homogenous optical output can also be the result of different transmission efficiency of different waveguides, due to optical losses within the waveguides. Typically, the optical losses increase with the length of the waveguide. Such non-homogenous optical output can be corrected by adding loss to the shorter waveguides and/or selecting a wider cross-section to the input side of longer waveguides, as illustrated in FIG. 39b. With such configuration, more light is coupled to the wider waveguides to overcome their higher loss.

Different layers of the optical device of the present embodiments can have waveguides of different lengths, see, for example, FIGS. 22a-c. Equal transmission efficiency for waveguides in different layers is achieved according to various exemplary embodiments of the present invention by selecting different widths for waveguides of different layers. More preferably, the thickness of the core in a layer can be altered so as to provide homogenous optical output. Specifically, in layers in which the waveguides are shorter, the core is thinner compared to the core in layers in which the waveguides are longer. The use of different core thickness for different layers is favored from the standpoint of manufacturing simplicity because with such technique the same mask can be used for manufacturing many layers.

It is expected that during the life of this patent many relevant light transmitting devices will be developed and the scope of the term waveguide is intended to include all such new technologies a priori.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Optical Loss Optimization

The transparency of device is affected by few loss mechanisms: (i) propagation loss within the device; (ii) bend and tapering loss within the device; (iii) coupling loss between the optical elements of the device; and (iv) reflection losses at the interfaces.

The lowest reported propagation loss for, polymer waveguides, was achieved with polymethylmethacrylate (PMMA) and deuterated polyfluoromethacrylate (d-PFMA) materials which do not contain the C-H absorption vibration bond. Values below 0.001 dB/cm for bulk at the visible region [L. Homak, "Polymers for lightwave and integrated optics," Marcel Dekker, Inc, 1992]; 0.01 dB/cm for a multimode waveguide at a wavelength of $\lambda$=0.68 µm [Yoshimura et al., "Low loss polymeric optical waveguides fabricated with Deuterated Polyfluoromethcrylate," J. Lightwave Tech, vol 16, 1030-1037, 1998] and 0.05 dB/cm for a single mode waveguide at $\lambda$=1.3 µm [Yeniary et al., "Ultra-low-loss polymer waveguides," J. Lightwave Tech, vol 22, 154-158, 2004] have been reported. Thus, according to a preferred embodiment of the present invention the waveguides are polymeric waveguides, more preferably PMMA waveguides or d-PFMA waveguides.

The bend loss in various exemplary embodiments of the invention is due to interaction of light with corner mirror. A corner loss of 1.2 dB was reported for the 50×50 µm multimode polymer waveguide with air-cladding mirror [J-S Kim and J-J Kim, "Stacked polymeric multimode waveguide arrays for two-dimensional optical interconnects," J. Lightwave Tech, vol 22, 840-844, 2004]. Lower losses, below 0.5 dB, are also achievable [Ahmad, "Ultracompact corner-mirrors and T-branches in silicon-on-insulator," IEEE Photon. Tech. Lett., vol. 14, 65-67, 2002]. When waveguides bend with radii of few mm are used instead of corner mirrors, the losses can be lower than 0.1 dB.

When the device is used for light expansion (e.g., magnification of image) the tapering loss is negligible. For contraction uses, the typical tapering loss depends on the mode structure of the input beam and the taper length; for a fundamental input mode and a few mm long taper the loss can be below 0.1 dB. Thus, when the device is used for light expansion, the tapering can be stepped, while for contraction uses, a smooth tapering is preferred so as to minimize loss.

The extent of coupling loss at the interface between the input light source and the device depends on the optical arrangement used to facilitate the coupling, the ratio of core to cladding in the waveguide and the ratio of width to gap of the pixels (in the extent that there is no focusing element like etched lenses at the facet). When the waveguides have rectangular cross sections, the filling factor is higher than the filling factor in case of waveguides with round cross section. The extent of coupling loss between the optical elements of the device can be negligibly low by a judicious selection of the numerical aperture of the waveguides. Specifically, according to a preferred embodiment of the present invention the numerical aperture of the receiving optical element (e.g., element 34) is higher than or equals the numerical aperture of the emitting optical element (e.g., element 32).

Reflection between the input light source and device 30 can be negligibly low by placing index matching adhesive between device 30 and the optical arrangement which couples the light source to device 30. The same applies for the reflection between the optical elements of the device. The reflection at the large facet of the second optical element is given by $(n-1)^2/(n+1)^2$ where n is the refractive index of the core. This facet can be coated with antireflection coating to further reduce the reflection.

The device contrast ratio is only slightly affected by the propagation loss since the lost scattered light propagates substantially parallel to the large facet of device 30. Nevertheless, light lost at the coupling between the interfaces and light scattered at the bends can reduce the contrast ratio, in particular in the embodiments in which regions 18 and 20 of the layers are parallel and located on opposite sides of the layer.

Optical losses due to waveguides non-homogenous propagation loss can be reduced or substantially eliminated (e.g., reduced to less than 20%, more preferably less than 10%, say about 5% or less of its former value) by illuminating the input image in a non homogenous way. For example, referring to FIG. 38, the input image 380 can be distorted such that there is a brightness gradient 382 across the length and width of the image so as to compensate the differential waveguide losses.

FIG. 39a is a schematic illustration of a layer (e.g., layer 14) of the optical element in a preferred embodiment in which the layer comprises light absorbers 370 selected so as to improve the contrast ratio of the light propagating within waveguides 16. Light absorbers 370 can be deposited across layer 14 or in small areas within layer 14. The light absorbers can be black tone added to the cladding material. In the embodiments in which regions 18 and 20 are collinear or on adjacent sides of layer 14 the effect of reduced contrast ratio is less pronounced and the skilled artisan may prefer not to include light absorbers 370. Yet, the use of light absorbers in these embodiments is also contemplated. An alternative way to improve contrast ratio is to use a slightly absorbing cladding layer between the waveguides. For example, a cladding layer with absorption coefficient of about 1 dB/cm can absorb all or most of the scattered light while adding less than 0.01 dB/cm to the waveguide loss.

When the propagation losses are not uniform the output light beam can have non uniform brightness. To avoid that effect, parasitic losses can be added to the shorter waveguides. This can be done, in more than one way. In one embodiment, the parasitic losses are added by reducing the waveguide width, in another embodiment the parasitic losses are added by reducing bend radius, and in an additional embodiment the parasitic losses are created by adding bends or parasitic intersected waveguides to the layers.

Alternatively, the coupling to the waveguides can be tailored by modifying the taper width (controlling the amount of light coupled to the waveguide) or the taper length (controlling the efficiency [transparency] of the taper).

In case where a homogenous panel is needed to be resized, the different loss of the waveguides can be compensated by assigning different cross sections to the waveguides. FIG. 39b schematically illustrates an embodiment in which the longer waveguides of the layer have wider cross-sections such that more light is coupled to the wider waveguides to overcome their higher loss (due to their longer length). In this example the waveguides are tapered towards the output panel, in order to obtain equal width there. Non tapered waveguides are also contemplated. The 90° waveguide bends can also be replaced with smooth bends.

The waveguides can have different length not only in the layer but also between the layers. The waveguides in the upper layer are shorter than the waveguides in the underneath layer. Equal transparency for waveguides in different layers can be achieved by assigning different waveguide width for each layer. Alternatively, the thickness of the (core) waveguides in a layer can be altered in order to compensate for the layers different waveguides' length. In this embodiment the waveguides in the upper layers are thinner than the waveguides in the lower layers.

Example 2

Field-of-View Optimization

According to a preferred embodiment of the present invention device 30 is designed and constructed to provide the resized light at a predetermined field-of-view. One way to achieve a predetermined field-of-view for device 30 is by a judicious selection of the waveguide parameters for the optical element from which device 30 outputs the light (e.g., element 34). According to a preferred embodiment of the present invention the refractive indices and numerical aperture (N.A.) of the waveguides are selected so as to satisfy the formula: $N.A.=\sin \alpha = \sqrt{(n_1^2 - n_2^2)}$, where $n_1$ and $n_2$ are the refractive indices of the core and cladding, respectively, and $\alpha$ is half the diffraction angle. For waveguide terminated with a linear tapering, the effective numerical aperture is N.A./M where M is the tapering magnification [Peli et al., supra]. Thus, the effective field-of-view can be selected by tailoring the tapering shape, i.e. using a non-linear taper shape. In particular, different field-of-views can be obtained for different directions.

Different field-of-views for different directions can also be achieved by selecting a first cladding material within the layers and a second, different, cladding material between layers such that the field-of-view in the longitudinal direction (parallel to the layers) differs from the field-of-view in the transverse direction (substantially orthogonal to the layers).

The field-of-view of device 30 can be enlarged by adding a diffusive screen at the output facet or by etching the output facet to make it diffusive. The diffusive screen can also be configured to compensate optical losses.

Additionally or alternatively, the field-of-view can be enlarged by increasing the difference $\Delta n$ between the refraction indices of the core and cladding. A high $\Delta n$ value can be chosen for the entire optical element or, alternatively, $\Delta n$ can be increased in a gradual manner towards the output facet. Gradually varying $\Delta n$ can be achieved for example in a production process where the core is written by a direct writing UV lithography, where the core $\Delta n$ relative to the cladding is a function of the UV exposure time. Preferably the increase in refraction index come together with a diffusion mechanism such as added scattering centers in the core material or scattering by added bends to the waveguides. These scattering mechanisms convert lower order modes to higher order modes therefore utilizing the capability of the higher $\Delta n$ waveguide to hold higher order modes. It is the higher order modes which contribute to the large field of view patterns.

As will be appreciated by one ordinarily skilled in the art, the ability to adjust the field-of-view can significantly improve the brightness of the outputted light.

Reference is now made to FIG. 40 which illustrates a procedure for improving the brightness of the output light. Broadly speaking the improvement involves an efficient collection of the light 390 from the light source 392 and an adjustment of the field of view of device 30 such that there is a minimal or no brightness loss. Specifically, according to the presently preferred embodiment of the invention the field-of-view is reduced by the same amount as the expected reduction in brightness, such all or most (say at least 90%) of the optical energy of light 390 is carried by output light 394. For example, suppose that a 5" screen is magnified to a 10" screen using an optical device having 3 dB insertion loss. In this case the expected reduction in brightness of device 30 is 2×2×2=8.

Suppose further that device 30 is coupled to light source 392 such that 120° of light 390 enters device 30. To eliminate brightness reduction, the field-of-view of device 30 is selected to be $120/\sqrt{8}=42°$. The present embodiment is particularly useful in situations in which it is desired to accompany the enlargement of screen size with a reduction of the field-of-view, for example, for purposes of keeping the privacy of the displayed image.

Reference is now made to FIG. 41 which is a schematic illustration device 30 in a preferred embodiment in which waveguides 16 are tilted with respect to the layer's end (see, e.g., FIG. 19). The resulting optical element emits light 394 are an angle $\theta$ with respect to the output facet. As shown in FIG. 41 the present embodiment results in a modification of the field-of-view of device 30.

The adjustment of the field-of-view can also be employed at the interface between the optical elements of device 30, for increasing the spatial modes at the receiving element. The adjustment can be achieved by varying the relative orientation between the waveguides of different optical element and/or the value of $\Delta n$. For example, when the waveguides of the transmitting element (e.g., element 32) are not parallel to the waveguides of the receiving element (e.g., element 34), and $\Delta n$ of the receiving element is higher than $\Delta n$ of the transmitting element, the higher spatial modes exciting at the interface between the two elements successfully propagate within the receiving element. As a result, the field-of-view at the output facet of the device is increased. Increment of spatial modes can also be achieved within the optical element (rather than on the interface between two such elements) by establishing slanted connection between two waveguides of the optical element.

As used herein the term "about" refers to ±10%.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A backlight assembly for feeding illuminating light to a passive display panel having a plurality of pixel regions each being defined by at least two sub-pixel positions respectively corresponding to at least two color channels characterizing the pixel region, the backlight assembly comprising a plurality of waveguides being formed and/or embedded in at least one substrate and arranged to feed illuminating light to each sub-pixel position in a manner such that each pixel region is illuminated by at least two waveguides, wherein each waveguide of said at least two waveguides is disposed to illuminate one sub-pixel position of said pixel region by a respective color channel.

2. The backlight assembly of claim 1, wherein at least one waveguide of said plurality of waveguides is disposed in a layer of the backlight assembly, from at least one input region of said layer to at least one output region of said layer, columnwise with respect to said passive display panel.

3. The backlight assembly of claim 2, further comprising a plurality of redirecting elements formed in said at least one waveguide and configured for redirecting said light out of said at least one waveguide to thereby illuminate a plurality of sub-pixel positions along a respective column of said passive display panel.

4. The backlight assembly of claim 3, wherein each redirecting element is disposed in said at least one waveguide so as to illumine one sub-pixel position along said column.

5. The backlight assembly of claim 3, wherein at least one redirecting element is disposed in said at least one waveguide so as to illumine at least two sub-pixel positions along said column.

6. The backlight assembly of claim 5, wherein said at least one redirecting element is designed and constructed to redirect a light beam propagating in said at least one waveguide such that a beam diversion of said light beam is higher along said column than perpendicular to said column.

7. The backlight assembly of claim 6, wherein said at least one redirecting element is designed and constructed such that said light beam exclusively impinges on said at least two sub-pixel positions along said column.

8. The backlight assembly of claim 1, wherein said at least one substrate comprises at least one reflective layer.

9. The backlight assembly of claim 8, wherein said at least one reflective layer is characterized by a reflectivity gradient along said waveguides.

10. The backlight assembly of claim 1, wherein said plurality of waveguides are arranged layerwise in a plurality of layers, each layer being designed and constructed such as to allow emission of light propagating within waveguides of said layer into sub-pixel positions corresponding to a single color channel.

11. The backlight assembly of claim 1, wherein said plurality of waveguides are arranged layerwise in a plurality of layers, each layer being designed and constructed such as to allow emission of light propagating within waveguides of said layer into sub-pixel positions corresponding to at least two color channels.

12. The backlight assembly of claim 1, further comprising a plurality of light sources, arranged such that at least one waveguide is fed by at least one light source.

13. The backlight assembly of claim 1, further comprising a plurality of light sources, arranged such that at least one waveguide is fed by at least two light sources.

14. The backlight assembly of claim 1, wherein said plurality of waveguides are arranged layerwise in said at least one substrate such that in each layer the waveguides extend from at least one input region of said layer to at least one output region of said layer thereby defining a circumferential boundary within said layer, wherein the length characterizing said circumferential boundary is smaller at said at least one input region than at said at least one output region.

15. The backlight assembly of claim 1, wherein said plurality of waveguides are arranged layerwise in a partially overlapping optical arrangement within said at least one substrate, each layer comprising waveguides extending from at least one input region of said layer to at least one output region of said layer, whereby said at least one output region is optically exposed to allow emission of light propagating within waveguides of said layer.

16. The backlight assembly of claim 14, wherein said at least one input region comprises a plurality of sublayers whereby at least a few waveguides are stacked to extend from different sublayers of said at least one input region to form an input facet of said layer.

17. The backlight assembly of claim 14, wherein said backlight assembly comprises a plurality of light sources, arranged such that at least one waveguide is fed by at least one light source.

18. The backlight assembly of claim 17, wherein the waveguides are arranged in said layer at said at least one input region such that, for each waveguide, a terminal part at said at least one input region is substantially collinear with at least one light path characterizing at least one light source of said plurality of light sources.

19. The backlight assembly of claim 15, wherein said backlight assembly further comprises a plurality of redirecting elements formed in said waveguides at said at least one output region of said layer and configured for redirecting said light out of said waveguides.

20. The backlight assembly of claim 19, wherein said redirecting elements are arranged in a manner such that sub-pixel positions of at least two rows of said passive display panel are illuminated by waveguides of each layer.

21. The backlight assembly of claim 19, wherein at least a few of said plurality of waveguides comprise a core and a cladding, said core having a higher refractive index than said cladding, and said cladding being shaped such that light is focused by said cladding subsequently to said redirection.

22. The backlight assembly of claim 19, further comprising a microlens array disposed between said plurality of redirecting elements and said passive display panel, said microlens array being designed and aligned so as to reduce spectral crosstalks between different color channels.

23. The backlight assembly of claim 22, wherein said microlens array is designed and aligned so as to ensure that each sub-pixel position is provided with illuminating light redirected by one redirecting element.

24. The backlight assembly of claim 22, wherein said microlens array is designed and aligned so as to ensure that at least two columnwise arranged sub-pixel positions are provided with illuminating light redirected by one redirecting element.

25. The backlight assembly of claim 22, wherein at least one microlens of said microlens array is designed and constructed such that when a light beam passes therethrough, a beam diversion of said light beam is lower along a column of said passive display panel than perpendicular to said column.

26. The backlight assembly of claim 19, wherein at least a few of said plurality of redirecting elements are designed and configured such that at least one waveguide of at least one layer emits light from at least two spaced apart locations.

27. The backlight assembly of claim 26, wherein at least one of said plurality of redirecting elements is a partially reflecting element positioned in said at least one waveguide of said at least one layer such that a first portion of light propagating in said at least one waveguide is redirected out of said at least one layer, and a second portion of said light propagates in said at least one waveguide through said partially reflecting element.

28. The backlight assembly of claim 15, wherein each layer is designed and constructed such as to allow emission of light propagating within waveguides of said layer into sub-pixel positions corresponding to a single color channel.

29. The backlight assembly of claim 15, wherein each layer is designed and constructed such as to allow emission of light propagating within waveguides of said layer into sub-pixel positions corresponding to at least two color channels.

30. The backlight assembly of claim 15, wherein said partially overlapping optical arrangement is characterized by an exposure length which is compatible with an inter-column separation characterizing said passive display panel.

31. The backlight assembly of claim 30, wherein said exposure length is selected so as to establish optical communication between said at least one output region and at least two columns of said passive display panel.

32. The backlight assembly of claim 15, wherein the separation between waveguides along said at least one output region is compatible with an inter-row separation characterizing said passive display panel.

33. The backlight assembly of claim 1, wherein an input side of said plurality of waveguides is wider for longer waveguides than for shorter waveguides.

34. The backlight assembly of claim 1, further comprising a reflective layer positioned so as to reflect ambient light such as to illuminate said passive display panel by said ambient light.

35. The backlight assembly of claim 1, wherein at least a few of said plurality of waveguides form a planar light circuit.

36. An optical resizing element, comprising a substrate formed of a plurality of layers, each layer of said plurality of layers having an arrangement of waveguides forming a planar light circuit in said layer and extending from a first region of said layer to a second region of said layer thereby defining a circumferential boundary within said layer, wherein the length characterizing said circumferential boundary is smaller at said first region than at said second region, such as to provide optical resizing in one dimension.

37. An optical resizing element, comprising a plurality of layers forming a substrate having a first facet and a second facet being larger than said first facet, each layer of said plurality of layers having an arrangement of substantially parallel waveguides formed and/or embedded in said layer and extending from a first region of said layer to a second region of said layer, said plurality of layers arranged in a partially overlapping optical arrangement whereby the second region of each layer is optically exposed at said second facet such as to provide optical resizing in one dimension.

38. The optical resizing element of claim 36, being designed and constructed to polarize light.

39. An optical resizing device, comprising:
a plurality of layers forming a substrate having a first facet and a second facet, said plurality of layers being arranged in a partially overlapping optical arrangement; each layer of said plurality of layers having an arrangement of waveguides formed and/or embedded in said layer and extending from a first region of said layer to a second region of said layer thereby defining a circumferential boundary within said layer, wherein the length characterizing said circumferential boundary is smaller at said first region than at said second region, and wherein said second region is optically exposed at said second facet.

40. The device of claim 39, wherein at least a few layers of said plurality of layers comprise redirecting elements for redirecting light propagating within said plurality of waveguides out of said layer.

41. A method of manufacturing an optical resizing device, comprising:
(a) forming on a substrate a plurality of waveguides extending from a first region of said substrate to a second region of said substrate thereby defining a circumferential boundary within said substrate, wherein the length characterizing said circumferential boundary is smaller at said first region than at said second region;
(b) repeating said step (a) a plurality of times, thereby providing a plurality of layers; and
(c) stacking said plurality of layers in a partially overlapping optical arrangement whereby the second region of each layer is optically exposed, so as to form a first facet and a second facet, said second facet being defined by optically exposed portion of said plurality of layers, thereby manufacturing the optical resizing device.

42. A method of resizing a spot of light, comprising, transmitting the light through the optical resizing device of claim 36.

43. The method of claim 42, further comprising distorting the spot of light such as to provide a brightness gradient thereacross thereby compensating non homogenous optical losses.

44. The method of claim 42, wherein said light constitutes an image.

45. The method of claim 44, further comprising distorting said image such as to provide a brightness gradient thereacross thereby compensating non homogenous optical losses.

46. The element of claim 36, wherein each waveguide has a generally uniform thickness along its entire length.

47. The element of claim 36, wherein each waveguide has a generally uniform thickness along its length except at a vicinity of said second region at which said waveguide is tapered.

48. The element of claim 36, wherein said layer comprises light absorbers selected so as to improve the contrast ratio of the light propagating within said waveguides.

* * * * *